United States Patent [19]

Yamamoto et al.

[11] Patent Number: 5,859,718
[45] Date of Patent: Jan. 12, 1999

[54] SIMPLIFIED SWITCHING CONTROL DEVICE, AND A NETWORK SYSTEM FOR EMPLOYING THE DEVICE: AND A SIMPLIFIED SWITCHING CONTROL METHOD, AND A COMMUNICATION METHOD FOR EMPLOYING THE METHOD

[75] Inventors: Mitsuru Yamamoto; Toru Nakata, both of Yokohama; Kazuhiko Houjou, Kawasaki, all of Japan

[73] Assignee: Canon Kabushiki Kaisha, Tokyo, Japan

[21] Appl. No.: 886,409

[22] Filed: Jul. 1, 1997

Related U.S. Application Data

[63] Continuation of Ser. No. 579,738, Dec. 28, 1995, abandoned.

[30] Foreign Application Priority Data

| Dec. 28, 1994 | [JP] | Japan | 6-327495 |
|---|---|---|---|
| Jul. 29, 1995 | [JP] | Japan | 7-191756 |
| Dec. 14, 1995 | [JP] | Japan | 7-325638 |
| Dec. 14, 1995 | [JP] | Japan | 7-325639 |

[51] Int. Cl.⁶ .................. H04J 14/02; H04Q 11/02
[52] U.S. Cl. .................. 359/128; 359/124; 359/121; 370/430; 370/436
[58] Field of Search .................. 359/120, 121, 359/123, 124, 128; 370/430, 436

[56] References Cited

U.S. PATENT DOCUMENTS

| 4,873,681 | 10/1989 | Arthurs et al. | 359/121 |
|---|---|---|---|
| 5,353,145 | 10/1994 | Le Coquil et al. | 359/121 |

FOREIGN PATENT DOCUMENTS

| 0 410 626 A2 | 1/1991 | European Pat. Off. . | |
|---|---|---|---|
| 0621700 A2 | 10/1994 | European Pat. Off. . | |
| 639015 | 2/1995 | European Pat. Off. | 359/128 |
| 0720323 A2 | 7/1996 | European Pat. Off. . | |
| 60-245397 | 12/1985 | Japan | 370/105 |
| 6-308558 | 11/1994 | Japan . | |

OTHER PUBLICATIONS

R. Chipalkatti et al., "High Speed Communications Protocols For Optical Star Coupler Using WDM," One World Through Communications, IEEE Infocom '92, vol. 3, No. Conf. 11, pp. 2124–2133 (Jan. 1, 1992).

H. Han et al., "A WDM Channel Sharing Scheme for Multihop Lightwave Networks Using Logically Bidirectional Perfect Shuffle Interconnection Pattern," IEICE Transactions on Communications, vol. E77–B No. 9, pp. 11152–1161 (Sep. 1, 1994).

(List continued on next page.)

*Primary Examiner*—Leslie Pascal
*Attorney, Agent, or Firm*—Fitzpatrick, Cella Harper & Scinto

[57] ABSTRACT

A switching device include a buffer for temporarily storing a signal sent by a corresponding input terminal; variable channel transmission units, one of which is provided for each input terminal, for outputting a received signal with one of N different channels; fixed channel reception units, one of which is provided for each output terminal, for receiving the signal carried with a given channel and for outputting a signal with the given channel to a corresponding output terminal, with the given channel not overlapping any other; a variable channel control unit for synchronously altering, in consonance with predetermined patterns, channels with which the variable channel transmission unit outputs a signal, so that two or more variable channel transmission units do not simultaneously output signals with the same channel; and a buffer control unit for synchronously reading from the buffer a signal that is to be output, while altering the channel with which the variable channel transmission unit transmits a signal. Provided for the buffer is a function for sorting signals for output terminals at which the signals are to be output, and weighting of predetermined patterns is performed with a time at which one variable channel transmission unit outputs signals with the individual channels during one pattern cycle.

66 Claims, 43 Drawing Sheets

OTHER PUBLICATIONS

Arthurs et al, Hypass: An Optoelectronic Hybrid Packet Switching System, IEEE Journal on selected areas in communications, vol. 6, No. 9, Dec. 1988.

"Fast Wavelength–Switching of Laser Transmitters and Amplifiers", H. Kobrinski et al., *IEEE Journal on Selected Areas in Communications*, vol. 8, No. 6 (Aug. 1990), pp. 1190–1202.

"Multiwavelength Networks and New Approaches to Packet Switching" by Matthew S. Goodman; IEEE Communications Magazine, Oct., 1989; pp. 27–35.

"Pigtailed High–Finesse Tunable Fibre Fabry–Perot Interferometers With Large, Medium and Small Free Spectral Ranges" by J. Stone et al.; Electronics Letters; vol. 23., No. 15, Jul. 16, 1987; pp. 781–783.

FIG. 5
PRIOR ART
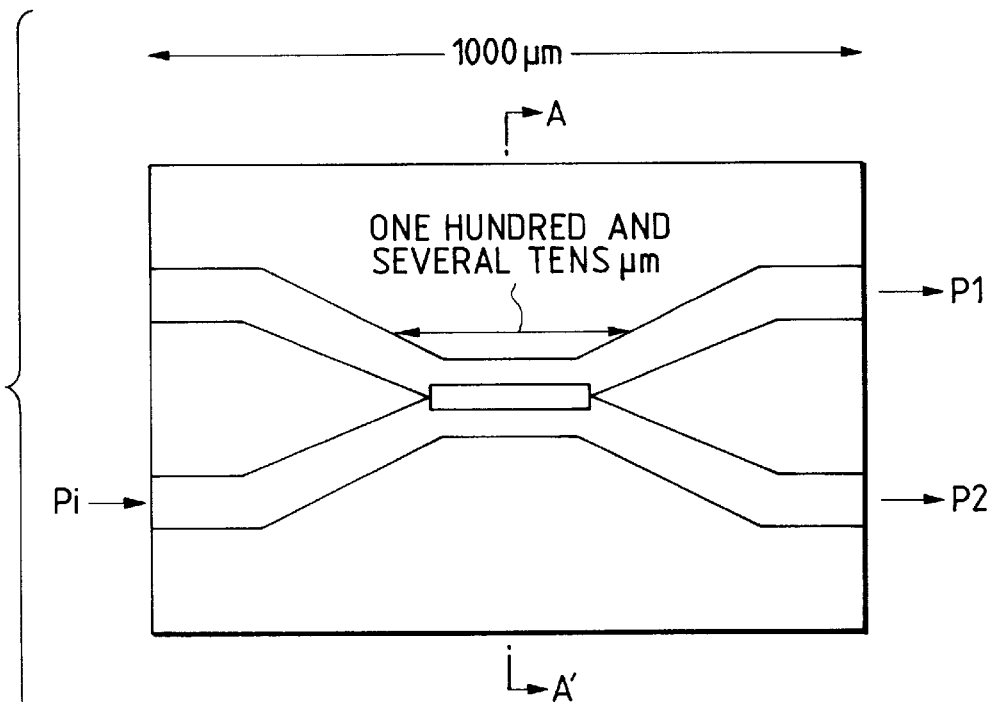
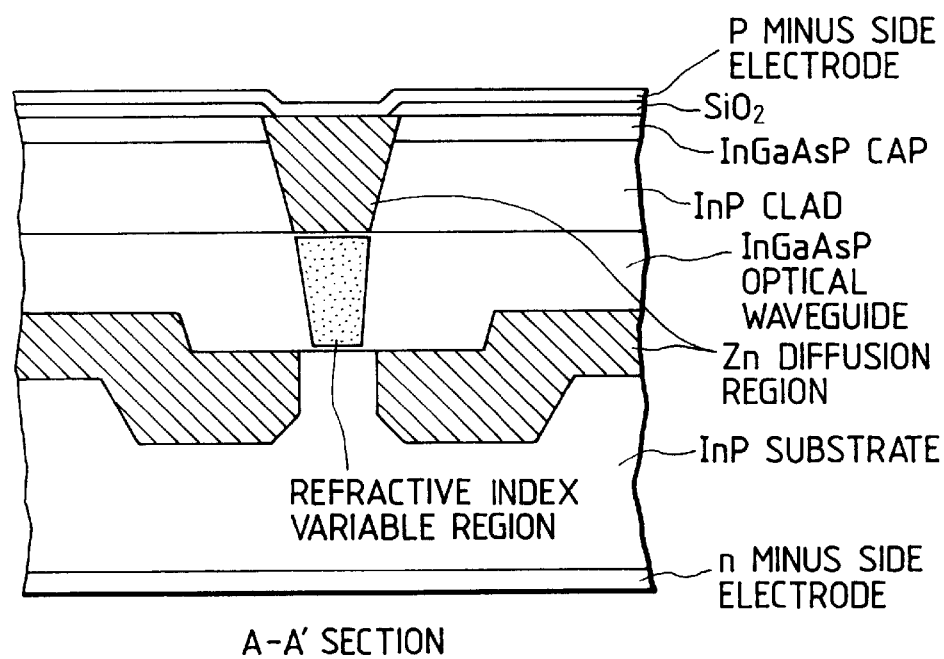
A-A' SECTION

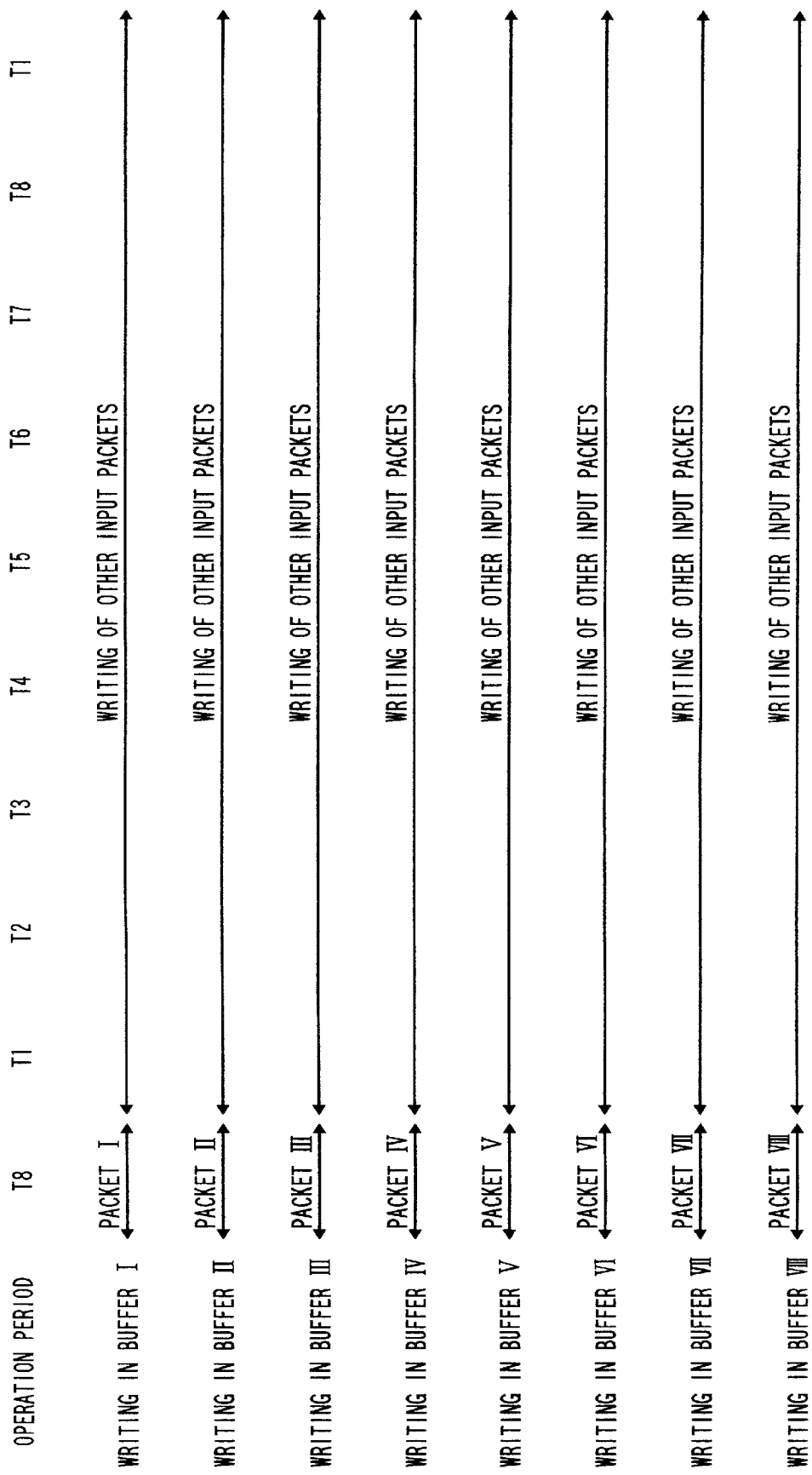

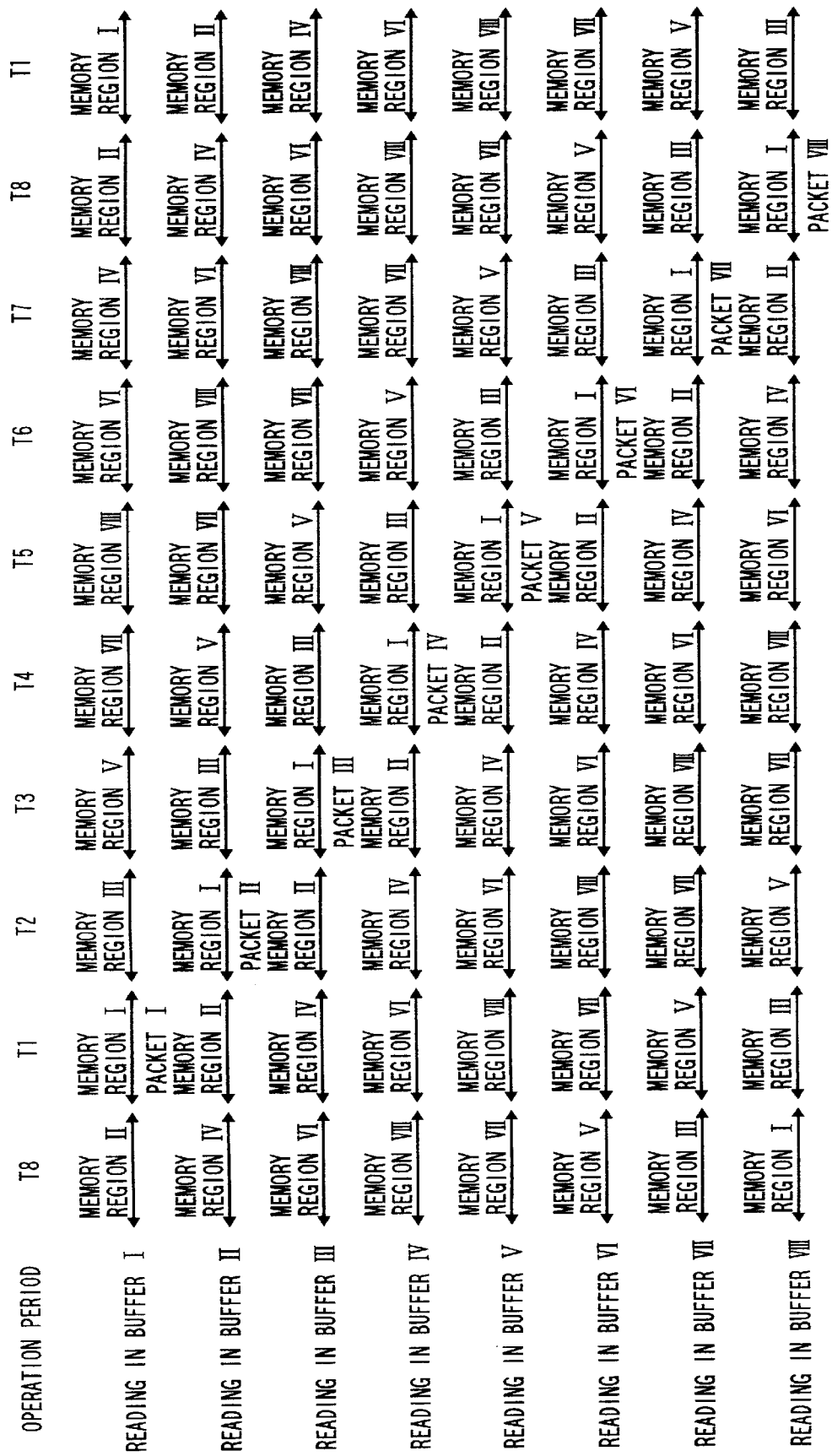

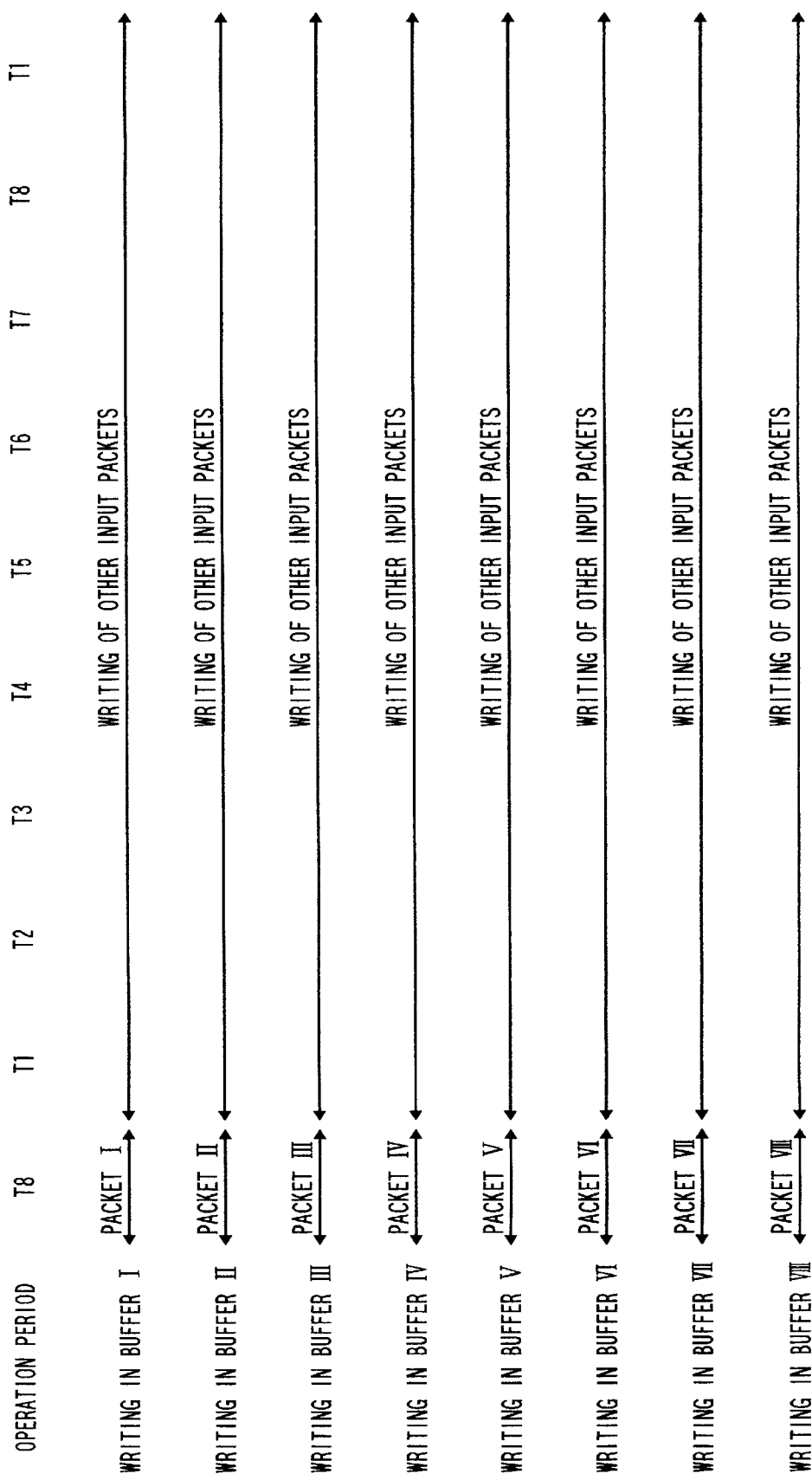

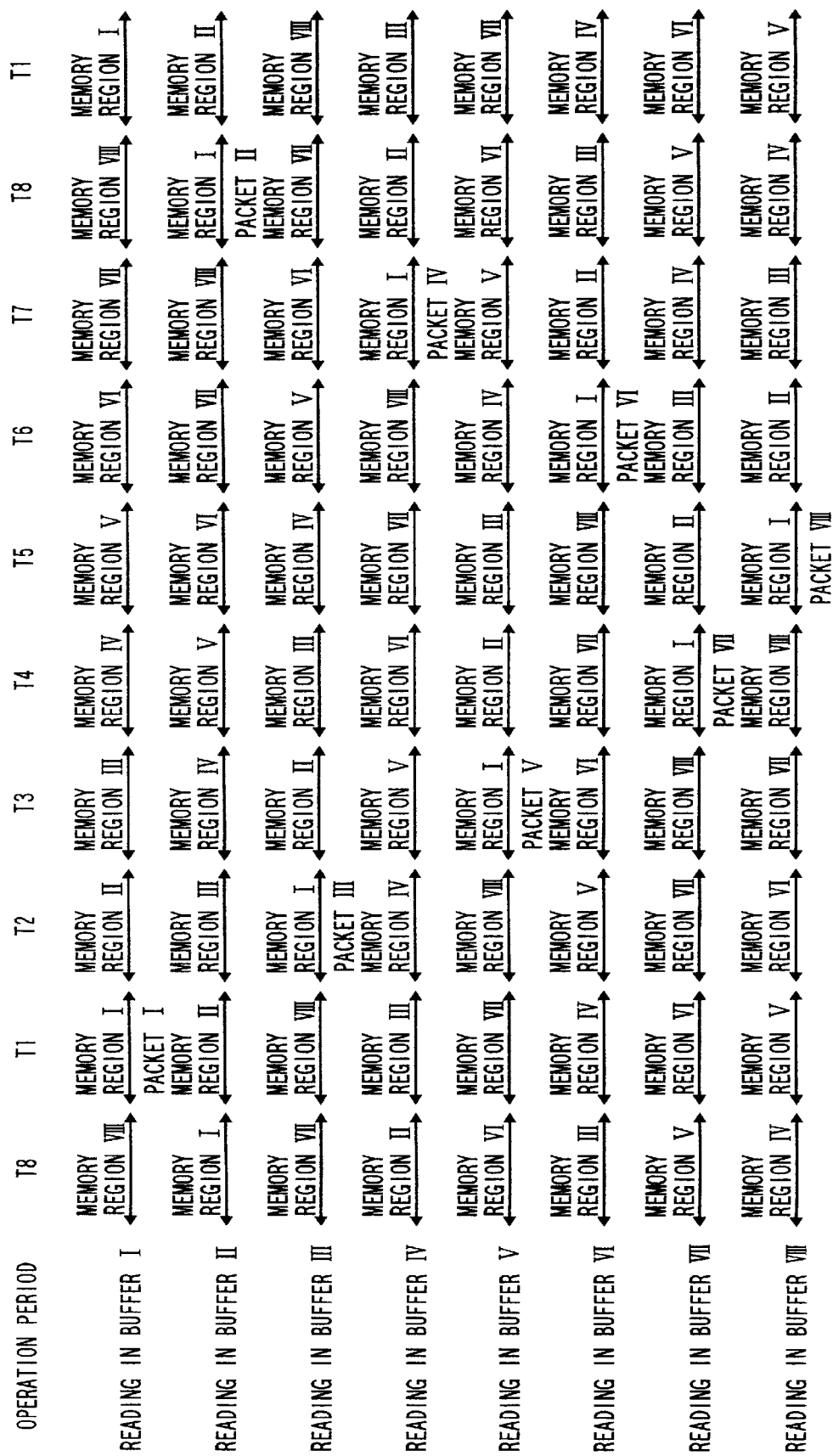

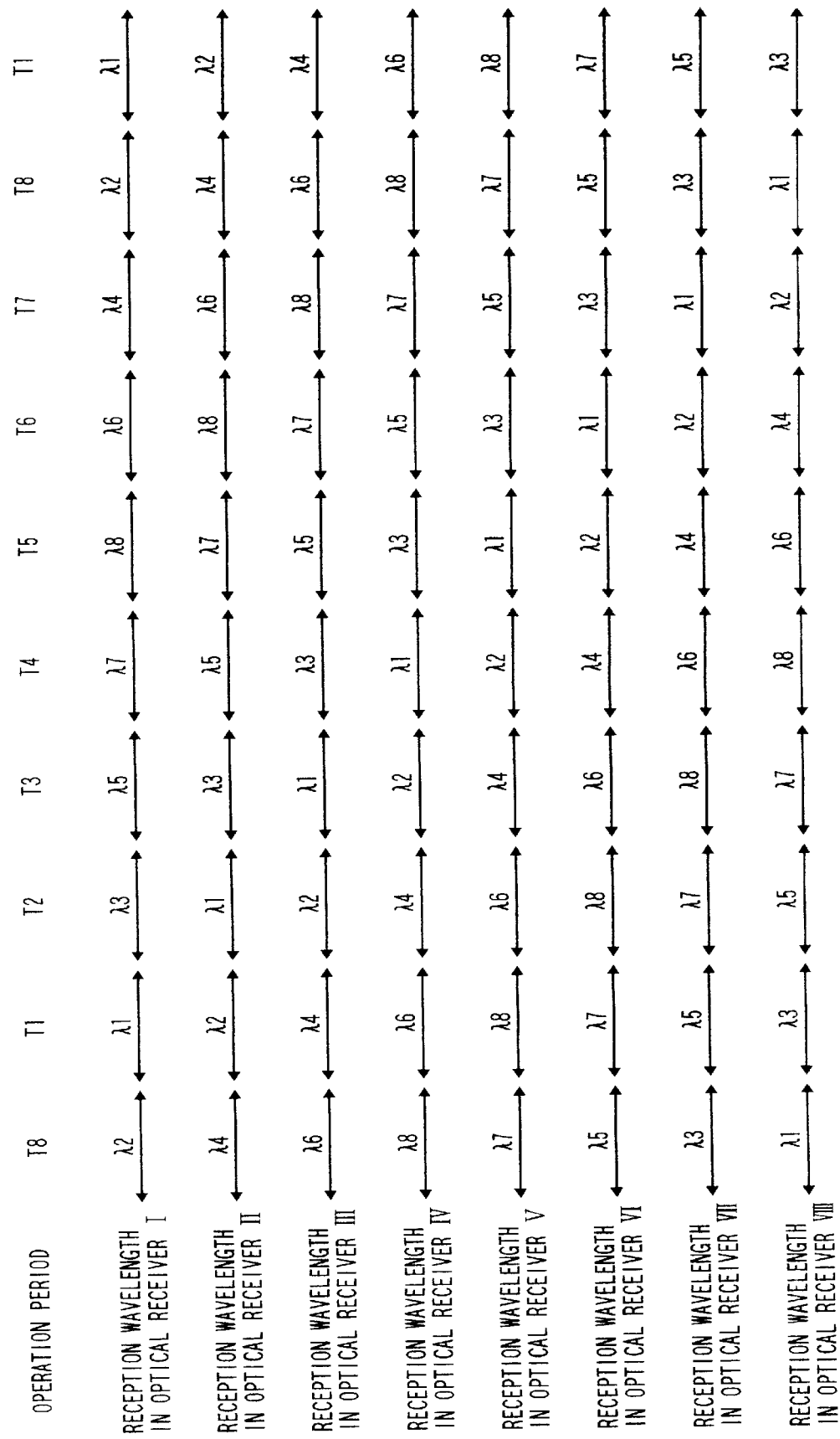

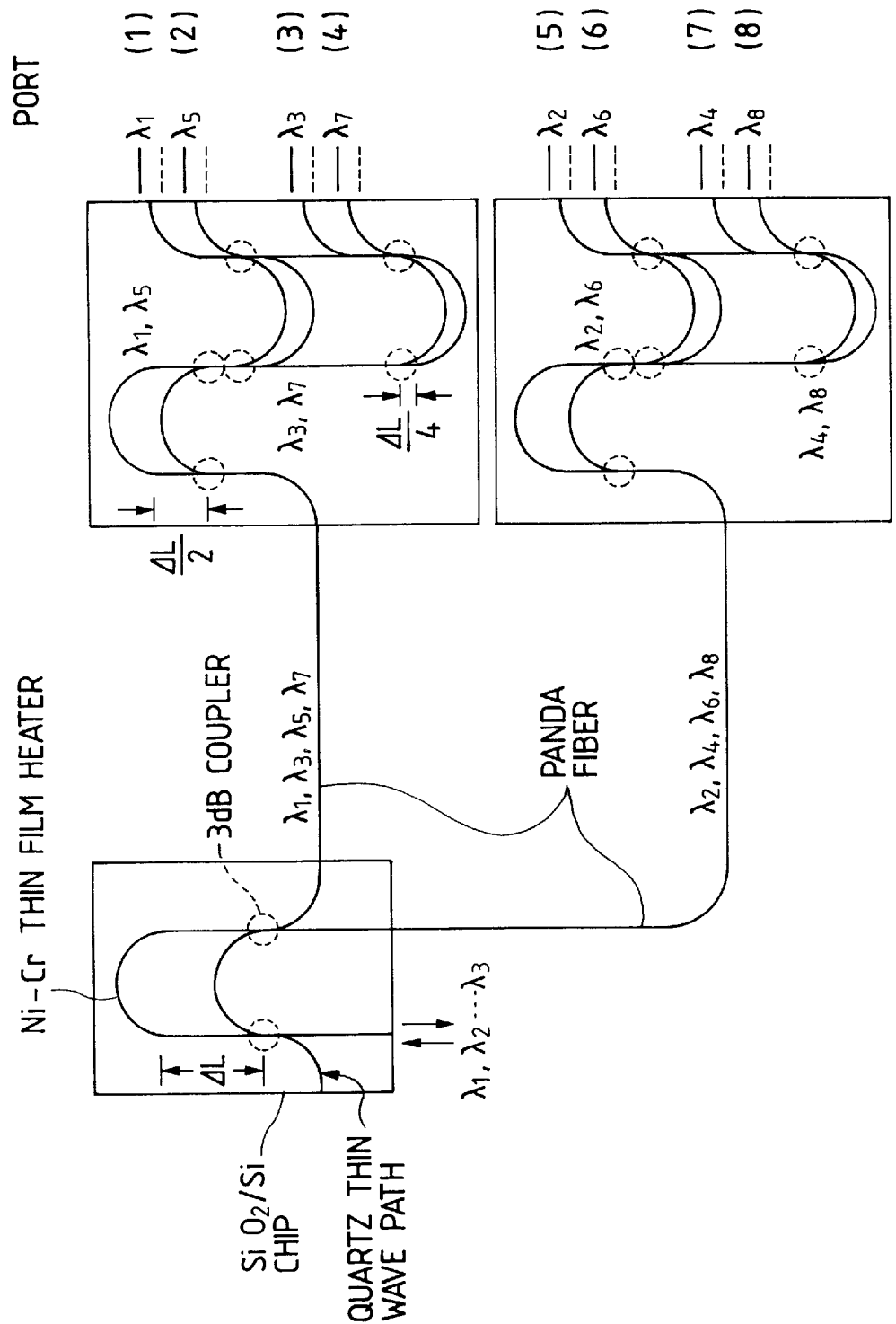

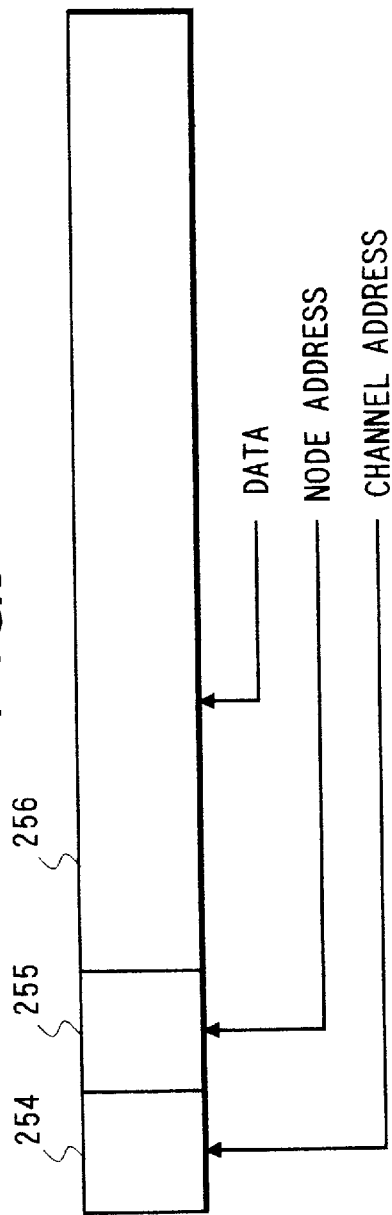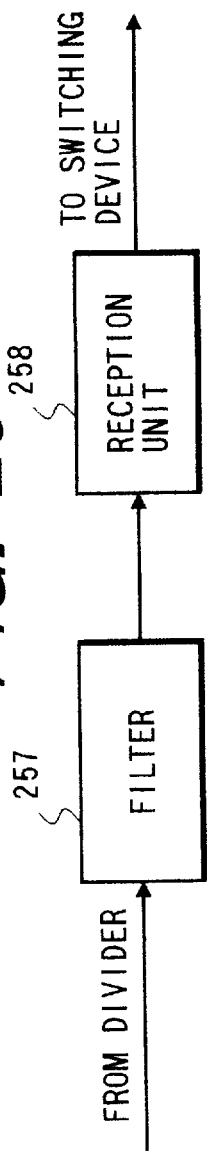

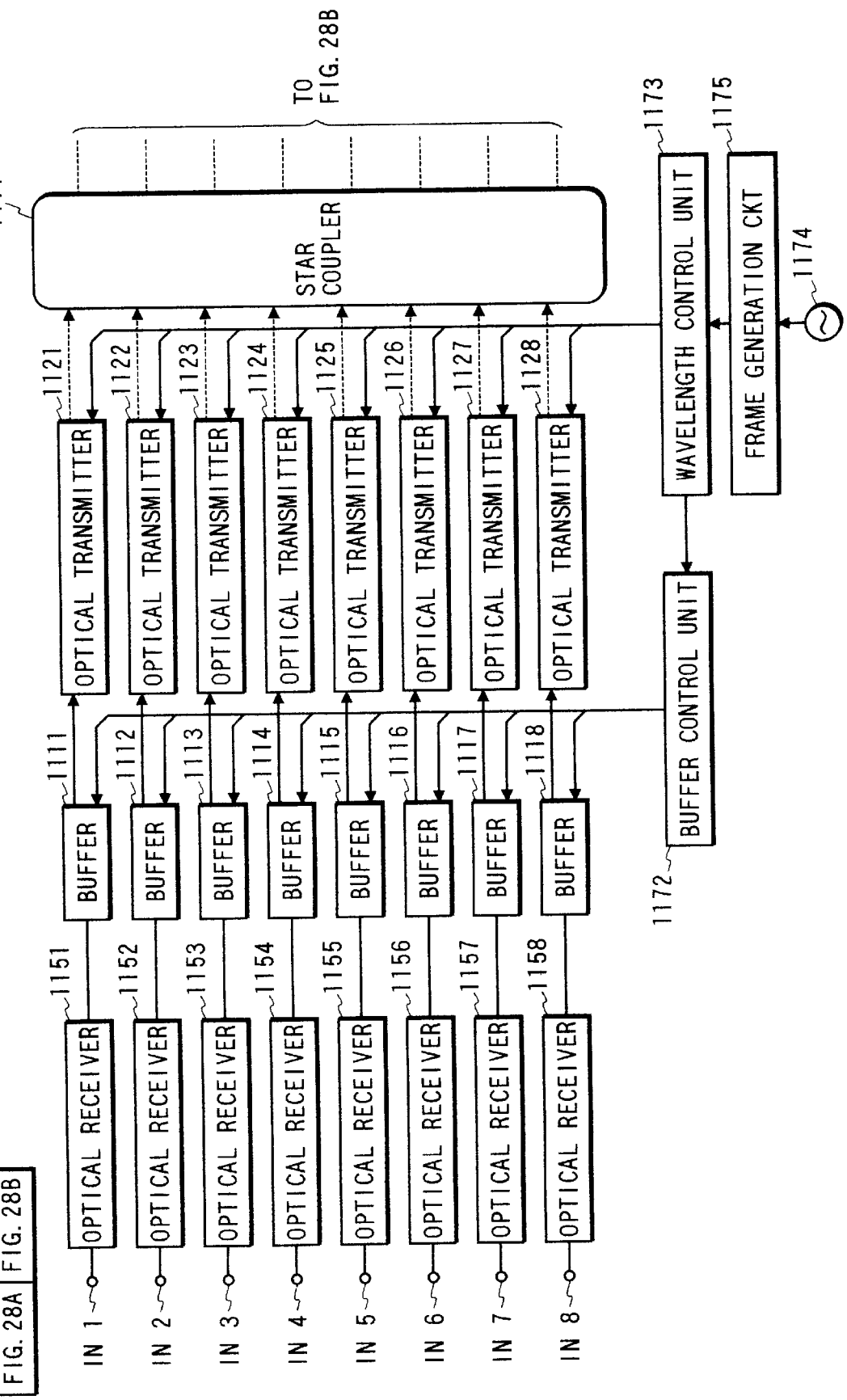

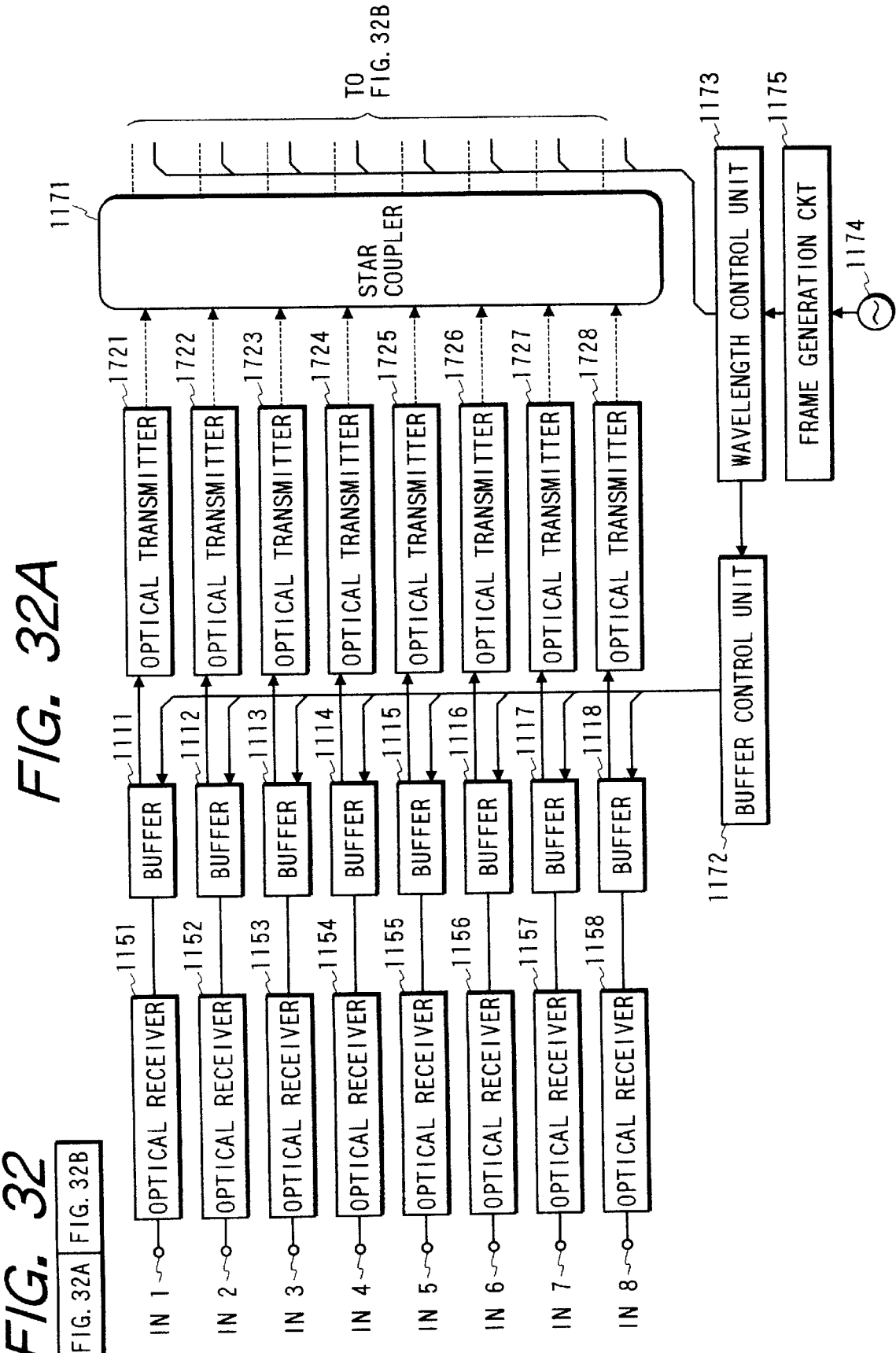

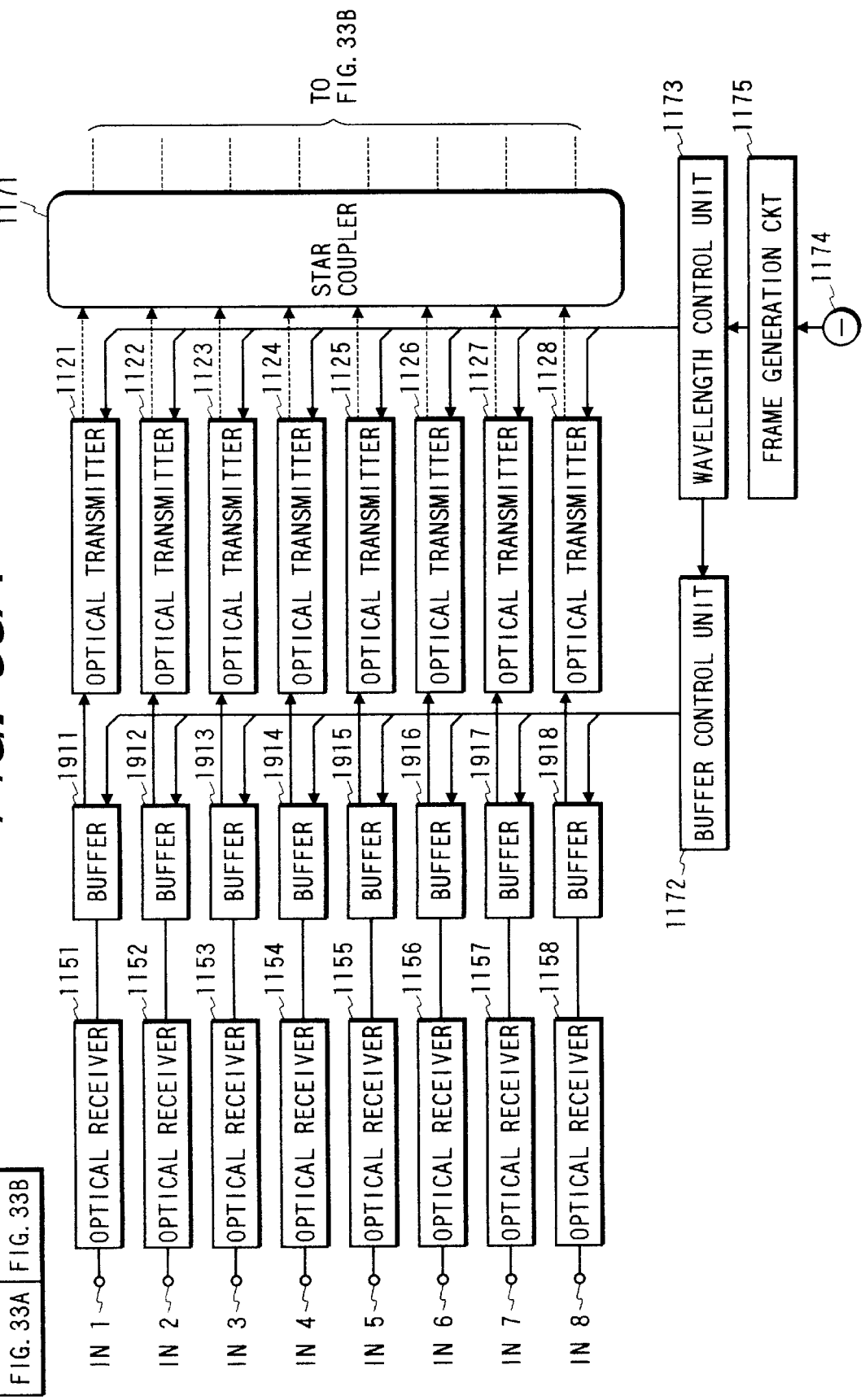

SIMPLIFIED SWITCHING CONTROL DEVICE, AND A NETWORK SYSTEM FOR EMPLOYING THE DEVICE: AND A SIMPLIFIED SWITCHING CONTROL METHOD, AND A COMMUNICATION METHOD FOR EMPLOYING THE METHOD

This application is a continuation of application Ser. No. 08/579,738 filed Dec. 28, 1995, now abandoned.

BACKGROUND OF THE INVENTION

1. Field of the Invention

The present invention relates to a switching device that switches signals, especially signals that are assembled to form packets, and a network employing such a switching device; and to a simplified switching control method, and to a communication method employing such a switching method.

2. Related Background Art

Various types of conventional switching devices and methods have been studied and discussed. The structure of a packet that is switched by one of these packet switching devices is shown in FIG. 1. In FIG. 1, an address portion 109 holds output terminal instructions that specify the output terminal for the packet, while held in data portion 110 are the data that are carried in the packet.

FIG. 2 is a diagram of a first conventional example, a crossbar switching device that has N input terminals and N output terminals. In FIG. 2 decoders 111, each of which reads the address portion of a packet, transmit to a control unit 115 output terminal signals instructing the terminal equipments at which packets are to be output. Each FIFO (First In First Out) queue (hereinafter referred to as an "FIFO") 112 temporarily stores received packets, and, under the control of the control unit 115, outputs the packets across its output line 116 in the order in which they were received. Input lines 113 are employed to carry to the input terminals of switches 114 packet signals that are output at the FIFO 112. The switches 114 are used to select whether or not packet signals that are received along the input lines 113 are to be output to the output lines 116. In consonance with the output from the decoders 111 the control unit 115 receives, it determines when to read data from the FIFO 112 and when to open and when to close the switches 114. The output lines 116 are employed, along which packet signals that are output from the switches 114 are supplied to the output terminals.

In the crossbar switching device, the control unit 115 opens or closes the switches that are connected to required output terminals, and thus provides routing control for the changing of the output terminals to which signals are forwarded. Also, when a routing disagreement arises, as when there are requests for the output at the same output terminal of input data that have been received at multiple input terminals, i.e., when a so-called output conflict occurs, the control unit 115 performs arbitration control to determine, from among the input at the plurality of input terminals, the data that are to be output. The performance of these control processes constitutes the switching operation.

However, in the first conventional example, which has N input terminals and N output terminals, N×N switches are required. As a result, the size of the hardware is greatly increased.

In addition, in the first prior art, N output terminals of the switches, by which a plurality of input lines and output lines are connected together, are connected to a single output line. As a result, length of connecting lines is extended and this causes the wiring delays and an increase in the floating capacity of wiring. As the number N of the input terminals becomes greater, it is difficult to increase the operating speed of the switches. Thus, the first prior art can not adequately handle the high speed switching that is required for input packet signals.

Further, in the first prior art, the occurrence of output conflicts must be detected for all inputs at all the input terminals, and arbitration control must be performed. Therefore, because of the performance of this control, the size of the hardware for the control unit is increased.

FIG. 3 is a second conventional example that has been proposed to overcome the shortcomings of the first conventional example. For the design of a switching device, a plurality of 2×2 switches, each of which has two input and two output terminals, are connected together at multiple steps. In FIG. 3, 2×2 switches 117 through 128, each of which has two input terminals and two output terminals, perform two functions: a "straight" function for directly connecting input terminals to output terminals, and a "crossing" function in which switching paths intersect before they connect input terminals to output terminals. These twelve 2×2 switches are connected to form a shuffle network and thus provide an omega switching device that has eight input terminals and eight output terminals.

FIG. 4 is a diagram showing the internal structure of one of the 2×2 switches 117 through 128 that have two input terminals and two output terminals. In FIG. 4, a decoder I 129 and a decoder II 130 read the address portion of a received packet and notify a control unit 135 through which output terminal the packet is to be sent. An FIFO I 131 and an FIFO II 132 temporarily store received packets, and under the control of the control unit 135, they output the packets to respective selectors I and II, 133 and 134, in the same order in which the packets were input. The selectors I and II, 133 and 134, select the FIFO I 131 or II 132 in which is stored a packet signal that is to be output to an external destination. When the above mentioned straight function is performed, the selector I 133 selects the FIFO I 131, and the selector II 134 selects the FIFO II 132. When the crossing function is performed, the selector I 133 selects the FIFO II 132 and the selector II 134 selects the FIFO I 131.

In the second prior art, the number of required 2×2 switches is N log N−N/2 (2 is the log). Although this number is smaller than the N×N in the first prior art, each of the 2×2 switches requires decoders, FIFOs, a control unit and selectors, and thus the size of its hardware is large. In addition, in the second prior art, even if different input terminals are not connected to the same output terminal, an input terminal may not be connected to a desired output destination when a specific connection condition exists at of the other input terminals, i.e., a so-called blocking phenomenon will occur. For example, when input terminal 5 in FIG. 3 is connected to an output terminal 3, the 2×2 switch 117 is placed in the crossing state. However, in order to connect input terminal 1 to output terminal 1, the 2×2 switch 117 must be placed in the straight state. As a result, the blocking phenomenon occurs.

In a switching device, shown in the first and the second prior art, that employs electric switches, electric devices that can be switched at high speed are required for high speed processing. These electric devices are very expensive, and as a result the cost of manufacturing a switching device is increased. As one way to provide a high speed packet signal switching device, a switching device has been discussed that converts a packet signal into an optical signal and then switches the converted signal.

A third conventional example is of this type. In it, optical fibers are used to connect together, at multiple steps, a plurality of 2×2 optical waveguide switches, which have the same function as those in the second prior art, to provide an 8×8 switching device. In FIG. 5 are a schematic diagram and a cross sectional view of a total reflection InP optical switch, which is employed in the third prior art and which is one of crossing optical switches that are employed as 2×2 optical waveguide switches. In the total reflection InP optical switch, a carrier is introduced in a crossing portion where two optical waveguides cross each other to vary the refractive index in a refractive index variable region. Thus, an optical signal that enters the crossing portion is either transmitted or is totally reflected, and the switching is thereby performed. The variance of the refractive index that is induced by introducing a carrier is derived from band filling effects, during the shifting of the bands, according to which a change in a refractive index is increased as the wavelength of an incident light approaches the wavelength of an absorption end.

The introduction of a current into a refractive index variable region is performed with a carrier closing effect by using a p-InP clad layer and an n-InP substrate that have a large band gap, and by the constriction of a current in a Zn diffusion region. An InGaAsP cap layer is provided to obtain a preferable ohmic contact with an electrode. An optical switch must reduce the transfer loss for an optical signal and increase an optical quenching ratio (reduce cross talk). The refractive index must vary greatly in order to increase the optical quenching ratio. However, the above described optical switch is provided by using the band filling effect, and as the wavelength of incident light nears the wavelength at the absorption end, the transfer loss and the variance in the refractive index are increased. Setting the wavelength of incident light is difficult because, depending on the setting for the wavelength, a choice must be made as to whether a change in the refractive index should be reduced to prevent transfer loss and an increase in cross talk should be ignored; or whether a change in the refractive index should be increased to reduce cross talk and an increase in the transfer loss should be disregarded. Especially when 2×2 switches are to be connected, multiple steps for connection can not be employed due to a problem that arises from a trade-off involving transfer loss and a cross talk, and a large switching device can not be provided. In addition, since the response speed for the changing of the switches is limited by the lifetime of an injected carrier, high speed switching can not be performed.

In consideration with the above problems, the present inventor proposed the following switching device and switching method.

FIG. 6 is a diagram illustrating the structure of that switching device. The switching device has eight input terminals and eight output terminals and is constituted by eight variable wavelength transmission units I through VIII, which employ a tunable laser diode (TLD), and eight reception units I through VIII, which employ a photodiode (PD). In FIG. 6, each of the decoders I 136 through VIII 143 reads the address portion of an input packet, and transmits a destination instruction to a control unit 177 for the output terminal at which the packet is to be output. First In First Out queues (hereafter referred to as "FIFOs") I through VIII 144 through 151 temporarily store the packets they receive and then, under the control of the control unit 177, transfer the packets to the respective variable wavelength transmission units in the order in which they were received. Variable wavelength transmission units I 152 through VIII 159 are controlled by a wavelength control unit 179 in the control unit 177. They convert the packet signals that they receive from the FIFO I 144 through FIFO VIII 151 into optical signals having specific wavelengths and emit these signals to a star coupler 160. The star coupler 160 merges all the light of the wavelengths that are emitted from these eight variable wavelength transmission units 152 through 159 and then emits the light to eight filters 161 through 168. The filters I 161 through VIII 168, each functions to transmit only an optical signal having a fixed wavelength and to filter out optical signals having the other wavelengths. The transmitted wavelength λ1 is set for the filter I 161; λ2, for the filter II 162; λ3, for the filter III 163; λ4, for the filter IV 164; λ5, for the filter V 165; λ6, for the filter VI 166; λ7, for the filter VII 167; and λ8, for the filter VIII 168. The reception units I 169 through VIII 176 employ a photodiode to convert into electrical signals the optical signals that have the given wavelengths that are transmitted through the respective filters I 161 through VIII 168, and output each of the electric signals to a specific output terminal I to VIII. The control unit 177, which initiates the switching operation by the switching device, is constituted by an arbitration control unit 178 and the wavelength control unit 179. In consonance with instructions that are output by the decoders 136 through 143, the arbitration control unit 178 resolves output conflicts, between packets that have been input at the input terminals I through VIII, for each of the output terminals I through VIII at which the packets are to be output. The arbitration control unit 178 then issues an instruction to the wavelength control unit 179 that is consonant with the arbitration result. Upon the receipt of the instruction from the arbitration control unit 178, the wavelength control unit 178 controls the transmission wavelengths of the variable wavelength transmission units 152 through 159.

With the above described arrangement, since the eight filters I 161 through VIII 168 are so set that the wavelengths of optical signals that are transmitted through them are different, the wavelengths of the optical signals that enter the individual reception units differ and are independent. Therefore, a routing function for changing the output terminal for signal output can be provided by varying the transmission wavelength of the variable wavelength transmission units 152 through 159.

However, with this arrangement, arbitration control is required for packets that are input at all the input terminals.

Further, the transmission wavelength must be adjusted to a given wavelength for each packet in consonance with an instruction from the arbitration control unit. Therefore, when, for example, a packet has been forwarded with the shortest wavelength, and when a succeeding packet that is to be output has the longest wavelength, the magnitude of the change in the transmission wavelength that is performed by the variable wavelength transmission unit is great.

In this case, high speed wavelength control is required, so that the size of the hardware is increased or the time required for the processing to change the wavelength is extended.

As a similarly structured switching device, a technique called BHYPASS is disclosed in "Matthew S. Goodman; October 1989, IEEE Communication Magazine, pp. 27–35". While its arrangement is similar to that in FIG. 6, the device employs the Batcher-Banyan algorithm to control in advance the routing of packets, so that packets which are to be sent to the same output terminal are not input to a plurality of variable wavelength transmission units at the same time. The device also controls the wavelengths of the variable wavelength transmission units. With this arrangement, the advance control is required to ensure that packets which are to be sent to the same output terminal are not input simultaneously to a plurality of wavelength transmission units. In addition, the wavelengths of the wavelength transmission units must be adjusted in consonance with the packet destinations.

SUMMARY OF THE INVENTION

To resolve the above described conventional problems, the following switching device is proposed in the present invention.

A switching device, which switches signals between N input terminals and N output terminals, comprises:

buffer means, one of which is provided for each of the N input terminals, for temporarily storing a signal that is sent by one corresponding input terminal of the N input terminals;

variable channel transmission means, one of which is provided for each of the N input terminals, for outputting a signal, which is received from the buffer means, with one of N different channels;

fixed channel reception means, one of which is individually provided for each of the N output terminals, for receiving the signal carried by a given channel of the N channels of the variable channel transmission means, and for outputting a signal with the given channel to a corresponding output terminal of the N output terminals, with the given channel of the fixed channel reception means not overlapping any other;

variable channel control means for synchronously altering, in accordance with a predetermined pattern, a channel with which the variable channel transmission means for each of the N input terminal outputs a signal, so that two or more of the variable channel transmission means do not simultaneously output signals with the same channel; and buffer control means for synchronously reading from the buffer means a signal that is to be output, while altering the channel across which the variable transmission means transmits a signal.

With this arrangement, since the output channel of the variable channel transmission means is not controlled in consonance with the destination of an input signal, simplified control and high speed switching processes can be provided. Further, the above described transmission means can serve as a fixed channel, and the reception means can serve as a variable channel.

In this switching device, as a function for sorting signals that are input for each of the N output terminals at which the signals are to be output is provided for the buffer means, the reading control process is easily performed and the processing speed is increased.

When the switching is performed frequently between specific input and output terminals, weighting of the predetermined pattern is performed with a time at which one variable channel transmission means outputs signals with the individual channels during one pattern cycle. The switching efficiency is then improved.

Also provided in the present invention are a network that employs the thus arranged switching device, a switching method for the thus arranged switching device, and a communication method for the above network.

BRIEF DESCRIPTION OF THE DRAWINGS

FIG. 5 is a diagram showing a 2×2 optical switch in a third conventional example;

FIGS. 13A to 13C are time charts for the first embodiment of the present invention;

FIGS. 19A to 19C are time charts for the fourth embodiment of the present invention;

FIG. 20 is a diagram illustrating one structure of a variable length reception unit according to the fourth embodiment of the present invention;

FIG. 25 is a diagram illustrating the structure of a packet that is employed in the fifth embodiment of the present invention;

FIG. 26 is a diagram illustrating the structure of a fixed wavelength reception unit according to the fifth embodiment of the present invention;

FIGS. 28A and 28B is comprised of FIGS. 28A and 28B showing diagrams illustrating a switching device for a switching network according to a seventh embodiment of the present invention;

FIGS. 32A and 32B is comprised of FIGS. 32A and 32B showing diagrams illustrating a switching device for a switching network according to an eighth embodiment of the present invention;

FIGS. 33A and 33B is comprised of FIGS. 33A and 33B showing diagrams illustrating a switching device for a switching network according to a ninth embodiment of the present invention;

DETAILED DESCRIPTION OF THE PREFERRED EMBODIMENTS (Embodiment 1)

Figure 1:
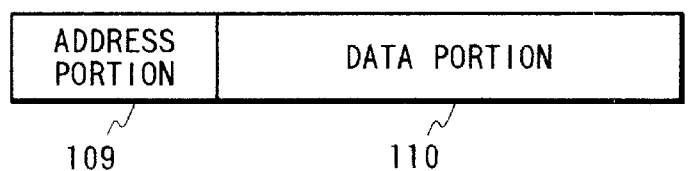
FIG. 1 is a diagram illustrating the structure of a packet.
Figure 2:
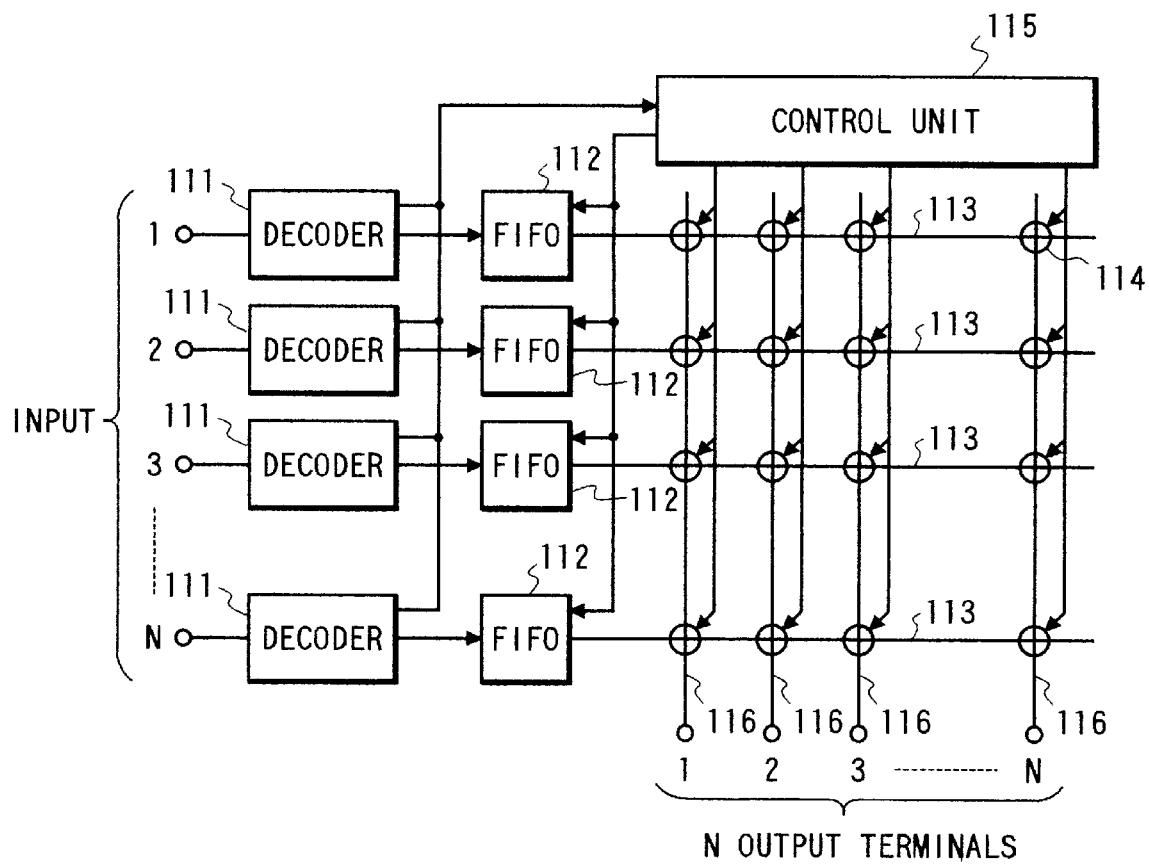
FIG. 2 is a diagram showing N×N electric switches in a first conventional example.
Figure 3:
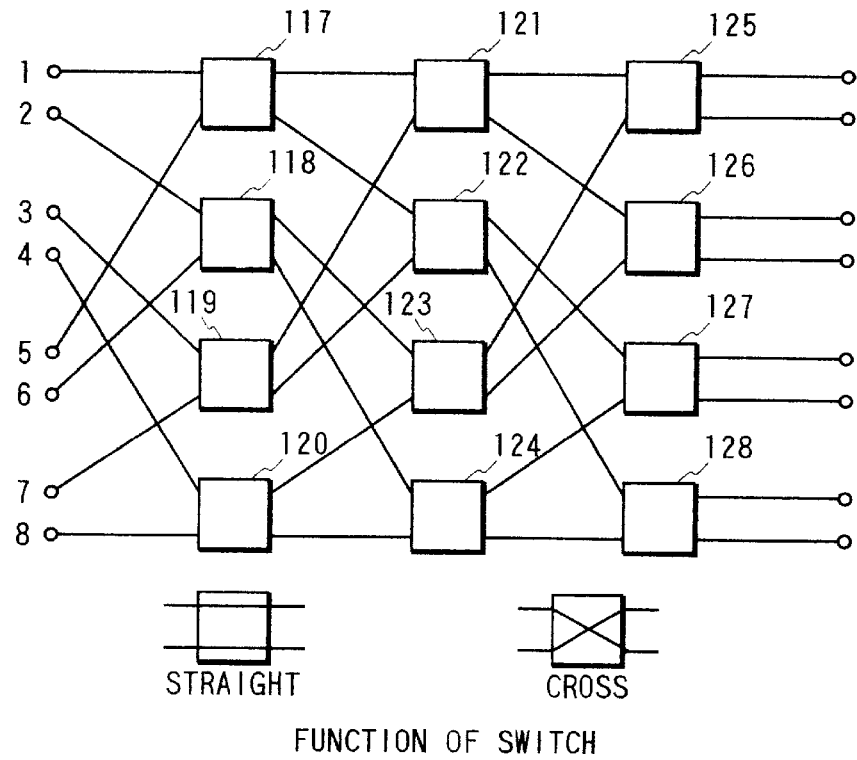
FIG. 3 is a diagram showing an 8×8 electric switches in a second conventional example.
Figure 4:
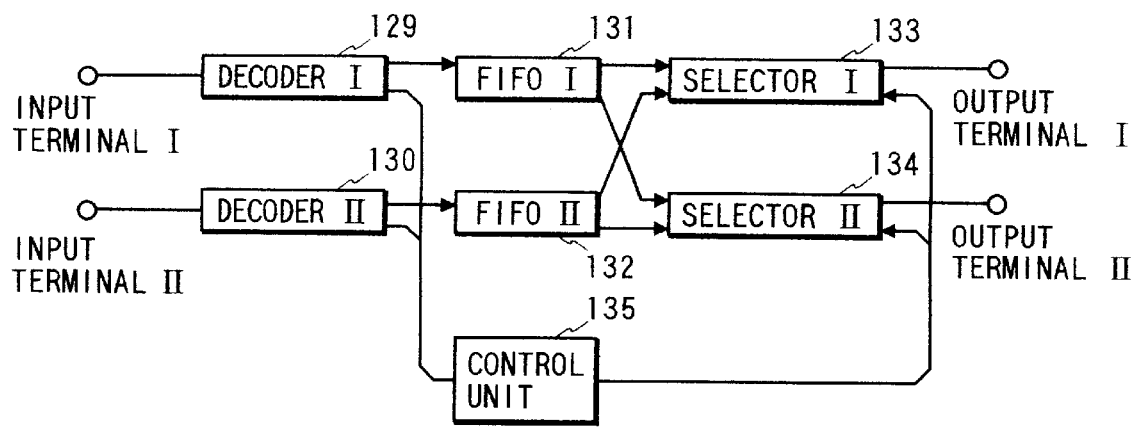
FIG. 4 is a diagram showing a 2×2 electric switch in the second conventional example.
Figure 6:
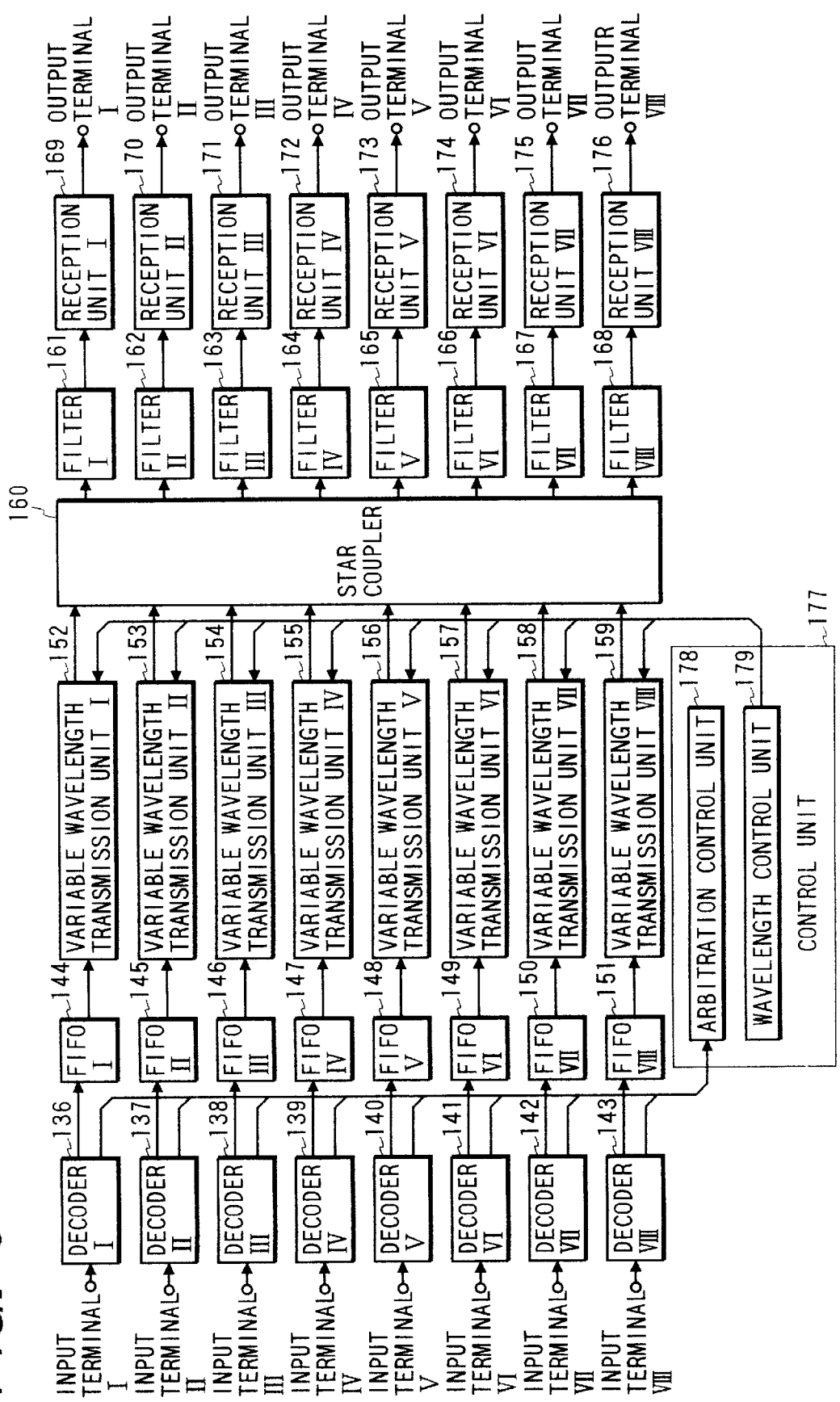
FIG. 6 is a diagram illustrating the arrangement of a switching device that is provided as a reference by the present inventor.
Figure 7:
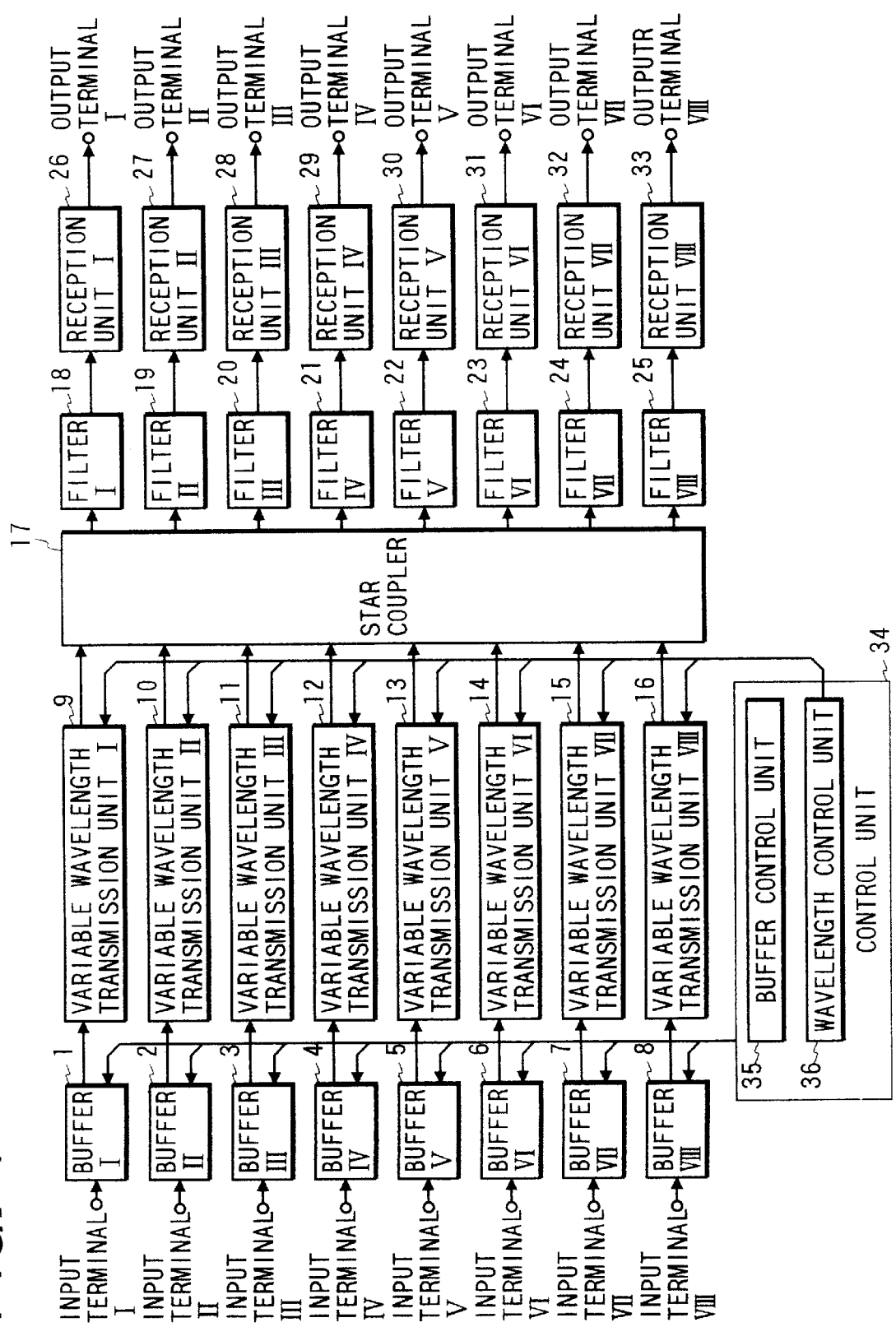
FIG. 7 is a diagram illustrating the structure of a first embodiment of the present invention.

In FIG. 7 is illustrated a switching device according to a first embodiment of the present invention. The switching device has eight input terminals and eight output terminals, and is constituted by eight variable wavelength transmission means and eight fixed wavelength reception means.

In FIG. 7, buffers I through VIII, 1 through 8, are buffer means for temporarily storing electric signals that are input at input terminals. The internal structure of the buffers will be described later. Variable wavelength transmission units I through VIII, 9 through 16, are variable wavelength transmission means that convert into optical signals having desired wavelengths the electric signals which are output from the buffer means and that transmit those optical signals.

A star coupler 17 is an optical waveguide means that relays to eight fixed wavelength reception means, which will be described later, the eight optical signals that have been transmitted from the eight variable wavelength transmission units I 9 through VIII 16. A function of each of Filters I 18 through VIII 25 is the transmission of only those optical signals that have a fixed wavelength and the blocking of optical signals having other wavelengths. The transmission wavelength for each filter is set to $\lambda 1$ for filter I 18, $\lambda 2$ for filter II 19, $\lambda 3$ for filter III 20, $\lambda 4$ for filter IV 21, $\lambda 5$ for filter V 22, $\lambda 6$ for filter VI 23, $\lambda 7$ for filter VII 24, and $\lambda 8$ for filter VIII 25. Beginning with the shortest wavelength, numbers are assigned in order to the individual wavelengths. Reception units I 26 through VIII 33, which employ photodiodes, convert optical signals that pass through the respective filters into electric signals, and output the electric signals to corresponding output terminals. Each reception unit I 26 to VIII 33, in which is mounted a Pin photodiode (Pin-PD), adjusts a wavelength by using an amplifier, an equalizer, and an identifier, which are connected to the rear step of the Pin photodiode, and outputs the resultant wavelength. The filter I 18 and the reception unit I 26 provide a fixed wavelength reception means that corresponds to the wavelength $\lambda 1$. Similarly, the filter II 19 and the reception unit II 27 form a fixed wavelength reception means that corresponds to the wavelength $\lambda 2$; the filter III 20 and the reception unit III 28 form a fixed wavelength reception means that corresponds to the wavelength $\lambda 3$; the filter IV 21 and the reception unit IV 29 form a fixed wavelength reception means that corresponds to the wavelength $\lambda 4$; the filter V 22 and the reception unit V 30 form a fixed wavelength reception means that corresponds to the wavelength $\lambda 5$; the filter VI 23 and the reception unit VI 31 form a fixed wavelength reception means that corresponds to the wavelength $\lambda 6$; the filter VII 24 and the reception unit VII 32 form a fixed wavelength reception means that corresponds to the wavelength $\lambda 7$; and the filter VIII 25 and the reception unit VIII 33 form a fixed wavelength reception means that corresponds to the wavelength $\lambda 8$. A control unit 34 which includes a buffer control unit 35 and a wavelength control unit 36, controls the switching operation of the switching device. The buffer control unit 35 receives an instruction from the wavelength control unit 36 and reads from the buffer means signals that are to be transmitted until the wavelength of a signal matches the reception wavelength of the fixed wavelength reception means, which corresponds to an output terminal to which an input signal is transmitted. The wavelength control unit 36 controls the transmission wavelength of the variable wavelength transmission means in consonance with a predetermined transmission wavelength control pattern, which will be described later.

Figure 8:
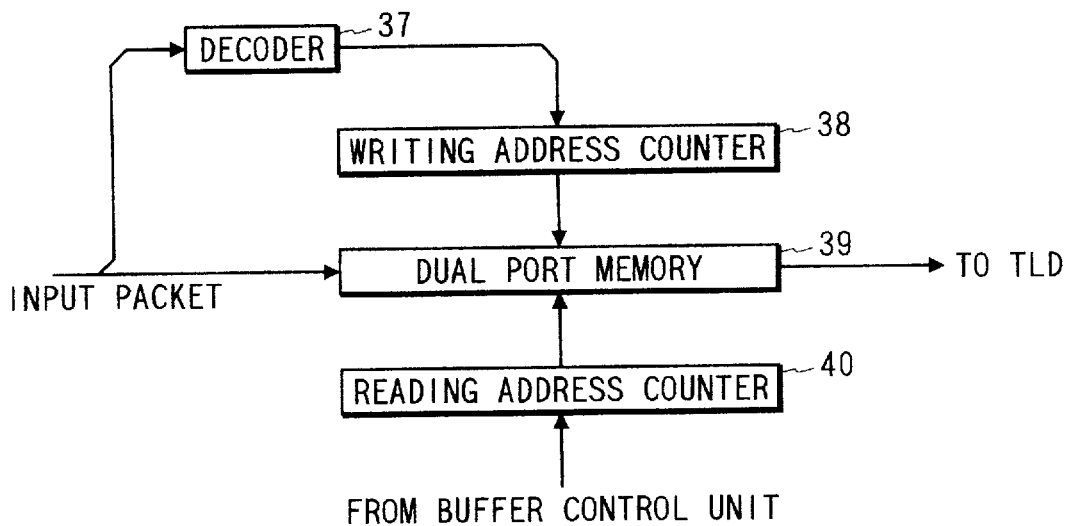
FIG. 8 is a diagram illustrating a buffer according to the first embodiment of the present invention.
Figure 9:
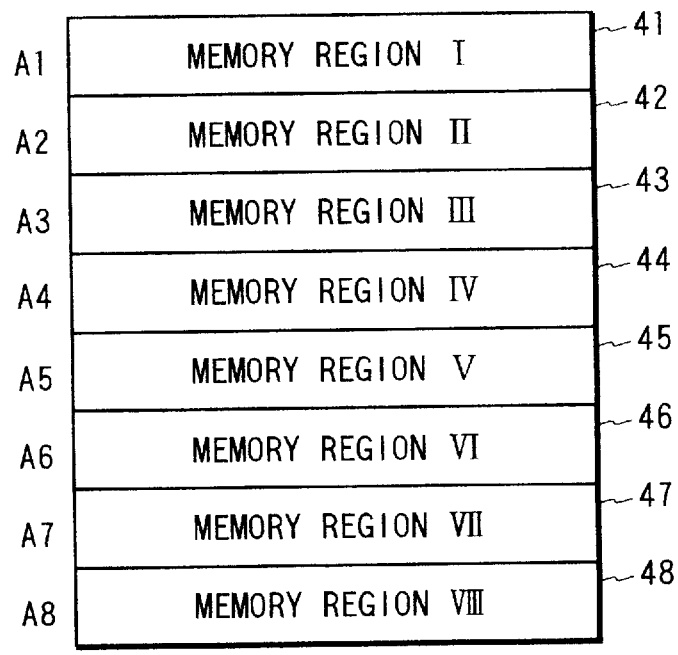
FIG. 9 is a diagram showing a memory map for a dual port memory according to the first embodiment of the present invention.

FIG. 8 is a diagram illustrating the internal arrangement of the buffers I 1 through VIII 8 that are employed in the first embodiment of the present invention. The internal arrangements of the buffers I 1 through VIII 8 are identical. In FIG. 8, a decoder 37 reads the address portion of an input packet, and transmits to a writing address counter 38 a writing start address for a dial port memory 39, wherein the packet is to be written, in consonance with an output terminal to which the packet is to be output. In this embodiment, a packet is employed that has the same structure as does the conventional example in FIG. 17, and the writing address counter 38 sequentially outputs, to the dual port memory 39, signals indicating the addresses at which packets are to be written, beginning at the writing start address that is output by the decoder 37. The dual port memory 39 is employed for writing and reading packet data independently. The storage area of the dual port memory 39 is divided into eight regions in consonance with the output terminals at which packets are to be output, as is shown in a memory map in FIG. 9. The head addresses of the individual regions are A1, A2, A3, A4, A5, A6, A7 and A8. A reading address counter 40 receives, as reading start addresses, offset values from the buffer control unit 35, and sequentially outputs signals indicating the addressees of packets that are to be read to the dual port memory 39.

Figure 10:
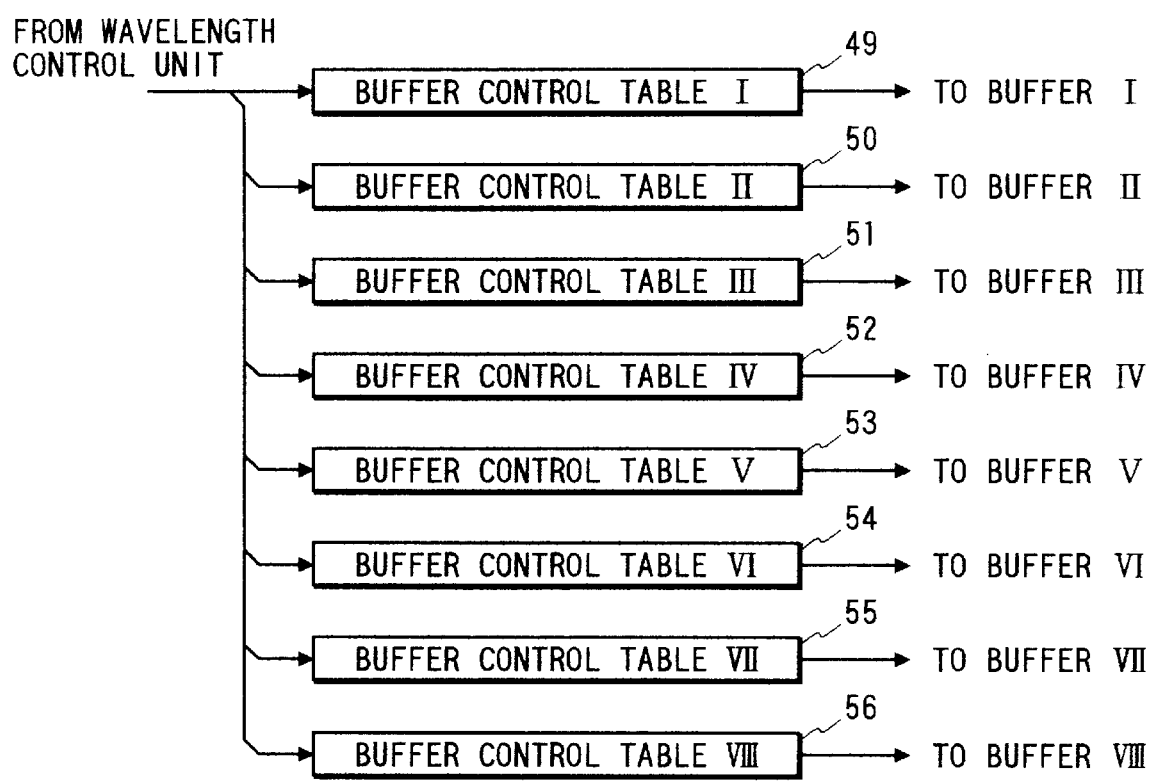
FIG. 10 is a diagram illustrating a buffer control unit according to the first embodiment of the present invention.

In FIG. 10 is shown the internal arrangement of the buffer control unit 35 that is employed for the first embodiment of the present invention. Buffer control tables I through VIII, 49 through 56, are sequentially read in consonance with addresses that are output by the wavelength control unit 36, and predetermined offset values are output to the reading address counters 40 of the respective buffers I through VIII, 1 through 8. These tables constitute the contents of a read only memory (ROM). The contents in the buffer control tables I 49 through VIII 56 will be described later.

Figure 11:
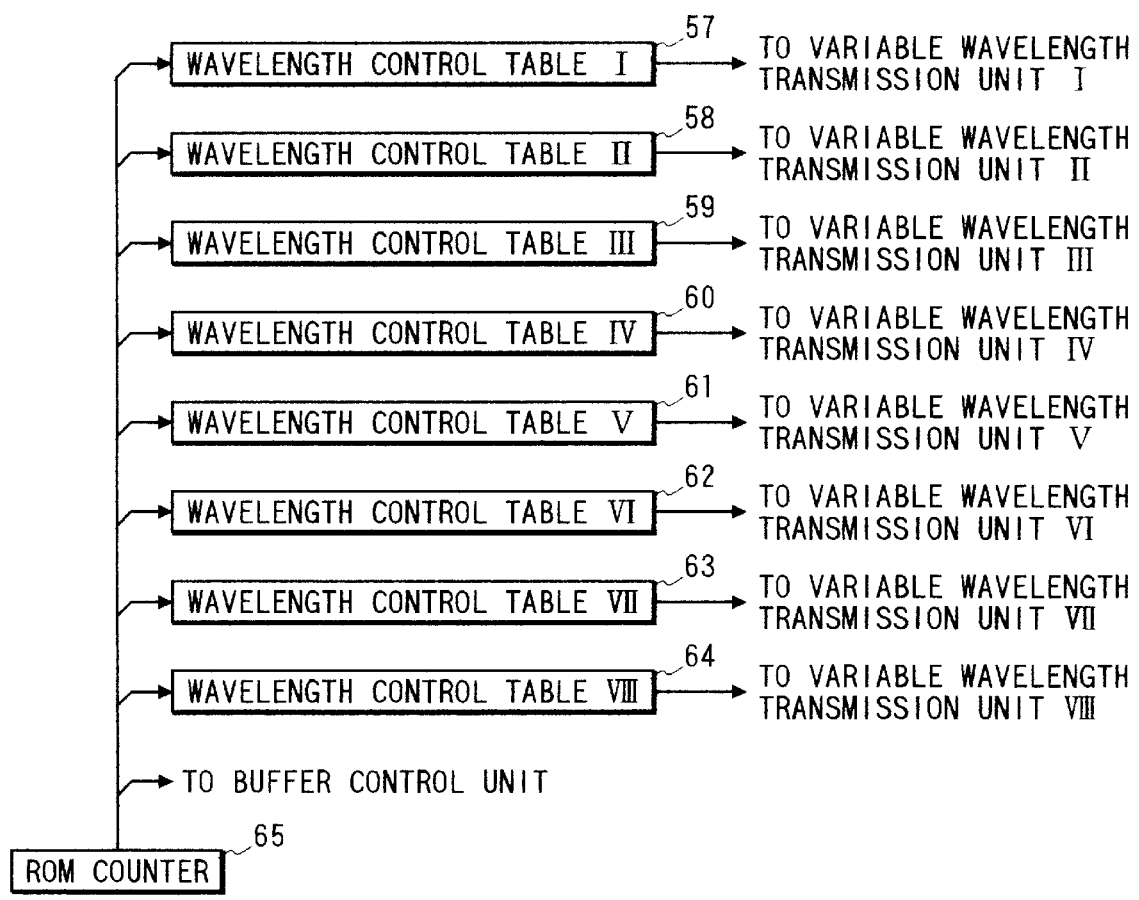
FIG. 11 is a diagram illustrating the arrangement of a wavelength control unit according to the first embodiment of the present invention.

FIG. 11 is a diagram showing the internal arrangement of the wavelength control unit 36. Wavelength control tables I through VIII, 57 through 64, are sequentially read in consonance with addresses that are output by a 3-bit ROM counter 65, and predetermined wavelength control signals are output to the drive units of the respective variable wavelength transmission units I 9 through VIII 16. These tables constitute the contents of a read only memory (ROM). The contents in the wavelength control tables I 57 through VIII 64 will be described later.

Figure 12:
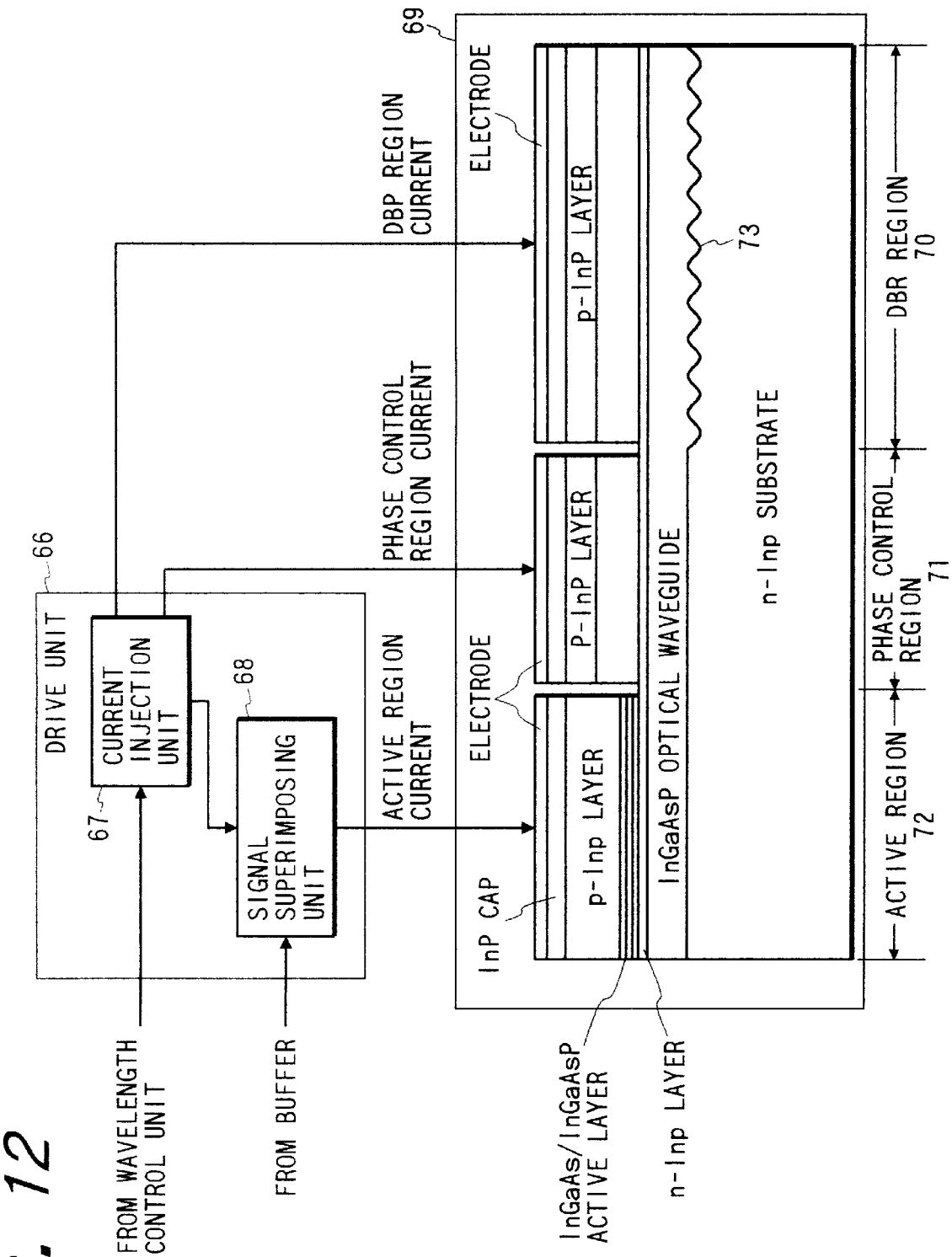
FIG. 12 is a diagram illustrating the arrangement of a variable wavelength transmission unit according to the first embodiment of the present invention.

FIG. 12 is a diagram illustrating the internal structure of each of the variable wavelength transmission units I 9 through VIII 16 that are employed for the first embodiment of the present invention. All the variable wavelength transmission units I 9 through VIII 16 have the same internal structure. Included in a drive unit 66 in FIG. 12 are a current injection unit 67 and a signal superimposing unit 68. The current injection unit 67 controls the bias values of currents that, in consonance with a wavelength control signal from the wavelength control unit 36, are to be introduced into a light emitting region 72, a phase control region 71, and a DBR region 70 of a DBR tunable laser diode (TLD) 69, and thus adjusts the transmission wavelengths to $\lambda 1$ through $\lambda 8$. The signal superimposing unit 68 superimposes an electric signal from the buffer on a bias current from the current injection unit 67, and permits the DBR tunable laser to emit an optical signal having an intensity that is modulated by a predetermined wavelength. The DBR region 70 is employed to change the refractive index and the transmission wavelength in consonance with the quantity of a carrier that is introduced. The phase control region 71 is employed to match the phase of the transmission wavelength in the DBR region with its phase in the light emitting region 72. The light emitting region 72 is an active region for laser oscillation. A diffraction grating is employed to unitize the transmission wavelength.

In the first embodiment of the present invention, the contents of the wavelength control tables I through VIII are set as is shown in Table 1. In Table 1, the wavelengths are entered that are transmitted by the variable wavelength transmission units I through VIII under the control of the wavelength control unit 36. The offset values for the buffer control table I through VIII are set as is shown in Table 2.

TABLE 1

| Table Name | Address | | | | | | | |
|---|---|---|---|---|---|---|---|---|
| | 0 | 1 | 2 | 3 | 4 | 5 | 6 | 7 |
| Wavelength Control Table I | $\lambda 1$ | $\lambda 3$ | $\lambda 5$ | $\lambda 7$ | $\lambda 8$ | $\lambda 6$ | $\lambda 4$ | $\lambda 2$ |
| Wavelength Control Table II | $\lambda 2$ | $\lambda 1$ | $\lambda 3$ | $\lambda 5$ | $\lambda 7$ | $\lambda 8$ | $\lambda 6$ | $\lambda 4$ |
| Wavelength Control Table III | $\lambda 4$ | $\lambda 2$ | $\lambda 1$ | $\lambda 3$ | $\lambda 5$ | $\lambda 7$ | $\lambda 8$ | $\lambda 6$ |
| Wavelength Control Table IV | $\lambda 6$ | $\lambda 4$ | $\lambda 2$ | $\lambda 1$ | $\lambda 3$ | $\lambda 5$ | $\lambda 7$ | $\lambda 8$ |
| Wavelength Control Table V | $\lambda 8$ | $\lambda 6$ | $\lambda 4$ | $\lambda 2$ | $\lambda 1$ | $\lambda 3$ | $\lambda 5$ | $\lambda 7$ |
| Wavelength Control Table VI | $\lambda 7$ | $\lambda 8$ | $\lambda 6$ | $\lambda 4$ | $\lambda 2$ | $\lambda 1$ | $\lambda 3$ | $\lambda 5$ |
| Wavelength Control Table VII | $\lambda 5$ | $\lambda 7$ | $\lambda 8$ | $\lambda 6$ | $\lambda 4$ | $\lambda 2$ | $\lambda 1$ | $\lambda 3$ |
| Wavelength Control Table VIII | $\lambda 3$ | $\lambda 5$ | $\lambda 7$ | $\lambda 8$ | $\lambda 6$ | $\lambda 4$ | $\lambda 2$ | $\lambda 1$ |

TABLE 2

| Table Name | Address | | | | | | | |
|---|---|---|---|---|---|---|---|---|
| | 0 | 1 | 2 | 3 | 4 | 5 | 6 | 7 |
| Buffer Control Table I | A1 | A3 | A5 | A7 | A8 | A6 | A4 | A2 |
| Buffer Control Table II | A2 | A1 | A3 | A5 | A7 | A8 | A6 | A4 |
| Buffer Control Table III | A4 | A2 | A1 | A3 | A5 | A7 | A8 | A6 |
| Buffer Control Table IV | A6 | A4 | A2 | A1 | A3 | A5 | A7 | A8 |
| Buffer Control Table V | A8 | A6 | A4 | A2 | A1 | A3 | A5 | A7 |
| Buffer Control Table VI | A7 | A8 | A6 | A4 | A2 | A1 | A3 | A5 |
| Buffer Control Table VII | A5 | A7 | A8 | A6 | A4 | A2 | A1 | A3 |
| Buffer Control Table VIII | A3 | A5 | A7 | A8 | A6 | A4 | A2 | A1 |

These tables are synchronously read by the ROM counter 65. Thus, in one cycle the transmission wavelength for each of the variable wavelength transmission units are shifted in the order of $\lambda 1$, $\lambda 3$, $\lambda 5$, $\lambda 7$, $\lambda 8$, $\lambda 6$, $\lambda 4$, and $\lambda 2$. Since the wavelengths are shifted cyclically with a predetermined pattern, the maximum value for changes in the wavelengths can be reduced. For example, if the wavelengths are changed according to the ascending order $\lambda 1$, $\lambda 2$, $\lambda 3$, $\lambda 4$, $\lambda 5$, $\lambda 6$, $\lambda 7$ and $\lambda 8$, the magnitude of the change in a wavelength when it is shifted from $\lambda 8$ to $\lambda 1$ will be great. However, as the shifting order is set in the above described manner, great changes in the wavelengths can be avoided. And as a result, the load placed on the device can be decreased and the reliability of the control process can be enhanced.

High speed changes can also be performed.

In addition, as is shown in Table 1, the phases, of the transmission wavelengths of the respective variable wavelength transmission units that are cyclically changed, are shifted relative to each other so that two or more variable wavelength transmission units do not use the same wavelength when transmitting data. In this manner, the transmission wavelength control pattern is determined by the wavelength control tables I through VIII.

Referring to Tables 1 and 2, when the transmission wavelength of the variable wavelength transmission unit is $\lambda 1$, the start address A1 in a memory region I 41, is assigned for the offset that is employed for reading the dual port memory in the buffer. Similarly, when the transmission wavelength is $\lambda 2$, $\lambda 3$, $\lambda 4$, $\lambda 5$, $\lambda 6$, $\lambda 7$, or $\lambda 8$, a value in a corresponding memory region, II 42, III 43, IV 44, V 45, VI 46, VII 47, or VIII 48, is assigned for the offset. The memory regions I 41 through VIII 48 correspond to the numbers of the output terminals at which the values are to be output, i.e., the transmission wavelengths. Therefore, the wavelength control tables are set as is shown in Table 1, and then the buffer control tables are set as is shown in Table 2, so that the reading of the packet data that are stored in the individual buffers is controlled until the wavelength of the data matches the reception wavelength of the reception unit, which corresponds to an output terminal at which data are to be output.

Figure 13C:
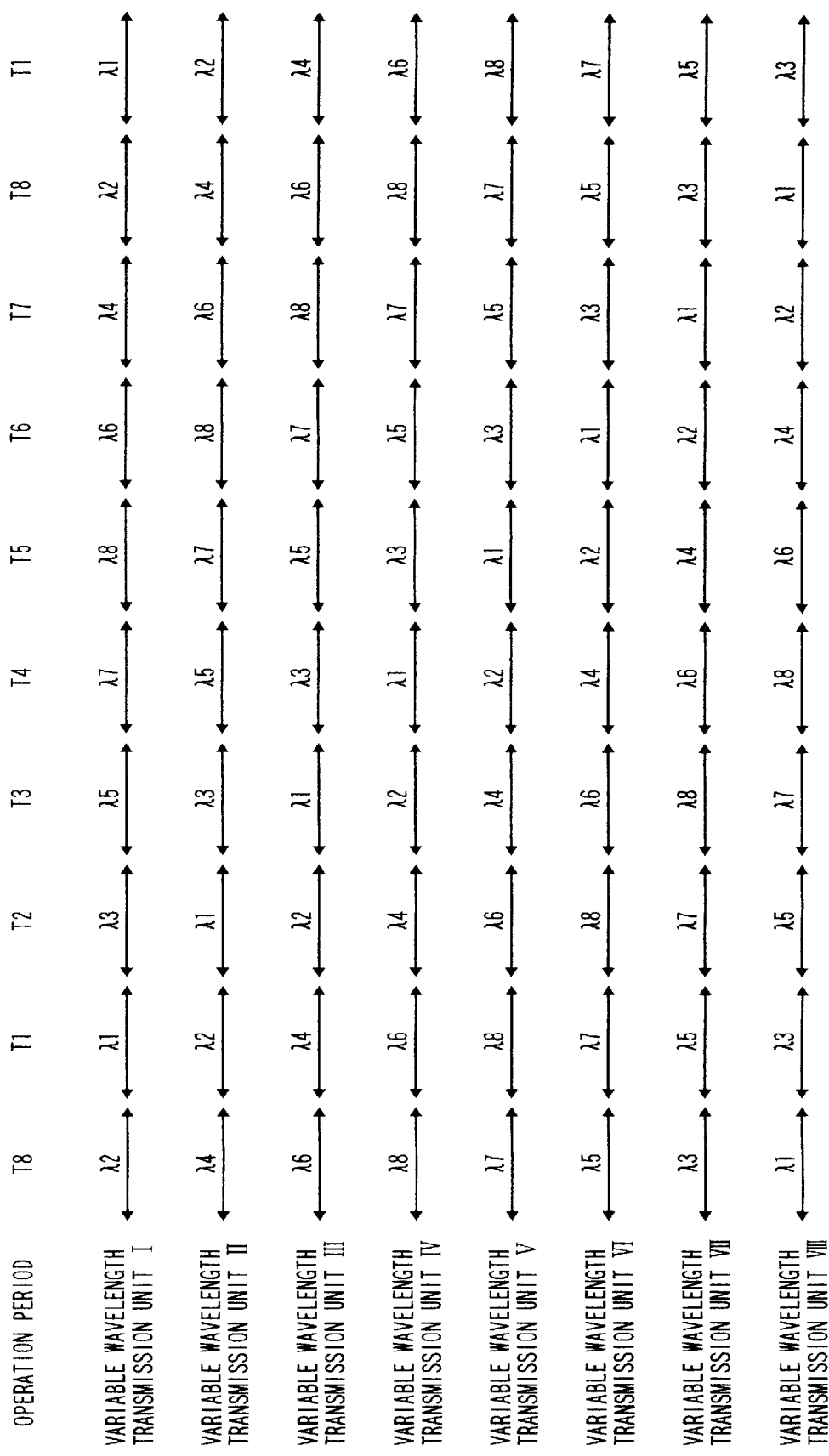

The operation for the first embodiment of the present invention will be explained while referring to FIGS. 7 through 12 and the time charts in FIGS. 13A to 13C. An example will be employed wherein packets (packets I through VIII) are simultaneously and respectively input at eight input terminals, with all of these packets being output at an output terminal I, which is connected to the reception unit I.

In the following explanation, the same reference numbers as are used in FIGS. 7 through 13C are employed to denote components that have corresponding or identical internal structures.

The operation of the switching device of the present invention is performed in eight sequential operation periods, T1, T2, T3, T4, T5, T6, T7, and T8. For this example, let us presume that the operation period during which the eight packets (packets I through VIII) are input is T8.

When the packets are input at the input terminals during the operation period T8, the decoders 37 of the buffers II through VIII, respectively, read the address portions of the input packets. Since the output terminal at which all the input packets are to be output is the output terminal I, which is connected to the reception unit I that receives an optical signal of wavelength λ1, each decoder 37 decodes the address portion and outputs A1 as a writing start address to the writing address counter 38. The writing address counter 38 loads the writing start address, generates a writing address for the input packet data by sequentially incrementing the counter value, and outputs the writing address to the dual port memory 39. The packet data that are input at the input terminal are transmitted to the input port of the dual port memory 39, and are written in order to the memory region I in consonance with the address that is output by the address counter 38. Thus, each of the eight packets that have been input during the operation period T8 is written to the memory region I 41 of the dual port memory 39, in the corresponding buffer, in such a manner that packet I is written to the memory region I 41 of the dual port memory 39 in the buffer I 1, and packet II is written to the memory region I 41 of the dual port memory 39 in the buffer II 2.

In the succeeding operation period T1, "0" is output as a reading address by the ROM counter 65 of the wavelength control unit 36 to the wavelength control tables I through VIII simultaneously. The contents of the wavelength control tables are read in consonance with the address. The content of each table that is read at this time are control signals that correspond to wavelengths, as is shown in Table 1. That is, a control signal that is read from the wavelength control table I corresponds to the wavelength λ1, and similarly, control signals that are read from the wavelength control tables II, III, IV, V, VI, VII and VIII correspond respectively to the wavelengths λ2, λ4, λ6, λ8, λ7, λ5, and λ3. These control signals are respectively transmitted to the drive units 66 of the variable wavelength transmission units I 9 through VIII 16. In each of the drive units 66, an injection current in the current injection unit 67 is determined in consonance with the received control signal, and a predetermined wavelength is set as the transmission wavelength for the tunable laser diode (TLD).

Concurrently, during the operation period T1, the reading address 0 that is output by the ROM counter 65, of the wavelength control unit 36, is also transmitted to the buffer control tables of the buffer control unit 35. The contents of the buffer control tables I through VIII are read in consonance with this address. More specifically, as is shown in Table 2, offset A1, which corresponds to the memory region I, is read from the buffer control table I. Similarly, the offsets A2, A4, A6, A8, A7, A5, and A3, which correspond respectively to the memory regions II, IV, VI, VIII, VII, V, and III, are read from the buffer control tables II, III, IV, V, VI, VII and VIII. These offsets are output to the reading address counters 40 of the respective buffers I 1 through VIII 8.

In the buffer I 1, the reading address counter 40 loads the offset A1 that is output by the buffer control table I 49, sequentially increments the counter value to generate a reading address for reading the packet I that is written in the memory region I; and outputs the reading address to the dual port memory 39. In consonance with this reading address, the packet I is read and, at the output port of the dual port memory 39, is output to the variable wavelength transmission unit I 9.

Concurrently, in the buffer II 2, the offset A2 that is output from the buffer control table II 50, is loaded in the reading address counter 40, and in the same manner as in the buffer I 1, a packet that is written in the memory region II 42 is read from the dual port memory 39 and is output to the variable wavelength transmission unit II 10. At this time, since the packet II is written in the memory region I 41, the packet that is read from the memory region II 42 differs from the packet II, and is a packet that was written before the operation period T8 began. In the same manner, packets are read from the memory region IV of the buffer III 3, the memory region VI of the buffer IV 4, the memory region VIII of the buffer V 5, the memory region VII of the buffer VI 6, the memory region V of the buffer VII 7, and the memory region III of the buffer VIII 8, and are output to the variable wavelength transmission units III 11 through the VIII 16, respectively. The packets that are read at this time are those that were written in the individual buffers before the operation period T8 began, as in the buffer II 2.

Upon the receipt of packet data from the buffers I 1 through VIII 8, the respective variable wavelength transmission units I 9 through VIII 16 convert the wavelengths of the packet data into predetermined wavelengths in consonance with the wavelength control signals that are output by the wavelength control unit 36, and emit the converted signals to the star coupler 17. As is described above, the wavelengths of the optical signals that are emitted are λ1, from the variable wavelength transmission unit I 9; λ2, from the variable wavelength transmission unit II 10; λ4, from the variable wavelength transmission unit III 11; λ6, from the variable wavelength transmission unit IV 12; λ8, from the variable wavelength transmission unit V 13; λ7, from the variable wavelength transmission unit VI 14; λ5, from the variable wavelength transmission unit VII 15; and λ3, from the variable wavelength transmission unit VIII 16. Since the wavelengths of the optical signals that are emitted by the eight variable wavelength transmission units are different from each other and are under the control of the wavelength control unit 36, when these signals are mixed by the star coupler 17 they do not affect each other, and optical signals for all the wavelengths are transmitted to the filters I 18 through VIII 25.

The filter I 18 transmits only the optical signal that has the wavelength λ1. Among the optical signals that have the eight wavelengths λ1 through λ8, optical signals that have the wavelengths other than λ1 are intercepted, and only the optical signal that has the wavelength λ1 is transmitted to the reception unit I 26. The optical signal that has the wavelength λ1 is the packet I that was written in the memory region I 41 of the dual port memory 39 in the buffer I 1 during the operation period T8, was read out during the operation period T1, and was converted into the optical signal that has the wavelength λ1 by the variable wavelength transmission unit I 9. The optical signal that has the wavelength λ1 is converted into an electric signal by the reception unit I 26, and the electric signal is output at the output terminal. Likewise, since the filter II only transmits the optical signal that has the wavelength λ2, only the optical signal that has the wavelength λ2 is transmitted to the reception unit II 27, which, in turn, converts the received signal into an electric signal and outputs it at the corresponding output terminal. The data that are to be output are packet data that were written in the memory region II of the dual port memory 39 in the buffer II 2 before the operating period T8 began. In the same manner, the filters III 20, IV 21, V 22, VI 23, VII 24, and VIII 25 transmit only the optical signals that have the wavelengths λ3, λ4, λ5, λ6, λ7 and λ8, respectively. Therefore, as is apparent from the wavelength control tables shown in Table 1, the data that are output by the corresponding reception units III 28, IV 29, V 30, VI 31, VII 32 and VIII 33 are packet data that were respectively written in the memory regions III, IV, V, VI, VII and VIII of the individual dual port memories 39 of the buffers VIII 8, III 3, VII 7, IV 4, VI 6 and V 5 before the operation period T8 began.

As is described above, during the operation period T1, the packet I that is written in the memory region I 41 of the dual port memory 39 in the buffer I 1 is read. The packet I is then converted into an optical signal that has the wavelength λ1 by the variable wavelength transmission unit I 9, and the optical signal is converted into an electric signal by the reception unit I 26. Finally, the electric signal is output at the corresponding output terminal I.

During the succeeding operation period T2, "1" is simultaneously output as a reading address by the ROM counter 65 of the wavelength control unit 36 to the wavelength control tables I through VIII. The contents of the wavelength control tables are read in consonance with the address. The content of each table that is read at this time is a control signal that corresponds to the wavelength. That is, a control signal that is read from the wavelength control table I corresponds to the wavelength λ3, as is shown in Table 1. Similarly, control signals that are read from the wavelength control tables II 58, III 59, IV 60, V 61, VI 62, VII 63 and VIII 64 correspond respectively to the wavelengths λ1, λ2, λ4, λ6, λ8, λ7, and λ5. As during the operation period T1, these control signals are respectively transmitted to the drive units 66 of the variable wavelength transmission units I 9 through VIII 16.

Concurrently, as during the operation period T1, the contents of the buffer control tables I 57 through VIII 64 are read out. More specifically, as is shown in Table 2, offset value A3, which corresponds to the memory region I, is read from the buffer control table I 57. Similarly, the offset values A1, A2, A4, A6, A8, A7, and A5 that correspond respectively to the memory regions I, II, IV, VI, VIII, VII, and V are read from the buffer control tables II 58 through VIII 64.

Therefore, during the operation period T2, the variable wavelength transmission unit II 10 is employed to transmit the optical signal that has the wavelength λ1 to the reception unit I 26. A packet signal for the packet II, which was written in the memory region I of the dual port memory 39 in the buffer II 2 during the operation period T8, is sent to the variable wavelength transmission unit II 10. In this manner, during the operation period T2, the packet II at the reception unit I 26 is output to the output terminal I. At this time, under the control of the wavelength control unit 36, the packets, other than the packets III through VIII that were written before the operation period T1 began, are converted into optical signals that have predetermined wavelengths by variable wavelength transmission units other than the variable wavelength transmission unit II 10. These optical signals are emitted to the star coupler 17, pass through the individual filters I 18 through VIII 25, and are respectively converted into electric signals by the reception units. Then, the electric signals are output at the output terminals.

In the same manner, during the operation period T3, the variable wavelength transmission unit III 11 is employed to transmit an optical signal that has the wavelength λ1. The packet signal for the packet III, which was written in the memory region I of the dual port memory 39 in the buffer II 13 during the operation period T8, is converted into an optical signal that has the wavelength λ1 by the variable wavelength transmission unit III 11, and the optical signal is output to the reception unit I 26, which converts that signal into an electric signal. The electric signal is then output at the output terminal I. Similarly, the packet IV, during the operation period T4; the packet V, during the operation period T5; the packet VI, during the operation period T6; the packet VII, during the operation period T7; and the packet VIII, during the operation period T8 are converted into optical signals that have the wavelength λ1 by the respective variable wavelength transmission units. The optical signals are passed through the star coupler 17 and the filter I 18, and are converted into electric signals by the reception unit I 26. The electric signals are output at the output terminal.

As is described above, eight packets, which are simultaneously input at the input terminal during the operation period T8 and which are to be output to the same output terminal, are sequentially output at a predetermined output terminal I during the eight succeeding operation periods.

In the above described manner, the eight packets, packets I through VIII, that are simultaneously input at the eight input terminals during the operation period T8 are sequentially output at a predetermined output terminal during the eight succeeding operation periods.

As is described above, signals (packets) can be output at a desired output terminal without requiring arbitration. Further, an operation during which an output terminal at which a signal is to be output is determined, and a channel, i.e., a wavelength, is changed in consonance with the determination is not required. The control process is simplified and high speed switching can be provided.

(Embodiment 2)

Figure 14:
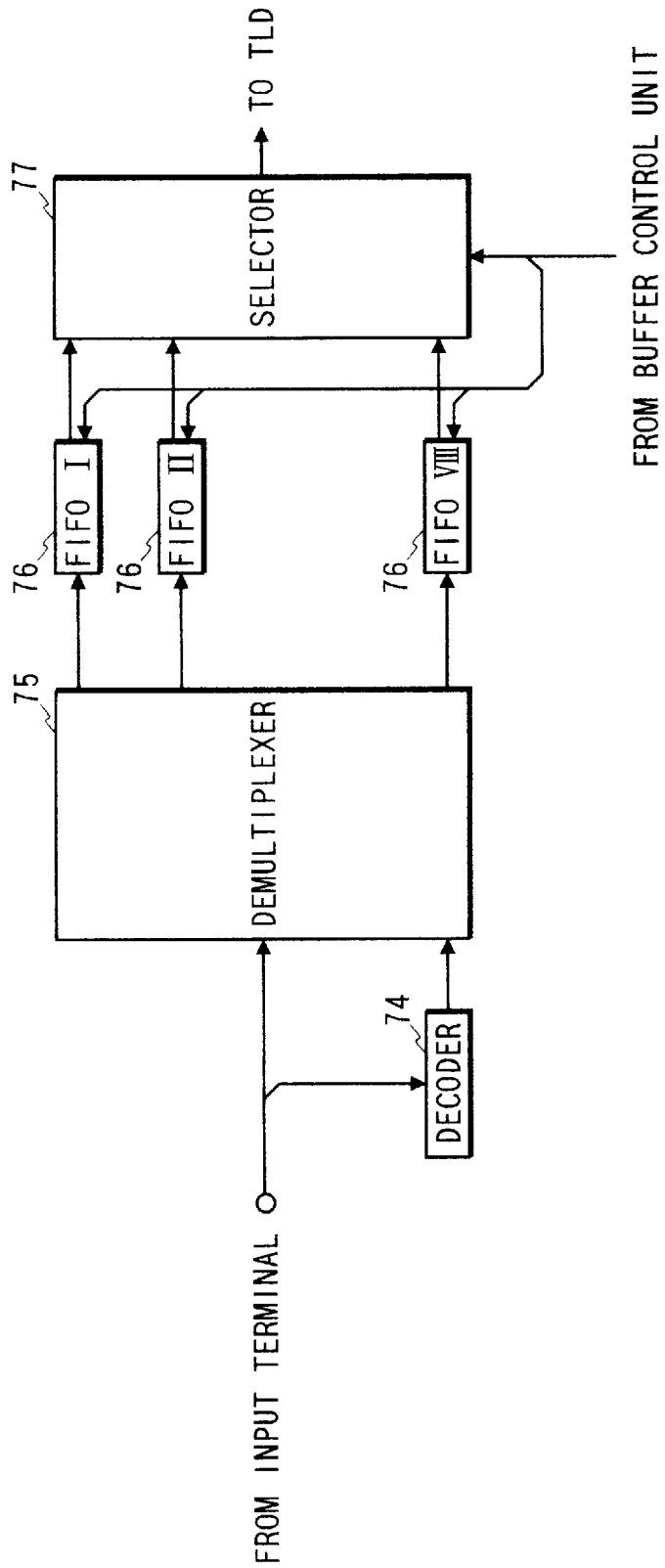
FIG. 14 is a diagram illustrating one arrangement of a buffer according to a second embodiment of the present invention.

FIG. 14 is a diagram showing another internal arrangement of one of the buffers I 1 through VIII 8 in the first embodiment of the present invention.

In FIG. 14, a decoder 74 reads the address portion of an input packet, selects an FIFO to which the packet is to be written, and issues a selection instruction to a demultiplexer 75. In response to the instruction from the decoder 74, the demultiplexer 75 outputs to a predetermined FIFO a packet signal that is received at the input terminal. FIFO I through VIII 76 are provided for individual transmission wavelengths. A packet signal that is output from the demultiplexer 75 is temporarily stored in the FIFO, and is read out in consonance with an instruction from the buffer control unit. A selector 77 selects a specific FIFO from the FIFO I through VIII in consonance with a control signal from the buffer control unit, and outputs a select signal to the variable wavelength transmission unit.

Table 3 shows example buffer control tables that are employed by the buffer shown in FIG. 14. The numbers of the FIFO that are to be read are indicated. The structure of the buffer control unit is the same as in FIG. 10.

TABLE 3

| Table Name | Address | | | | | | | |
|---|---|---|---|---|---|---|---|---|
| | 0 | 1 | 2 | 3 | 4 | 5 | 6 | 7 |
| Buffer Control Table I | I | III | V | VII | VIII | V | IV | II |
| Buffer Control Table II | II | I | III | V | VII | VIII | VI | IV |
| Buffer Control Table III | IV | II | I | III | V | VII | VIII | VI |
| Buffer Control Table IV | VI | IV | II | I | III | V | VII | VIII |
| Buffer Control Table V | VIII | VI | IV | II | I | III | V | VII |
| Buffer Control Table VI | VII | VIII | VI | IV | II | I | III | V |
| Buffer Control Table VII | V | VII | VIII | VI | IV | II | I | III |
| Buffer Control Table VIII | III | V | VII | VIII | IV | IV | II | I |

In this embodiment, in each of the operation periods, one of the FIFO that are shown in the buffer control tables in FIG. 10 is selected, a packet signal that is written in the selected FIFO is read and output to the corresponding variable wavelength transmission unit. For example, during the operation period T1, the FIFO I 76 is selected for the buffer I 1, and a packet signal that is written therein is read and output to the variable wavelength transmission unit I 9.

In this embodiment, as the employment of a plurality of FIFO does not, as in the first embodiment, make it necessary to provide the offset values to the reading counter, the structure of the buffer unit can be simplified.

(Embodiment 3)

Figure 15:
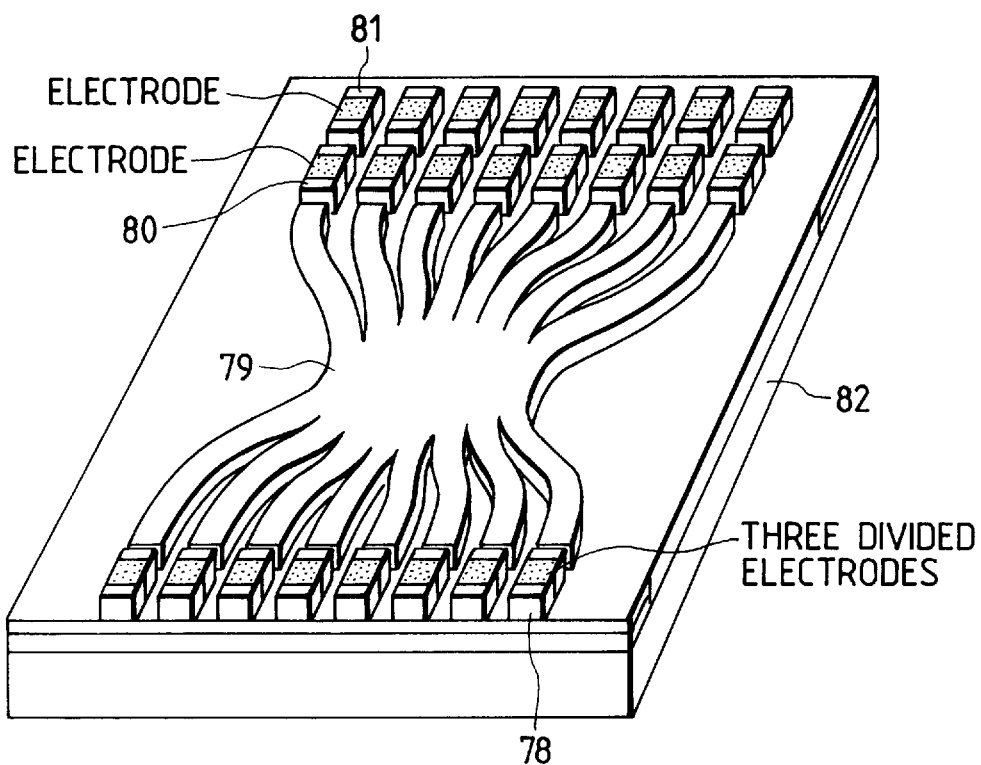
FIG. 15 is a diagram illustrating the structure of a third embodiment of the present invention.

FIG. 15 is a perspective view of an optical integration circuit, which is employed in the switching device of the present invention, wherein an 8×8 semiconductor optical waveguide star coupler, eight wavelength varying DFB (Distributed Feed Back) lasers, eight optical band-pass filters as wavelength fixing filters, and eight pin photodiodes are monolithically integrated on a semiconductor substrate.

A wavelength varying DFB laser 78 as a tunable laser of several hundreds of microns, has three separate electrodes, and controls transmission wavelengths by changing the ratio for the introduction of a current at each electrode. A star coupler 79 equalizes, in its mode mixed region, the strength of multiple optical signals, which have wavelengths that are output by the wavelength varying DFB lasers 78, and outputs light having an equal strength for each wavelength from a corresponding output terminal. Numeral 80 designates a wavelength fixing filter in which a predetermined quantity of current is injected into an electrode thereof to permit the passage of only an optical signal that has a specific predetermined wavelength from among those for the multiple optical signals that are outputted by the star coupler 79. A pin photodiode 81 receives an optical signal that has a predetermined wavelength which is passed through the wavelength fixing filter 80. An InP substrate 82 is employed on which the 8×8 semiconductor optical waveguide star coupler 79, the eight wavelength varying DFB lasers 78, the eight wavelength fixing filters 80, and the eight pin optical detectors 81 are monolithically integrated.

The optical integration circuit is fabricated by three MOVPE growths. As the first growth, an InGaAs/InGaAsP superlattice layer, which is an active layer, and an InGaAsP guide layer are grown on the n-InP substrate and form an active layer for the wavelength varying DFB laser and the wavelength wavelength filter, and a light absorption layer for the pin optical detector. After a diffraction grating of the wavelength varying DFB layer and the wavelength fixing filter is formed, etching of only a portion for forming an 8×8 semiconductor optical waveguide star coupler is performed until the substrate is exposed. For the second growth, growing of either the InGaAsP optical waveguide layer or the non-doping InP layer is selected. As the second growth, the laser and optical detector abut on and contact the optical waveguide. At the third growth, a p-InP clad layer and a p+-InP cap layer are grown across the entire surface. Thereafter, the epitaxial growing procedure is terminated. Finally, the horizonal closing of the individual devices can be accomplished with the strip loading structure whereby mesa processing is performed on the InP clad layer using etching. The three divided electrodes are formed on the DFB laser, one electrode is formed on the wavelength fixing filter, and one electrode is formed on the optical detector. As a result, an optical integration circuit in FIG. 15 has been fabricated.

Figure 16:
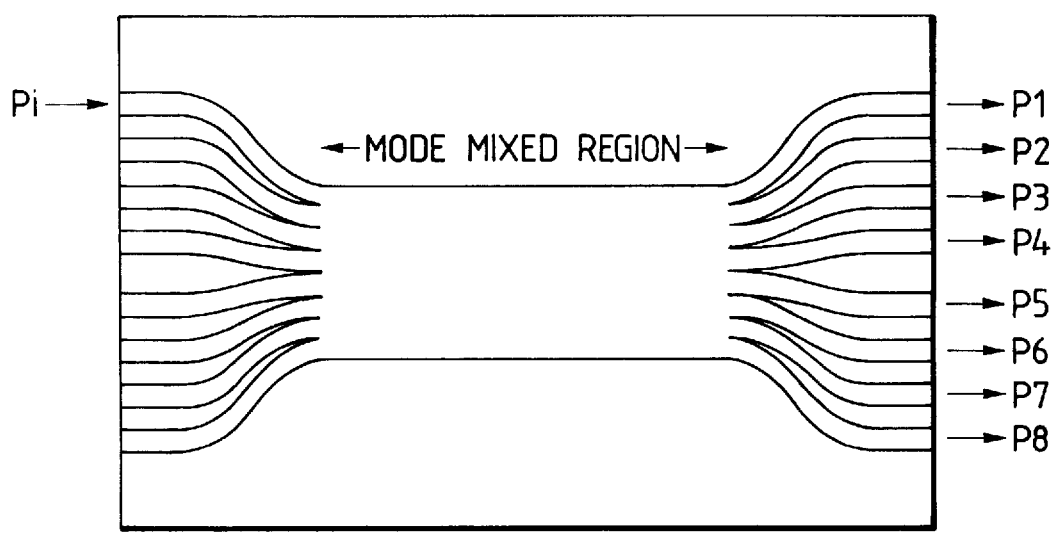
FIG. 16 is a diagram illustrating one structure of a star coupler in the third embodiment of the present invention.

FIG. 16 is a schematic diagram showing the 8×8 semiconductor optical waveguide star coupler that is formed on the semiconductor substrate.

An InGaAsP optical waveguide layer, a non-doping InP layer, and a P-InP clad layer are formed on the n-InP substrate in the named order, and etching is performed on the resultant structure to provide the star-shaped 8×8 optical waveguide shown in FIG. 15. In the process for providing the star-shaped 8×8 waveguide, a mode mixed region is formed wherein optical power is equally distributed to each optical waveguide that is output, regardless of the incident light conditions.

Figure 17:
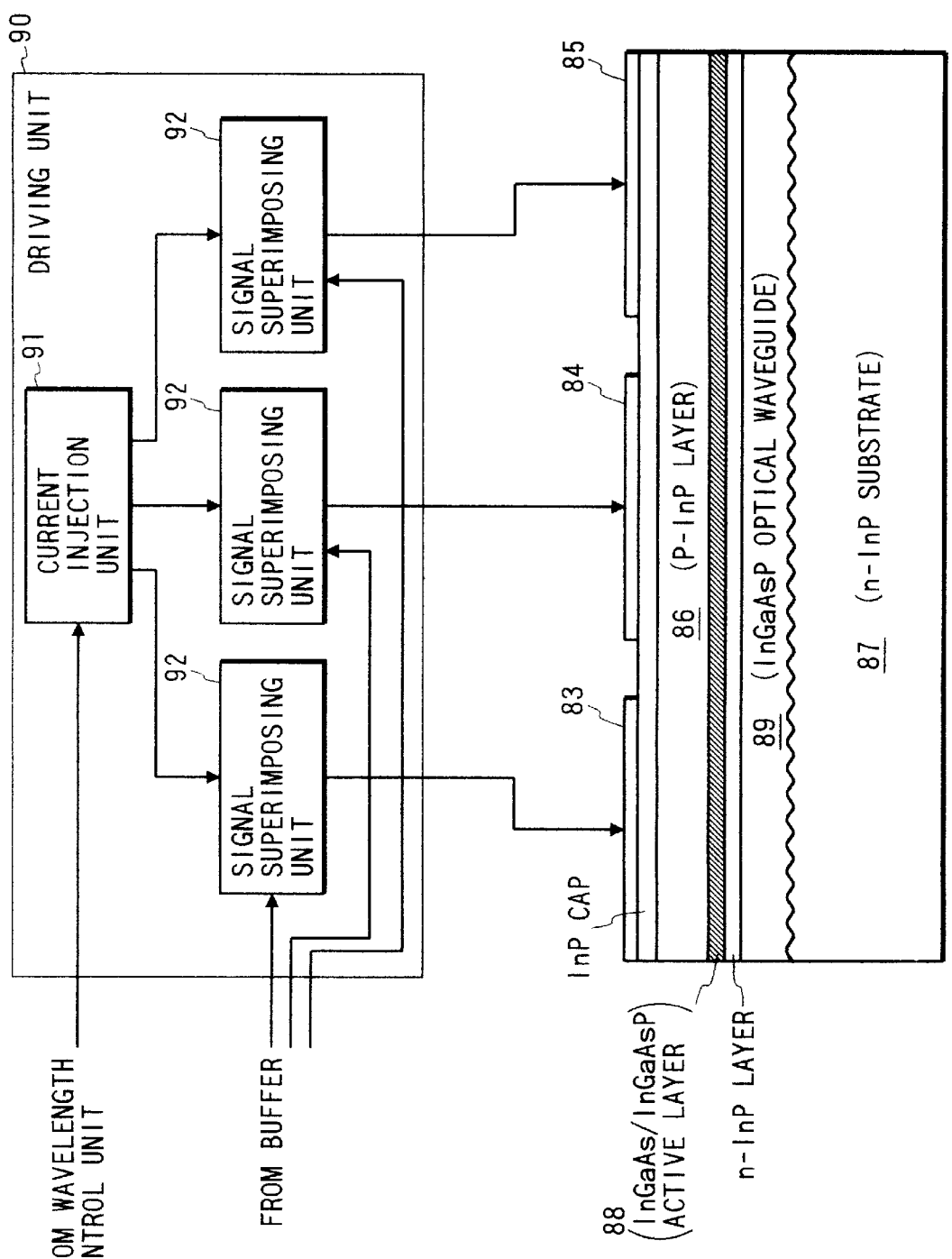
FIG. 17 is a diagram illustrating one structure of a variable wavelength transmission unit according to the third embodiment of the present invention.

FIG. 17 is a diagram illustrating the internal structure of one of the wavelength varying DFB lasers I through VIII that are shown in FIG. 15 (previously described). The wavelength varying DFB lasers I through VIII have the same internal structure. In FIG. 17, reference numbers 83, 84 and 85 denote electrode 1, electrode 2, and electrode 3, respectively. A p+-InP cap layer is formed under each electrode to obtain a preferable ohmic contact with the electrode. A p-InP clad layer and an n-Inp substrate 87 function as closing carriers in the active layer, which is a InGaAs/InGaAsP superlattice active layer 88. The InGaAs/InGaAsP superlattice active layer 88 which assumes the quantum effect re-couples emitted light and generates induced emitted light. An InGaAsP guide layer 89 permits the induced emitted light that is generated by the InGaAs/InGaAsP active layer 88 to pass. The diffraction grating that is formed in the InGaAsP guide layer reflects only light of a predetermined wavelength that has passed through the InGaAsP guide layer. A driver unit 90 includes a current injection unit 91 and signal superimposing units 92. In consonance with a wavelength control signal, the current injection unit 91 controls the ratio of a current that is introduced at electrodes 1 and 3 to a current that is introduced at electrode 2, and adjusts the introduced current. The signal superimposing units 92 each superimpose an electric signal, which is received from a buffer, on a bias current, which is sent from the current injection unit 91, to permit the DFB tunable laser to emit an optical signal whose intensity is modulated with a predetermined wavelength. The transmission wavelength of the wavelength varying DFB laser is controlled in consonance with the ratio of a current that is introduced at electrodes 1 and 3 to a current that is introduced at electrode 2. The structure of the wavelength varying DFB laser is not limited to the three division electrode structure described above, and a wavelength varying DFB laser with a two division electrode structure may be employed.

In this embodiment, the size of the switching device of the present invention can be reduced. Further, compared with an arrangement wherein the tunable laser diode (TLD), the star coupler, the photodiode are constituted by discrete devices, the reliability can be enhanced.

(Embodiment 4)

Figure 18:
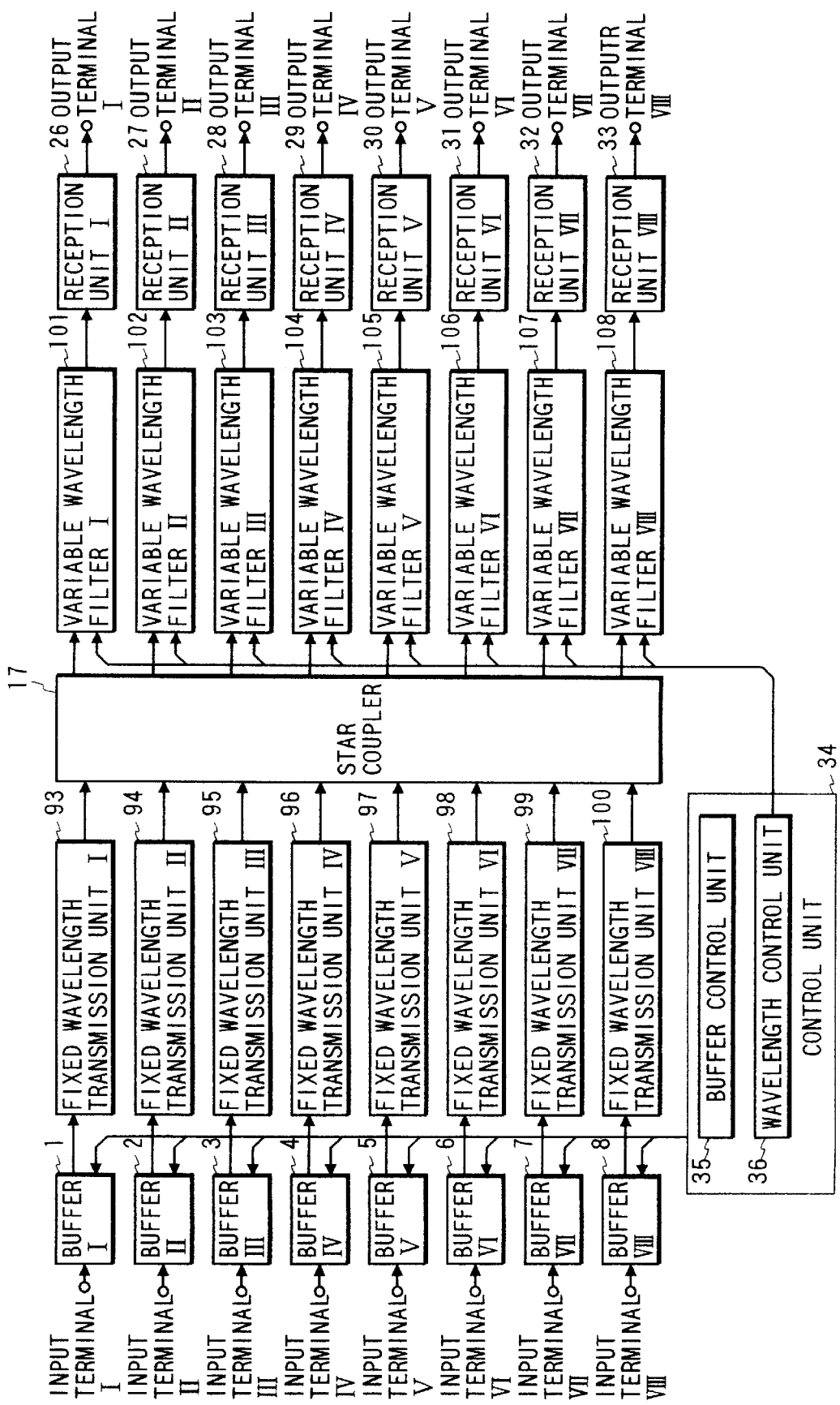
FIG. 18 is a diagram illustrating one structure of a fourth embodiment of the present invention.

FIG. 18 is a diagram illustrating a switching device that has eight input terminals and eight output terminals and that includes eight fixed wavelength transmission units and eight variable wavelength reception units. In FIG. 18, fixed wavelength transmission units I 93 through VIII 100 convert electric signals that are output by the buffer means into optical signals that have different fixed wavelengths, and output the optical signals. Each of the fixed wavelength transmission units I 93 through VIII 100 is, for example, an optical transmitter in which a DFB laser or a DBR laser is mounted, and includes a laser diode drive unit and a wavelength stabilizing unit. The transmission wavelengths are set for the individual fixed wavelength transmission units: $\lambda 1$, for the fixed wavelength transmission unit I 93; $\lambda 2$, for the fixed wavelength transmission unit II 94; $\lambda 3$, for the fixed wavelength transmission unit III 95; $\lambda 4$, for the fixed wavelength transmission unit IV 96; $\lambda 5$, for the fixed wavelength transmission unit V 97; $\lambda 6$, for the fixed wavelength transmission unit VI 98; $\lambda 7$, for the fixed wavelength transmission unit VII 99; and $\lambda 8$, for the fixed wavelength transmission unit VIII 100. Variable wavelength filters I 101 through VIII 108 each permits an optical signal to pass that has a desired wavelength, of eight transmission wavelengths, and blocks optical signals that have other wavelengths. The variable wavelength filters I 101 through VIII 108 are combined with corresponding reception units I 26 through VIII 33 and serve as variable wavelength reception units. A control unit 34 controls the switching operation of the switching device, and comprises a buffer control unit 35 and a wavelength control unit 36. In response to an instruction from the wavelength control unit 36, the buffer control unit 35 reads, from the buffer means, signals that are to be transmitted until the transmission wavelength of the variable wavelength reception unit, which corresponds to an output terminal at which a signal that has been input is to be output, matches the transmission wavelength of the fixed wavelength transmission unit that is connected to the buffer from which an input signal is read. The wavelength control unit 36 controls the transmission wavelengths of the variable wavelength reception units in the same manner as does the transmission wavelength control pattern that is explained in the first embodiment. The wavelength control unit 36 has the same internal structure as that of the wavelength control unit 36 in FIG. 11 in the first embodiment. It should be noted that control signals are transmitted to the drive units of the individual variable wavelength filters. When, for example, fiber Fabry-Pérot filters are used for the variable wavelength filters, a control signal will be a voltage drive type. When a DFB laser filter is used as the wavelength variable filter, a control signal will be a current drive type. Although not shown, a temperature control unit for stabilizing a wavelength is provided in the drive unit of each variable wavelength filter. The other portions are the same as in the first embodiment, and the same reference numbers as are used in the first embodiment are also used to denote corresponding or identical components. In this embodiment, the control tables for the variable wavelength filters is the same as in Table 1, and buffer control tables that correspond to those tables are prepared as in Table 4. The time chart for this embodiment is shown in FIGS. 19A to 19C.

TABLE 4

| Table Name | Address | | | | | | | |
|---|---|---|---|---|---|---|---|---|
| | 0 | 1 | 2 | 3 | 4 | 5 | 6 | 7 |
| Buffer Control Table I | A1 | A2 | A3 | A4 | A5 | A6 | A7 | A8 |
| Buffer Control Table II | A2 | A3 | A4 | A5 | A6 | A7 | A8 | A1 |
| Buffer Control Table III | A8 | A1 | A2 | A3 | A4 | A5 | A6 | A7 |
| Buffer Control Table IV | A3 | A4 | A5 | A6 | A7 | A8 | A1 | A2 |
| Buffer Control Table V | A7 | A8 | A1 | A2 | A3 | A4 | A5 | A6 |
| Buffer Control Table VI | A4 | A5 | A6 | A7 | A8 | A1 | A2 | A3 |
| Buffer Control Table VII | A6 | A7 | A8 | A1 | A2 | A3 | A4 | A5 |
| Buffer Control Table VIII | A5 | A6 | A7 | A8 | A1 | A2 | A3 | A4 |

In FIG. 11, as in the first embodiment, the wavelength control tables I through VIII are sequentially read in consonance with the address values of the respective 3-bit ROM counters 65, and respectively output control signals that have predetermined wavelengths to the drive units of the corresponding variable wavelength filters. Upon receipt of a control signal, each of the variable wavelength filter drive units supplies to a corresponding variable wavelength filter a drive voltage or a drive current that corresponds to a designated wavelength, and the transmission wavelength for the variable wavelength filter is set. The transmission wavelength of each variable wavelength filter is shifted cyclically in the order $\lambda 1, \lambda 3, \lambda 5, \lambda 7, \lambda 8, \lambda 6, \lambda 4$ and $\lambda 2$. The memory regions I through VIII In FIG. 9 correspond respectively to the numbers of output terminals from which a signal is to be output, i.e., to the transmission wavelengths. Since the buffer control tables are set as is shown in Table 4, the reading of the packet data that are stored in the individual buffers is synchronized with the matching of the transmission wavelengths of the variable wavelength filters, which correspond to an output terminal for outputting signals, with the transmission wavelengths of the optical transmitters that are connected to the buffers that read input signals.

The operation in the fourth embodiment of the present invention will now be explained while referring to FIGS. 18 and 8 through 11, and the time charts in FIGS. 19A to 19C by employing an example wherein packets (packets I through VIII) are simultaneously input at eight respective input terminals, with all of these packets to be output at output terminal I, which is connected to a reception unit I 26.

In the operation of the switching device in this embodiment, as in the first embodiment, the packets are read in order under the control of the buffer control unit 35, and are output to respective fixed wavelength transmission units I 93 through VIII 100. Upon receipt of packet data from buffers I 1 through VIII 8, the fixed wavelength transmission units I 93 through VIII 100 convert the packet data into optical signals that have assigned wavelengths, and emit them to a star coupler 17. As is described above, the wavelengths of the emitted optical signals are: $\lambda 1$, from the fixed wavelength transmission unit I 93; $\lambda 2$, from the fixed wavelength transmission unit II 94; $\lambda 3$, from the fixed wavelength transmission unit III 95; $\lambda 4$, from the fixed wavelength transmission unit IV 96; $\lambda 5$, from the fixed wavelength transmission unit V 97; $\lambda 6$, from the fixed wavelength transmission unit VI 98; $\lambda 7$, from the fixed wavelength transmission unit VII 99; and $\lambda 8$, from the fixed wavelength transmission unit VIII 100. Since the optical signals that have different wavelengths are emitted by the eight fixed wavelength transmission units, when they are mixed in the star coupler 17 they do not affect each other, and optical signals that have all the wavelengths enter the variable wavelength filters I 101 through VIII 108. Wavelength control signals that correspond to address 0 in Table 1 are respectively supplied from the individual wavelength tables of the wavelength control unit 136 to the drive units of the variable wavelength filters. The transmission wavelengths of the variable wavelength filters are set in consonance with the received control signals. The set transmission wavelengths are: λ1, for the variable wavelength filter I 101; λ2, for the variable wavelength filter II 102; λ4, for the variable wavelength filter III 103; λ6, for the variable wavelength filter IV 104; λ8, for the variable wavelength filter V 105; λ7, for the variable wavelength filter VI 106; λ5, for the variable wavelength filter VII 107; and λ3, for the variable wavelength filter VIII 108. As the transmission wavelength for the variable wavelength filter I 101 is set to λ1, of those optical signals that have wavelengths λ1 through λ8 and that enter the variable wavelength filter I 101, those whose wavelengths are other than λ1 are blocked, and only an optical signal that has the wavelength λ1 is transmitted to the reception unit I 26. The optical signal that has the wavelength λ1 is the packet I that is written to a memory region I 41 in a dual port memory 39 in the buffer I 1 during the operation period T8, that is read out during the operation period T1, and that is converted into an optical signal that has wavelength λ1 by the fixed wavelength transmission unit I 93. The optical signal that has the wavelength λ1 is converted into an electric signal by the reception unit I 26, and the electric signal is output at an output terminal I. The data that are output at this time are packet data that were written in a memory region II 42 of the dual port memory 39 in the buffer II 2 before the operation period T8 began. Likewise, the transmission wavelengths for the variable wavelength filters III though VIII, 103 through 108, are set respectively to λ4, λ6, λ8, λ7, λ5 and λ3. Therefore, packet data that were written, before the operation period T8 began, in memory regions III through VIII of the dual port memories 39 in the buffers IV 4, VI 6, VIII 8, VII 7, V 5, and III 3 are respectively input to the reception units III through VIII, 28 through 33, as is apparent from the wavelength control tables in Table 1 and the buffer control tables in Table 4.

As is described above, in the operation period T1, the packet I that is written in the memory region I 41 of the dual port memory 39 in the buffer I 1 is read and converted into an optical signal that has the wavelength λ1 by the fixed wavelength transmission unit I 93. The optical signal is then converted to an electric signal by the reception unit I 26 and the electric signal is output at the output terminal I.

During the succeeding operation period T2, "1" is simultaneously output as a reading address to the wavelength control tables I through VIII by the ROM counter 65 of the wavelength control unit 36. The contents of the wavelength control tables are read in consonance with the address. The content of each table that is read at this time is a control signal that corresponds to the wavelength. That is, a control signal that is read from the wavelength control table I corresponds to the wavelength λ3, as is shown in Table 1. Similarly, control signals that are read from the wavelength control tables II 58 through VIII 64 correspond respectively to the wavelengths λ1, λ2, λ4, λ6, λ8, λ7, and λ5. As during the operation period T1, these control signals are respectively transmitted to the drive units of the variable wavelength filters I 101 through VIII 108. Concurrently, as during the operation period T1, the contents of the buffer control tables I 49 through VIII 56 are read out. More specifically, as is shown in Table 4, offset value A2, which corresponds to the memory region II, is read from the buffer control table I. Similarly, the offset values A3, A1, A4, A8, A5, A7, and A6, which respectively that correspond to the memory regions III, I, IV, VIII, V, VII, and VI are read from the buffer control tables II 49 through VIII 56. Therefore, during the operation period T2, the fixed wavelength transmission unit III 95 is employed to transmit the optical signal that has the wavelength λ3 to the reception unit I 26. A packet signal for the packet III that was written in the memory region I of the dual port memory 39 in the buffer III 3 during the operation period T8 is sent to the fixed wavelength transmission unit III 95. In this manner, during the operation period T2 the packet III is output to the output terminal I by the reception unit I 26. Similarly, in the operation period T3, the fixed wavelength transmission unit V 97 is employed to transmit an optical signal that has the wavelength λ5. The packet signal for the packet V that was written in the memory region I of the dual port memory 39 of the buffer V 5 during the operation period T8 is converted into an optical signal that has the wavelength λ5 by the fixed wavelength transmission unit V 97, and the optical signal is output to the reception unit I 26, which converts that signal into an electric signal. The electric signal is then output to the output terminal. Further, in the same manner, during the operation period T4 the packet VII is converted into an optical signal that has the wavelength λ7 by the fixed wavelength transmission unit VII 99 and the optical signal is output. During the operation period T5, the packet VIII is converted into an optical signal that has the wavelength λ8 by the fixed wavelength transmission unit VIII 100 and the optical signal is output. During the operation period T6, the packet VI is converted into an optical signal that has the wavelength λ6 by the fixed wavelength transmission unit VI 98. During the operation period T7, the packet IV is converted into an optical signal that has the wavelength λ4 by the fixed wavelength transmission unit IV 96. During the operation period T8, the packet II is converted into an optical signal that has the wavelength λ2 by the fixed wavelength transmission unit II 94 and the optical unit is output. These optical signals are passed through the star coupler 17 and the variable wavelength filter I 101, and are converted into electric signals by the reception unit I 26. The electric signals are output at the output terminal I. As is described above, when eight packets that are simultaneously input at the input terminals during the operation period T8 have the same destination terminal I, these packets are sequentially output at a desired output terminal I during the eight succeeding operation periods.

FIG. 20 is a diagram illustrating the structure of a wavelength demultiplexer that has a wavelength filtering function that is the equivalent of that which is performed in the variable wavelength transmission units in the fourth embodiment. This structure is disclosed by Toba, et al., in Electronics Letters, vol. 23, 789, 1987. The example in FIG. 20 is designed with Mach-Zehnder interference refractometers that are provided at multiple steps by using 3-dB couplers. Three wavelength multiplexing and demultiplexing devices are connected together by a PANDA fiber, which is a polarization retaining fiber, in order to perform the demultiplexing of eight wavelengths. The transmission wavelength from each of the output portions can be set to a desired wavelength by controlling the electric power that is supplied to a thin film heater.

Figure 21:
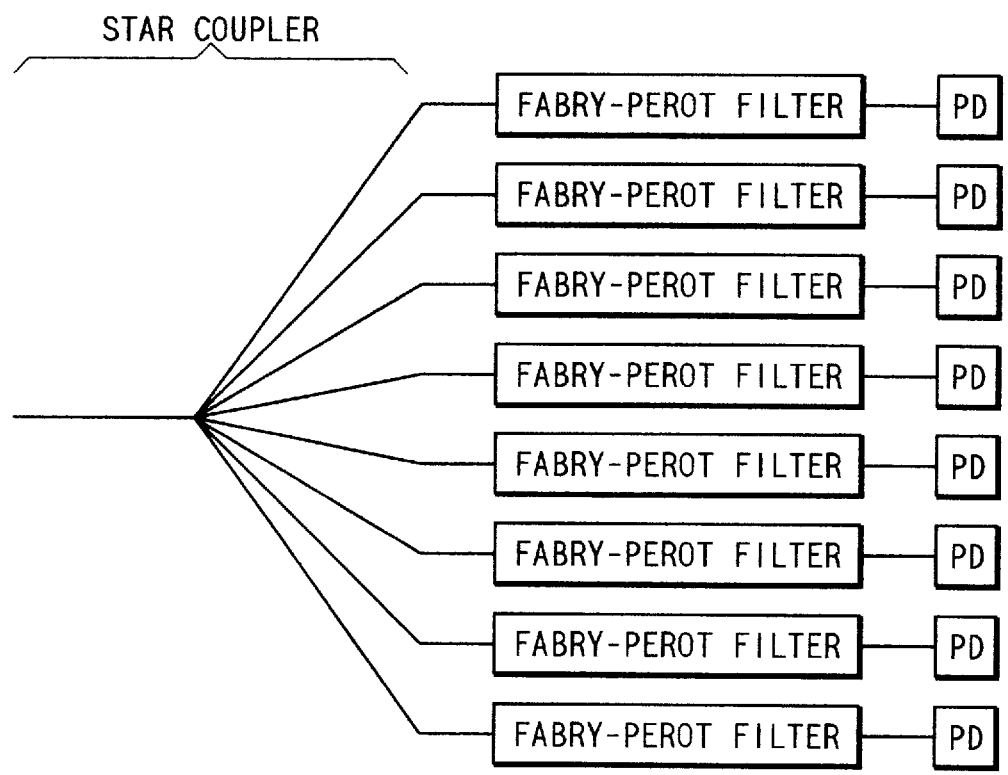
FIG. 21 is a diagram illustrating another structure of the variable wavelength reception unit according to the fourth embodiment of the present invention.
Figure 22:
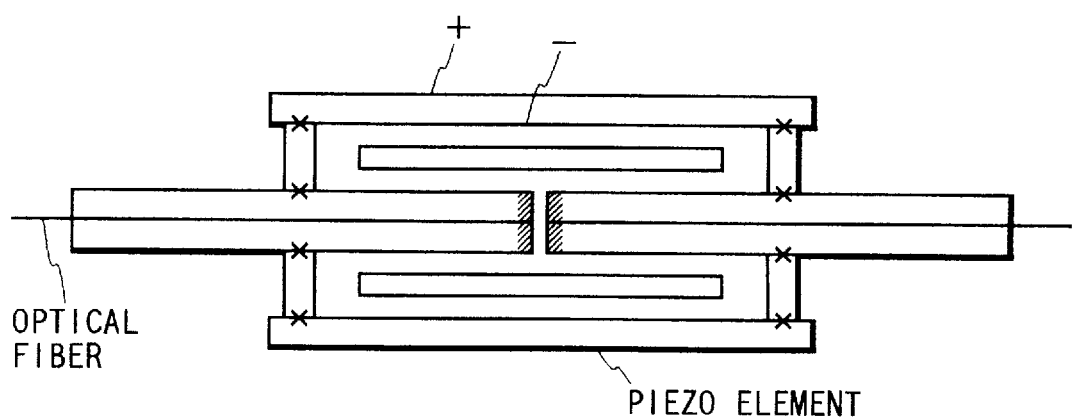
FIG. 22 is a diagram illustrating an additional structure of the variable wavelength reception unit according to the fourth embodiment of the present invention.

FIG. 21 is a conceptual diagram showing the structure wherein an optical signal is branched to eight ports by a star coupler, and a fiber Fabry-Pérot filter that is provided for each port selects a wavelength. The Fabry-Pérot etalons in this example are so prepared, as is shown in FIG. 22, that the end faces of two fibers that face each function other as mirror faces. A piezoelectric element that supports the optical fibers adjusts a gap between them to tune to a wavelength that is to be selected. This arrangement is disclosed by J. Stone et al., in Electronics Letters, vol. 23, 781, 1987.

Since the wavelength filter and the wavelength demultiplexer must be selected while considering the variable range and the wavelength channel interval of a tunable laser diode (TLD), which serves as a transmitter, effective employment of the wavelength filters, such as a Mach-Zehnder interference refractometer and a Fabry-Pérot etalon, can provide an optimal structure for the tunable laser diode (TLD).

Further, a variable wavelength DFB laser can be employed for a variable wavelength reception unit. In this case, data reception is performed by changing a voltage between electrodes due to light that enters a laser. A reception wavelength can be varied by employing the arrangement with multiple electrodes in the same manner as in the oscillation of a laser. With this arrangement, direct light detection can be performed without employing a wavelength filter or a wavelength demultiplexer.

(Embodiment 5)

A network system that employs the switching device according to the first embodiment will now be explained. In this embodiment, a network is provided by connecting eight channels to a plurality of terminal equipments. These channels are multiplexed by multiple optical wavelengths for data transfer. The eight channels have different wavelengths ($\lambda 1, \lambda 2, \lambda 3, \lambda 4, \lambda 5, \lambda 6, \lambda 7$ and $\lambda 8$). The terminal equipments are connected to the respective channels via separation and insertion means. The separation and insertion means are provided in a node device. The structure of the node device is shown in FIG. 23.

Figure 23:
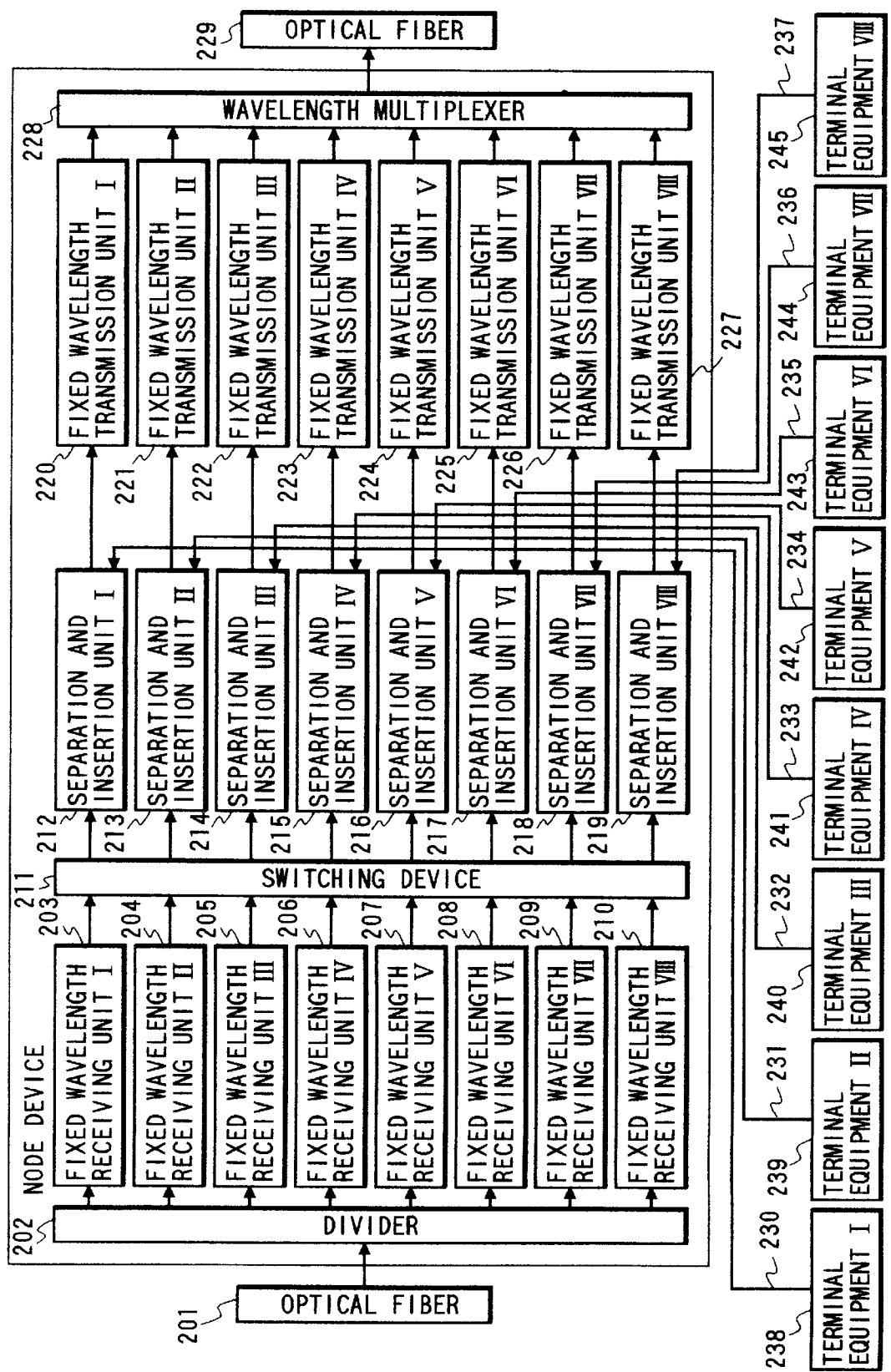
FIG. 23 is a diagram illustrating the structure of a node device that is employed for a fifth embodiment of the present invention.
Figure 24:
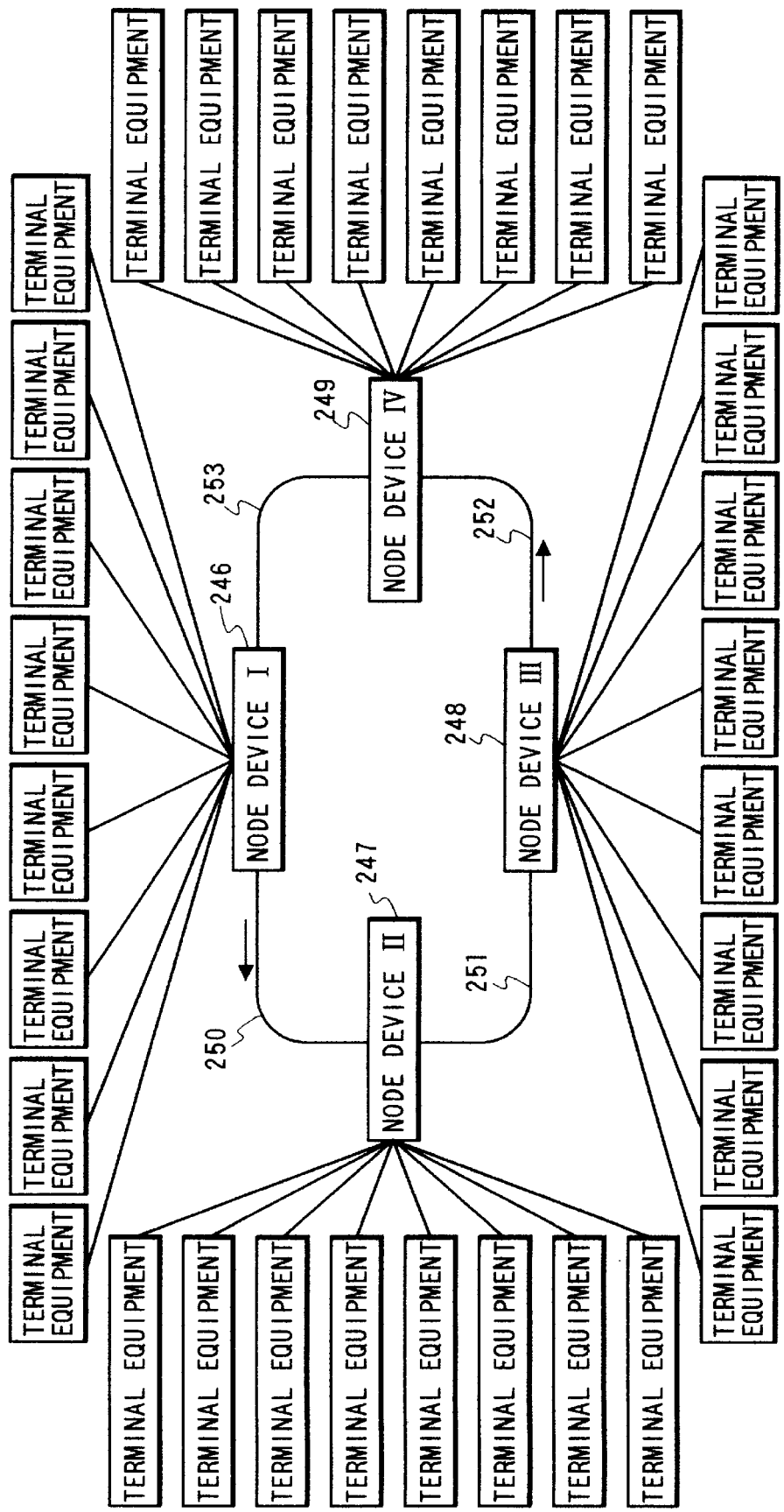
FIG. 24 is a diagram illustrating the arrangement of a network system according to the fifth embodiment of the present invention.

FIG. 24 is a diagram showing an example of a network system that employs the node device shown in FIG. 23. Four node devices are connected in a ring shape by optical fiber cables. Arrows indicate the direction in which packets are sent. The internal arrangement of each of these node devices is as shown in FIG. 23.

In FIG. 23, an optical fiber cable 201 is a physical medium for an optical wavelength multiplexing and transmission path. The optical fiber cable 201 serves as a transmission medium for a multi-channel transmission path between a divider 202 of one node device and a wavelength multiplexer 228 of another node device, which is upstream and adjacent to the other node device, and has channels for wavelengths $\lambda 1, \lambda 2, \lambda 3, \lambda 4, \lambda 5, \lambda 6, \lambda 7$ and $\lambda 8$. The divider 202 divides an optical signal that is transmitted through the optical fiber cable 201 and outputs the divided optical signals to eight fixed wavelength reception units I through VIII, 203 through 210. The fixed wavelength reception units I 203 through VIII 210 are fixed wavelength reception means that employ a photodiode. Their internal structures will be described later. Each of the fixed wavelength reception units I through VIII receives only a packet that is transmitted by using an optical signal that has a corresponding wavelength, $\lambda 1$ to $\lambda 8$. A switching device 211 has its input terminals I through VIII connected respectively to the fixed wavelength reception units I 203 through VIII 210, and have output terminals I through VIII connected to separation and insertion units I 212 through VIII 219, respectively. The input terminal I corresponds to the channel for $\lambda 1$, and the output terminal I corresponds to the input terminal I. The channel for $\lambda 2$ corresponds to the input terminal II, and the output terminal II corresponds to the input terminal II. In the same manner, the other channels correspond to the remaining input terminals and the output terminals correspond to the input terminals. The arrangement of the switching device 211 is the same as in FIG. 7, and switches a packet to a desired channel processing group. Each of the separation insertion units I through VIII, 212 through 219, separates, from packets that are output by the switching device, a packet that is to be transmitted to a terminal equipment via a sub-transmission path, which will be described later, and transmits that packet to the sub-transmission path. The separation and insertion units 212 through 219 also insert packets, which are transmitted from a terminal equipment via the sub-transmission path, into packet streams that are output by the switching device. The internal structure of the separation and insertion unit will be described later. One terminal equipment is connected to each of the separation and insertion units I 212 through VIII 219. The fixed wavelength transmission units I 220 through VIII 227 are fixed wavelength transmission means that employ a semiconductor laser. Each of the fixed wavelength transmission units converts a packet that is received from a corresponding separation and insertion unit into an optical signal that has a predetermined wavelength, and transmits the optical signal via the wavelength multiplexer 228 to an optical fiber cable 229, which is a physical medium for an optical wavelength multiplexing and transmission path. A DFB laser that has a multiple-electrode structure is employed for the semiconductor layer. In this embodiment, since wavelength multiplexing and transmission are performed between the nodes, the quantity of a current that is introduced at each electrode of the DFB laser is controlled, and thus, the transmission wavelengths $\lambda 1$ through $\lambda 8$ are respectively assigned for the fixed wavelength transmission units I 220 through VIII 227. The wavelength multiplexer 228 multiplexes the optical signals that have the wavelengths $\lambda 1$ through $\lambda 8$ and that are transmitted from the respective fixed wavelength transmission units, and emits the resultant signals to the optical fiber cable 229. The optical fiber cable 229, which is a physical medium for the optical wavelength multiplexing and transmission path, serves as a transmission medium for a multichannel transmission path between the wavelength multiplexer of the self node device and the divider of a node device that is adjacent downstream. The sub-transmission paths I 230 through VIII 237 serve as transmission paths for packets between the separation and insertion units and terminal equipments. The terminal equipments I 238 through VIII 245 are connected to the respective sub-transmission paths I through VIII. These terminal equipments receive packets from the separation and insertion units, and prepare packets to be transmitted to other terminal equipments and transmit them via the sub-transmission paths to the respective separation and insertion units.

The fixed wavelength reception unit I 203, the separation and insertion unit I 212, and the fixed wavelength transmission unit I 220 lie along the same channel, and constitute channel processing means for a packet that is sent through the channel with the wavelength $\lambda 1$. Similarly, the fixed wavelength reception unit II 204, the separation and insertion unit II 213, and the fixed waveform transmission unit II 221 constitute channel processing means for a packet that is sent through the channel with the wavelength $\lambda 2$. The same component arrangement can be used for the remaining fixed wavelength reception units, separation and insertion units and fixed wavelength transmission units.

In FIG. 24, eight terminal equipments are connected to each node device I 246 to IV 249 that is shown in FIG. 23 via eight sub-transmission paths. Optical fiber cables 250 through 253 are physical media for optical wavelength multiplexing and transmission paths. The optical fiber cables 250 through 253 correspond to the optical fiber cables 201 and 229 in FIG. 23 in the following manner. That is, for the node device I 246, the optical fiber cable 201 in FIG. 23 corresponds to the optical fiber cable 253 in FIG. 24 and the optical fiber cable 229 in FIG. 23 corresponds to the optical fiber cable 250 in FIG. 24. For the node device II 247, the optical fiber cable 201 in FIG. 23 corresponds to the optical fiber cable 250 in FIG. 24, and the optical fiber cable 229 in FIG. 23 corresponds to the optical fiber cable 251 in FIG. 24. The same thing can be applied for the node devices III 248 and IV 249.

The fixed wavelength reception units I 203, the separation and insertion units I 212, and the fixed wavelength transmission units I 220 of these four node devices I 246 through IV 249 lie along the same channel, and constitute a channel processing group I for a packet that is sent through the channel with the wavelength λ1. Similarly, the fixed wavelength reception units II 204, the separation and insertion units II 213, and the fixed wavelength transmission units II 221 of the four node devices constitute a channel processing group II for a packet that is sent through the channel with the wavelength λ2. The remaining fixed wavelength reception units, the separation and insertion units and the fixed wavelength transmission units constitute channel processing groups III through VIII in the same manner.

The switching device 211 alters the channel processing means for processing a packet that is received and changes the transmission of a packet to a desired channel processing group.

In FIG. 25 is shown an example structure of a packet that is employed in the fifth embodiment. A field 254 is employed to hold packet channel identification information. More specifically, a channel address is written to identify a channel processing group that is connected via the sub-transmission path to a packet reception destination terminal equipment. A field 255 is employed to hold packet node device identification information that is written therein. A node address is written to identify a node device that is connected to a packet transmission destination terminal equipment. Data 256 are carried in this packet. Tables 5 and 6 show respective node addressees of individual node devices and channel addressees that are employed to identify channel processing groups.

TABLE 5

| Node Device | Node Address |
| --- | --- |
| Node Device I | 1 |
| Node Device II | 2 |
| Node Device III | 3 |
| Node Device IV | 4 |

TABLE 6

| Wavelength Used For Channel Processing Group | Channel Address |
| --- | --- |
| λ1 | 1 |
| λ2 | 2 |
| λ3 | 3 |
| λ4 | 4 |
| λ5 | 5 |
| λ6 | 6 |
| λ7 | 7 |
| λ8 | 8 |

FIG. 26 is a diagram showing the internal structure of one of the fixed wavelength reception units I 203 through VIII 210 that are employed in the fifth embodiment of the present invention. In FIG. 26, a filter 257 permits only an optical signal to pass that has a predetermined wavelength that is assigned to each fixed wavelength reception unit, and blocks optical signals that have other wavelengths. The transmission wavelengths of the filters of the fixed wavelength reception units are set to: λ1, for the fixed wavelength reception unit I; λ2, for the fixed wavelength reception unit II; λ3, for the fixed wavelength reception unit III; λ4, for the fixed wavelength reception unit IV; λ5, for the fixed wavelength reception unit V; λ6, for the fixed wavelength reception unit VI; λ7, for the fixed wavelength reception unit VII; and λ8, for the fixed wavelength reception unit VIII. Numbers are sequentially assigned to the wavelengths beginning with the shortest wavelength. That is, λ1<λ2<λ3<λ4<λ5<λ6<λ7<λ8. A reception unit 258 that employs a photodiode converts an optical signal that has a predetermined wavelength, and has passed through the filter 257, into an electric signal, and outputs it to a corresponding input terminal of the switching device. The reception unit 258, which incorporates a Pin photodiode (Pin-PD), arranges a waveform using an amplifier, an equalizer, and an identification circuit that are connected to the rear step of the Pin photodiode, and outputs the resultant waveform.

Figure 27:
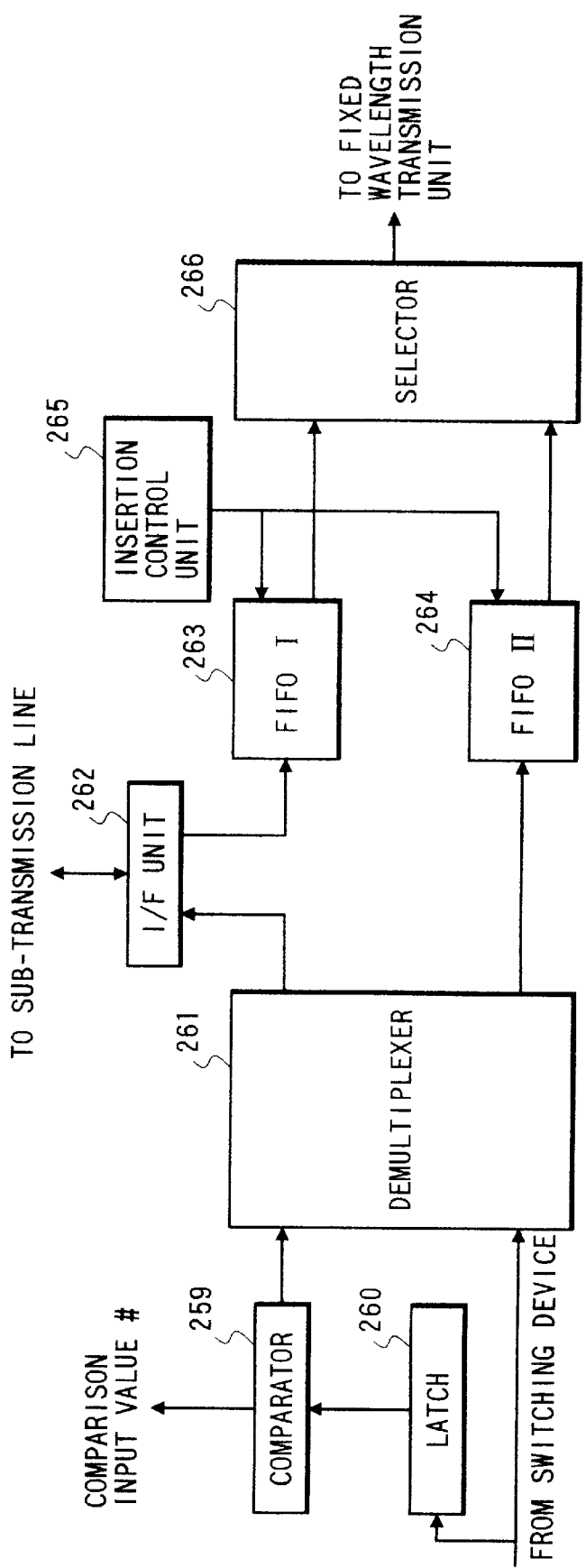
FIG. 27 is a diagram illustrating the structure of a separation and insertion unit according to the fifth embodiment of the present invention.

FIG. 27 is a diagram illustrating the internal arrangement of one of the separation and insertion units I 212 through VIII 219. The separation and insertion units I through VIII have the same internal structure. In FIG. 27, a comparator 259 compares a node address portion, which is included in the node device identification information for a packet that is output from a latch 260, with a comparison input value #. When the values match, the comparator 259 outputs a separation instruction signal to a demultiplexer 261. When the values do not match, the comparator 259 outputs a relay instruction signal. Values shown in Table 5 are employed as the comparison input values # in consonance with the node addresses of the node devices. The latch 260 latches the node address portion of a packet and outputs it to the comparator 259. The demultiplexer 261 outputs the received packet to an I/F unit 262 or to an FIFO II 264 in consonance with a separation instruction or a relay instruction from the comparator 259. The I/F unit 262 transmits a packet that is received from the demultiplexer 261 to a sub-transmission path, and also outputs a packet that is received along the sub-transmission path to the FIFO I 263. The FIFOs 263 and 264 temporarily store received input packets, and under the control of an insertion control unit 265, output them to a selector 266 in the order at which they were input. The insertion control unit 265 controls the reading operations of the FIFO I 263 and the FIFO II 264. In addition, the insertion control unit 265 instructs the selector 266 to select an FIFO and thus inserts a packet that is transmitted along the sub-transmission path into a packet stream that is output by the switching device. Upon the receipt of instruction from the insertion control unit 265, the selector 266 selects an FIFO that holds a packet signal that is to be output, and outputs the packet signal to a fixed wavelength transmission unit.

The operation of the fifth embodiment will now be explained while referring to the drawings. A packet transmission example will be employed wherein a transmission source is the terminal equipment I 238 that is connected to the sub-transmission path I 230 of the node device I 246, and a transmission destination is the terminal equipment V 242 that is connected to the sub-transmission path V 234 of the node device III 248. In the following explanation, the packet that is employed is called packet A, and, for convenience sake, the same reference numbers as are used in the individual drawings are also used to denote corresponding components of different node devices.

In the terminal equipment I 238 that is connected to the sub-transmission path I 230 of the node device I 246, which is a transmission source, a channel address and a node address are added to data that are to be transmitted to the terminal equipment V 242, which is connected to the sub-transmission path V 234 of the node device III 248, to provide the packet A with the structure shown in FIG. 25. The packet A is then transmitted along the sub-transmission path I 230 to the separation and insertion unit I 212 of the node device I 246. At this time, since the channel for the channel processing group of the separation and insertion V 216, to which the transmission destination terminal equipment V 242 is connected via the sub-transmission path 234, i.e., the wavelength employed in this case, is $\lambda 5$, the channel address is set to "5" from Table 6. The node address is set to "3" from Table 5 because the transmission destination of the packet A is the node device III 248.

The I/F unit of the separation and insertion unit I 212 in the node device I 246 writes to the FIFO I 263 the packet A that is transmitted via the sub-transmission unit I 230. After the writing of the packet A to the FIFO I 263 is completed, the insertion control unit 265 detects a gap in the packet flow that is read from the FIFO II 264. The insertion control unit 265 then switches from the FIFO II 264 to the FIFO I 263 to read data which should be output by the selector 266. Following this, the insertion control unit 265 halts the reading from the FIFO II 264 and starts the reading from the FIFO I 263. After the reading of the packet A that is written in the FIFO I 263 is completed, the insertion control unit 265 again switches the FIFO to read data from which the selector should output from the FIFO II 264. The insertion control unit 265 halts the reading from the FIFO I 263 and starts the reading from the FIFO II 264. The packet A that is output by the selector 266 is sent to the fixed wavelength transmission unit I 220. When the packet A is received by the fixed wavelength transmission unit I 220, it is converted by a DFB semiconductor laser of that transmission unit into an optical signal that has the wavelength $\lambda 1$. The optical signal is then emitted to the optical fiber 229 via the wavelength multiplexer 228. The fixed wavelength transmission units I 220 through VIII 227 convert packets that are received from the respective separation and insertion units I 212 through VIII 219 into optical signals that have predetermined wavelengths, and transmit them to the wavelength multiplexer 228. As is described above, for the optical signals that are emitted, the wavelengths $\lambda 1$ through $\lambda 8$ are assigned to the fixed wavelength transmission units I 220 through VIII 227. According to the above description, since the wavelengths of the optical signals that are emitted by the eight fixed wavelength transmission units differ, when they are mixed by the wavelength multiplexer 228 they do not affect each other, and optical signals that have all the wavelengths enter the optical fiber 229 and are transmitted to the adjacent, downstream node device II 247. At this time, the packet A, which has been transmitted to the terminal equipment V 242 that is connected to the sub-transmission path V 234 of the node device III 248, is transmitted as an optical signal that has the wavelength $\lambda 1$ from the fixed wavelength transmission unit I 220 to the node device II 247.

When the packet A has been transmitted as an optical signal that has the wavelength $\lambda 1$ to the node device II 247, the channel processing process group is altered by the node device II 247, and the packet A is sent to a downstream node device along a channel that has the wavelength $\lambda 5$. The optical signals that have the wavelengths $\lambda 1$ through $\lambda 8$, which have been transmitted from the node device I 246 via the optical fiber cable 250, are branched by the divider 202 of the node device II 247, and the branched signals enter the fixed wavelength reception units I 203 through VIII 210. In the fixed wavelength reception unit I 203, only an optical signal that has the wavelength $\lambda 1$ is permitted to pass through the filter 257 to the photodiode (PD) 258. Since the packet A is transmitted from the node device I 246 as the optical signal that has the wavelength $\lambda 1$, it is received by the fixed wavelength reception unit I. The packet A is then output to the switching device 211.

In consonance with the channel address for the input packet, the switching device 211 changes the channel along which the packet is to be sent. Since the value in the channel address portion of the packet A is set to "5", as was previously described, the switching device 211 outputs the packet A to the output terminal equipment V in consonance with that address value.

When the packet A is received by the separation and insertion unit V 216, its node address value is latched by the latch 260 and is output to the comparator 259. The node address of the packet A is set to "3", while the comparison input value # of the comparator of the node device II 247 is set to "2." Since the node address of the packet A does not therefore match the comparison input value # of the comparator 259 of the node device II 247, the comparator 259 outputs a relay instruction signal to the demultiplexer 261. In response to the relay instruction signal, the demultiplexer 261 outputs the input packet A to the FIFO II 264. The packet A that is written in the FIFO II 264 is now read under the control of the insertion control unit 265, is output to the fixed wavelength transmission unit V 224 via the selector 266, and is emitted as an optical signal that has the wavelength $\lambda 5$ and transmitted via the wavelength multiplexer 228 to the optical fiber cable 229. As is described above, when the packet A has been received as an optical signal that has the wavelength $\lambda 1$ by the fixed wavelength reception unit I 203 of the node device II 247, the channel processing group is changed from I to V by the switching device 211, and finally the packet A is transmitted as an optical signal that has the wavelength $\lambda 5$ by the fixed wavelength transmission unit V 224.

After the packet A has been transmitted as an optical signal that has the wavelength $\lambda 5$ from the node device II 247 via the optical fiber cable 251, it is branched by the divider 202 of the node device III 248 and is sent to the fixed waveform reception unit V 207. The packet A is then transmitted from the fixed wavelength reception unit V 207 to the switching device 211. In the same manner as in the node device II 247, the switching device 211 reads a channel address and outputs the packet A from its output terminal V to the separation and insertion unit V 216 (the channel of the packet A has already been changed and a predetermined channel has been assigned, so the switching device 211 does not therefore alter the channel to which the packet A is output). The latch 260 of the separation and insertion unit V 216 latches the node address of the packet A and outputs it to the comparator 259. Since the comparison input value # of the comparator is set to "3", which matches the node address of the packet A, the comparator 259 outputs a separation instruction signal to the demultiplexer 261. In response to the separation instruction signal, the demultiplexer 261 outputs the input packet A to the I/F unit 262. The packet A is then transmitted from the I/F unit 262 along the sub-transmission path V 234 to the terminal equipment V 242 that is the transmission destination. The address portion of the packet A is removed and only the data are extracted, so that the desired processing can be performed.

In the above described manner, the packet A is transmitted from the terminal equipment I 238, which is connected to the sub-transmission path I 230 of the node device I 246, which is a transmission source, to the terminal equipment V 242, which is connected to the sub-transmission path V 234 of the node device VIII 248. That is, the packet A is sent with the waveform λ1 from the fixed waveform transmission unit I 220 of the node device I 246 to the node device II 247. The node device II 247 changes the channel to the one for the channel processing group that includes the separation and insertion unit V 216, to which is connected the sub-transmission path that is the transmission destination at the node device III 248, i.e., to the channel for the channel processing means that corresponds to an optical signal that has the wavelength λ5. Then, the packet A is received by the fixed wavelength reception unit V 207 of the node device III 248, is separated by the separation and insertion unit V 216, and is transmitted via the sub-transmission path V 234 to the terminal equipment V 242.

As is described above, the switching operation for packets is performed separately by a switching device that changes the channels and the separation means that determines whether or not packets that are transmitted along the individual channels should be separated. As a result, the load on the switching process is distributed and very efficient transmission can be provided. Although in this embodiment a switching device is provided for each node device, only one switching device may be provided for a network. In this case, the separation and insertion means must determine whether or not the channel for an input packet has been already changed to a predetermined channel before the means determines whether or not the packet should be separated. When the switching device changes the channel for a packet to a predetermined channel and adds information to the packet that indicates the channel has been changed, the separation and insertion means can refer to the information and thus determine that the channel for the input packet has already been changed to the predetermined channel. Therefore, the packet separation process can be performed efficiently. In order for a switching device to provide information efficiently, a region wherein the switching device can add information may be provided in advance in a packet before that packet is transmitted by a terminal equipment. Although the separation and insertion means that is employed in the above arrangement separates a packet and transmits it to a terminal equipment, and inserts a packet from a terminal equipment into a channel, independent separation means and insertion means may be employed instead. In the above embodiment, wavelength multiplexing is employed to provide a plurality of channels in a single transmission path, a transmission path may be employed for each channel, and another transmission system may be employed. Further, although in the above embodiment the separation means is included in the node device, separation (insertion) means may be provided at an arbitrary location along each channel that is to be connected to each terminal equipment. In this case, a separation means address rather than a node address is employed.

(Embodiment 6)

In the previous embodiments, a star coupler has been employed as waveguide means between the transmission means and the reception means in the switching device. Since a variance in the input to each reception means is permitted at a signal reproducible level, an arrangement can be employed whereby data are input without passing through a star coupler, etc. Further, an optical system that employs mirrors and lenses can be used. And in addition, amplification means and attenuation means for correcting an input level may also be provided.

The sizes of the FIFOs, the dual port memory and its memory regions, which are included in a buffer, may be set as needed in consonance with the size of a packet, a required transmission capacity, and a throughput.

In the above described embodiments, optical signals that have a plurality of wavelengths are employed as channels between the transmission means and the reception means in the switching device, each transmission means and each reception means are connected by a conductive path that is used in common, and electric signals that have a plurality of frequencies may be employed as channels.

As is described above, according to the switching device and the switching method of the present invention, the routing control can be simplified, high speed operation is provided, and the size of the hardware can be reduced.

In addition, unlike a conventional switching device, it is not necessary for the data at all the input terminals for each output terminal to be examined in order to determine whether an output conflict has occurred and arbitration control must be performed, and for packets that are to be output to the same output terminal to be rearranged so that they are not transmitted at the same time. The structure of the switching device and its control can be simplified, and the size of the hardware can be reduced.

Further, the alteration patterns for a transmission wavelength of each variable wavelength transmission means, or for a reception wavelength of each variable wavelength reception means is fixed, and the magnitude of the change for a wavelength when it is altered is decreased. The fast alteration of a wavelength is possible, and the operating speed of the switching speed is therefore enhanced.

(Embodiment 7)

Figure 28B:
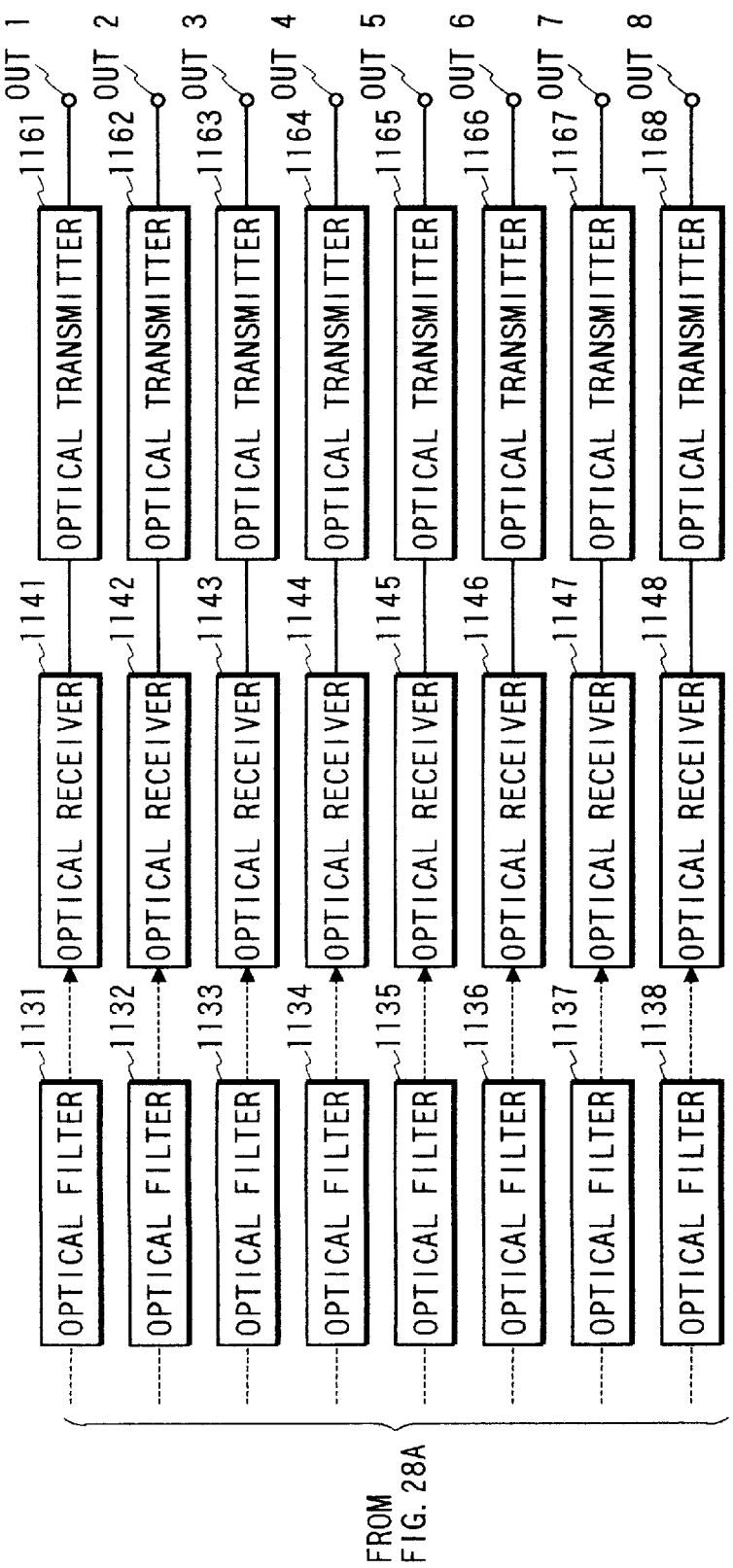

FIGS. 28A and 28B are diagrams illustrating the structure of a switching device, in a switching network, according to a seventh embodiment of the present invention. The switching device has eight input terminals and eight output terminals, and includes eight variable wavelength transmission means and eight fixed wavelength reception means. In FIGS. 28A and 28B, buffer means 1111 through 1118 temporarily store input data. Variable wavelength optical transmitters 1121 through 1128 each convert an input signal into an optical signal that has a predetermined wavelength and output it. Optical filters 1131 through 1138 each permit an optical signal to pass that has a specific wavelength.

Optical receivers 1141 through 1148 and 1151 through 1158 each convert an input optical signal into an electric signal and output it. Optical transmitters 1161 through 1168 each convert an input signal into an optical signal that has a specific wavelength and output it. Reference number 1171 denotes an 8×8 star coupler. A buffer control unit 1172 controls the buffers 1111 through 1118 to provide temporary storage for signals that are input and to output the signals at arbitrary times. A wavelength control unit 1173 introduces a current at the variable wavelength terminals of the variable wavelength optical transmitters 1121 through 1128, and controls them in order to transmit optical signals that have desired wavelengths. Reference number 1174 denotes a clock generation circuit and 1175 denotes a frame generation circuit for determining a wavelength transient time. Each of the optical transmitters 1121 through 1128 includes a variable wavelength light emitting device, such as a DFB laser or a DBR laser, a driving circuit for modulating the light emitting device, and a wavelength stabilization circuit, and can vary the emitted optical wavelength by introducing a current at the variable wavelength terminal. The optical filters 1131 through 1138 are, for example, fiber Fabry-Pérot filters or DFB laser filters that transmit only optical signals that have the respective wavelengths $\lambda 1, \lambda 2, \ldots,$ and $\lambda 8$, and that block all the other optical signals. The optical receivers 1141 through 1148 have a Pin-PD or an APD mounted on them, and have photoelectric conversion, equalization and amplification, and identification and reproduction functions. The optical receivers 1151 through 1158 have a Pin-PD or an APD mounted on them, and have photoelectric conversion, equalization and amplification, identification and reproduction, and re-timing functions. The optical transmitters 1161 though 1168 have an LED or a Fabry-Pérot LD mounted on them.

Figure 29:
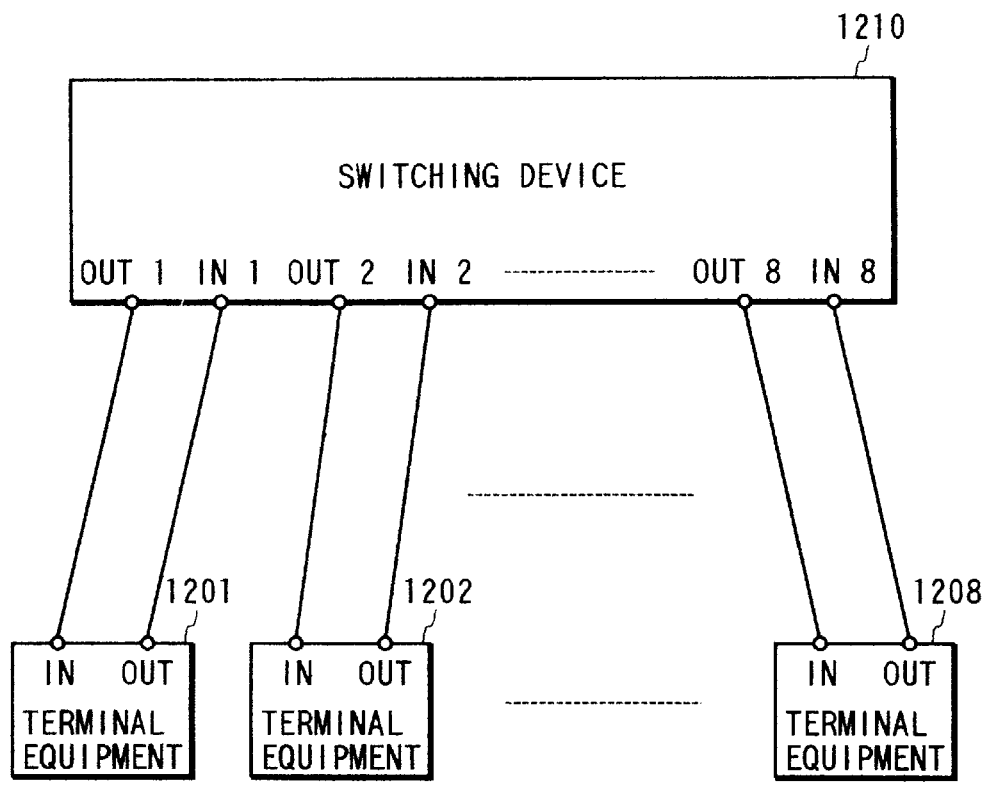
FIG. 29 is a diagram illustrating the example arrangement for the switching network in the present invention.

FIG. 29 is a diagram showing the structure of a switching network according to present invention. In FIG. 29, terminal equipments 1201 through 1208 are each connected to a switching device 1210 for the present invention are connected each other by an ascending (output) and a descending (input) optical fiber paths.

Figure 30:
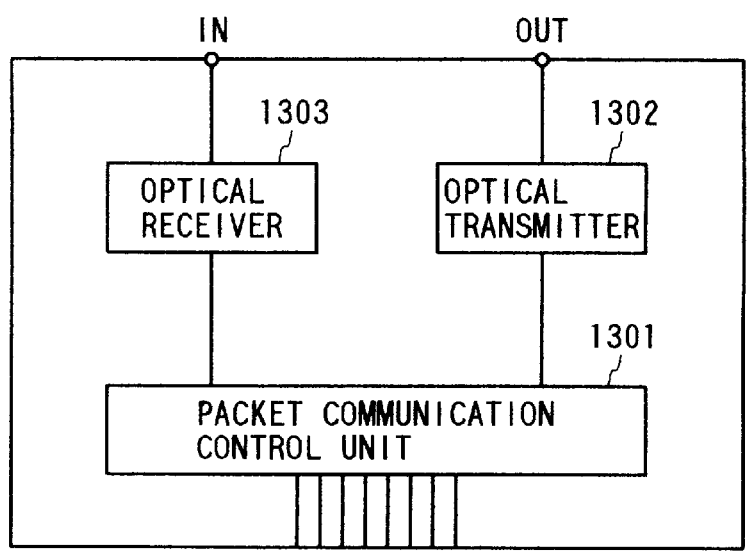
FIG. 30 is a diagram illustrating an example structure for a communication control unit of a terminal equipment that is connected to the switching network of the present invention.

FIG. 30 is a diagram showing the arrangement of a communication control device that is mounted in a terminal equipment that is connected to the switching network of the present invention. In FIG. 30, reference number 1301 denotes a packet communication control unit, such as an ATM (Asynchronous Transfer Mode); 1302, an optical transmitter; and 1303, an optical receiver. Each of the terminal equipments 1201 through 1208 is either a computer apparatus or a video apparatus, and on each is mounted a communication control device such as is shown in FIG. 30.

Wavelength tables for the wavelength control unit 1173 are the same as those in Table 1, and are sequentially read in consonance with addresses from a ROM counter in the wavelength control unit 1173.

Figure 31:
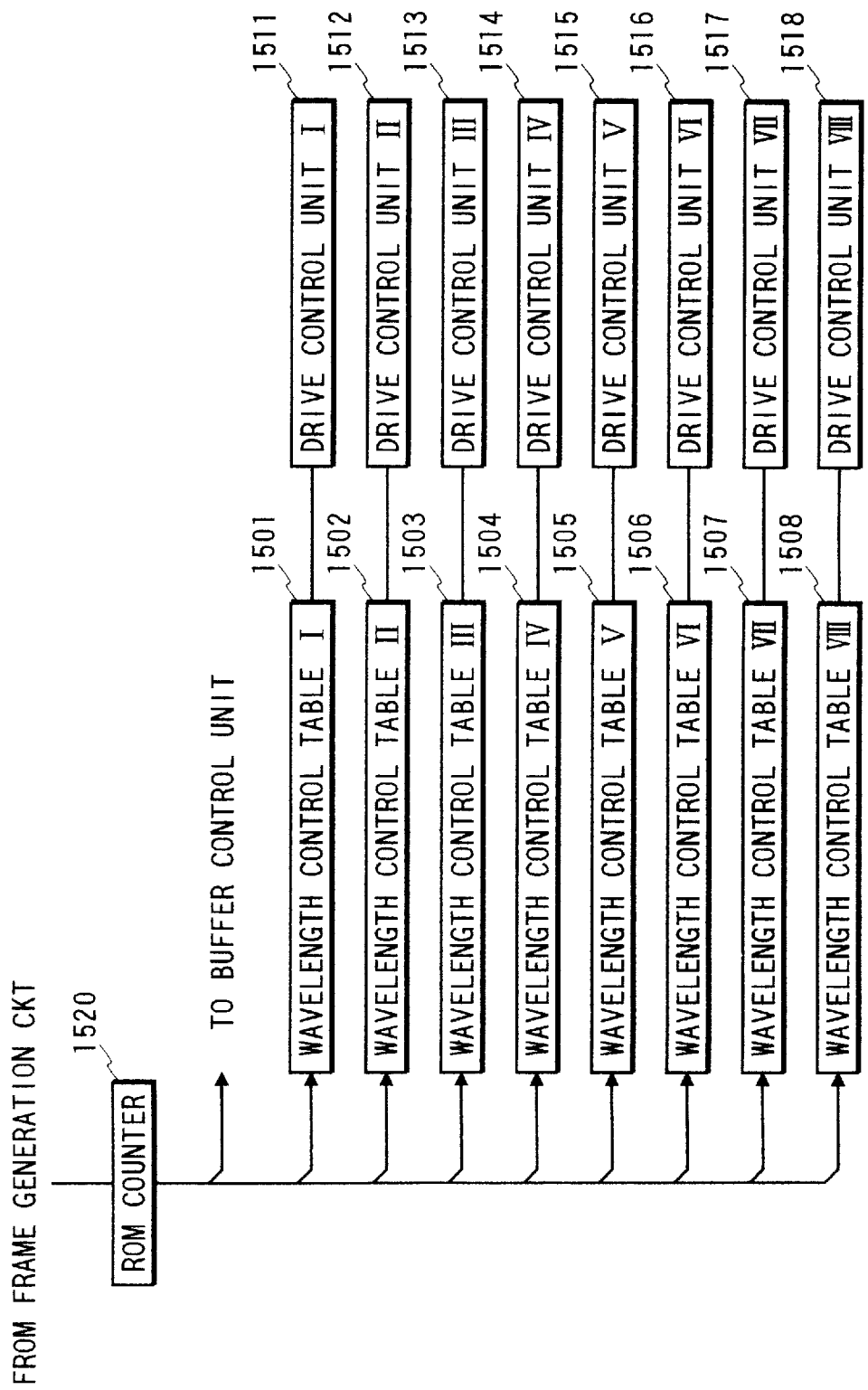
FIG. 31 is a diagram illustrating a wavelength control unit.

FIG. 31 is a diagram illustrating the arrangement of the wavelength control unit 1173. Reference numbers 1501 through 1508 denote wavelength tables I through VIII that are shown in Table 1; 1511 through 1518, drive control units for the variable wavelength transmitters 1121 through 1128; and 1520, a ROM counter.

Buffer control tables in the buffer control unit 1172 are the same as those in Table 2, and are sequentially read in consonance with addresses from the ROM counter 1520 of the wavelength control unit 1173.

First, the wavelength control method of the wavelength control unit 1173 will be explained. Transmission wavelengths for variable wavelength LDs that are mounted on the individual optical transmitters are set by introducing, from the corresponding wavelength control terminals, control currents that correspond to wavelengths that are read from respective wavelength tables. Each time a frame pulse that is generated by the frame generation circuit 1175 is received by the ROM counter 1520 of the wavelength control unit 1173, an address signal is output by the ROM counter 1520. Control signals that correspond to wavelengths in Table 1 are read from individual wavelength tables in consonance with their addresses. These control signals are transmitted to the drive control units 1511 through 1518, and drive currents that correspond to designated wavelengths are supplied to wavelength control terminals of the variable wavelength LDs for the setting of transmission wavelengths. Therefore, the transmission wavelengths of the optical transmitters are shifted cyclically in the order $\lambda 1, \lambda 3, \lambda 5, \lambda 7, \lambda 8, \lambda 6, \lambda 4,$ and $\lambda 2$. The period that is required to shift the wavelengths depends on the cycle time for a frame pulse. Supposing that the switching network of the present invention is an ATM switching network, each time a frame pulse, for example, for one cell (53 bytes) cycle is generated by a clock, which is generated by the clock generation circuit 1174, and is input to the wavelength control unit 1173, alteration of the transmission wavelengths of the optical transmitters 1121 through 1128 is performed in consonance with the same timing. In this manner, the transmission wavelengths of the optical transmitters 1121 through 1128 are steadily changed during a constant, timed period regardless of the input signals. Although the order in which wavelengths are shifted is not limited to the order described above, the wavelengths should be sequentially selected, so that the magnitude of the wavelength shift is not large, and the phases in the cyclic change should be shifted to prevent the transmission of signals having the same wavelength.

The operation of the buffer control unit 1172 will now be explained. The buffer control unit 1172 generates reading addresses for packets, which are input and stored in the buffers 1111 through 1118, during a frame pulse cycle of the frame generation circuit 1175, and sequentially reads packets from the buffers. In each of the buffers, a packet that is input is written in a memory region that corresponds to an output terminal at which the packet is to be output. When a reading address that corresponds to the memory region is read from a corresponding buffer control table in the buffer control unit 1172, a packet that is stored in the buffer is output. The buffer control tables are arranged as is shown in Table 2. When an address is transmitted from the ROM counter 1520 of the wavelength control unit 1173, reading addresses in Table 2 are sent to the buffers and the packets are read therefrom. As is apparent from Tables 1 and 2, if a transmission destination for a packet that is stored in the buffer 1111 is an output terminal OUT1, the wavelength of a filter for the output terminal OUT1 is $\lambda 1$. When address 0 is sent from the ROM counter 1520 and the transmission wavelength of the optical transmitter 1121 is set to $\lambda 1$, reading address A1, which corresponds to the output terminal OUT1, is read from the buffer control unit 1172 and the packet is then read out. That is, the reading of packets is controlled and inhibited until the transmission wavelengths of the optical transmitters, which output packets, match the wavelengths that correspond to the output terminals to which the packets are to be output.

The communication operation of the switching network of the present invention will now be described for a case during which there is active communication between all terminal equipments 1202 through 1208 and the terminal equipment 1201. Each of the terminal equipments 1202 through 1208 forms transmission data into a packet by using the packet communication control unit 1301, a communication board that is mounted on each terminal equipment, adds information such as a destination address to the header of a packet, and outputs the packet to the optical transmitter 1302. The optical transmitter 1302 converts the received packet into an optical signal and transmits the optical signal from its output port to the ascending optical fiber transmission path. The packets that are output in this manner by the terminal equipments 1202 through 1208, pass along the ascending optical fiber transmission paths and are input to the switching device 1210. The optical signals that are input at input terminals IN2 through IN8 of the switching device 1210 are transmitted to the respective optical receivers 1152 through 1158. There they are converted into electric signals. The optical receivers 1152 through 1158 perform equalization and amplification, and identification and reproduction, on the received optical signals, and send the resultant signals to the buffers 1112 through 1118, respectively. The buffers detect the destination addresses of the packets and store the packets in memory regions that correspond to destination output terminals. Since the destination of all the packets is the output terminal OUT1 in this case, the packets are stored in memory regions 1, of the buffers, that correspond to the output terminal OUT1. If, when packets are stored in the buffers, the wavelength shifting state is the one that corresponds to address 0 in Table 1, the transmission wavelengths of the optical transmitters are set to: $\lambda 1$, for the optical transmitter 1121; and $\lambda 2$, for the optical transmitter 1122. In the same manner, the wavelengths $\lambda 4$, $\lambda 6$, $\lambda 8$, $\lambda 7$, $\lambda 5$, and $\lambda 3$ are set respectively for the optical transmitters 123, 124, 125, 126, 127, and 128. Packets that at this time are read from the buffers in consonance with the reading addresses from the buffer control unit 1172 are those that were input before the above described packets. In the following timing cycle, i.e., when a frame pulse is transmitted from the frame generation circuit 1175 to the ROM counter 1520 of the wavelength control unit 1173, the ROM counter 1520 outputs address 1 to the wavelength tables 1501 through 1508 and the buffer control unit 1172. Control signals that correspond to address 1 in Table 1 are read from the wavelength control tables 1501 through 1508 and sent to the drive control units 1511 through 1518, and the control current is supplied to the optical transmitters 1121 through 1128 in order to set the transmission wavelengths to $\lambda 3$, $\lambda 1$, $\lambda 2$, $\lambda 4$, $\lambda 6$, $\lambda 8$, $\lambda 7$, and $\lambda 5$. At the same time, reading addresses that correspond to the address 1 are read from the buffer control tables in the buffer control unit 1172, and are sent to the buffers 1111 through 1118, respectively. The reading addresses that are put into the buffers at this time are A3, A1, A2, A4, A6, A8, A7, and A5, as is shown in Table 2. Since the reading address A1 is an address at which a packet for the output terminal OUT1 is read from the memory region 1, a packet that was previously stored is read from the buffer 1112. Since the reading addresses for the other buffers are addresses for output terminals other than the output terminal OUT1, the packets that were previously input are not read. The packet that is read from the buffer 1112 is transmitted to the optical transmitter 1122. As the transmission wavelength is set to $\lambda 1$, the optical transmitter 1122 converts the packet into an optical signal that has the wavelength $\lambda 1$ and outputs that signal. The optical signal is branched in eight directions by the star coupler 1171, and the branched signals are input to the optical filters 1131 through 1138. As the transmission wavelength for the optical filter 1131 is $\lambda 1$, the optical signal that enters the optical fiber 1131 passes through it and is received by the optical receiver 1141. The optical signals that have the wavelength $\lambda 1$ and that are input to the optical filters 1132 through 1138 are blocked therein. The optical receiver 1141 performs photoconversion, equalization and amplification, and identification and reproduction on the received signal, and outputs the resultant signal to the optical transmitter 1161. The optical transmitter 1161 converts the received signal into an optical signal, and outputs the optical signal from the output terminal OUT1 to the optical fiber descending transmission path. The optical signal that passes along the optical fiber descending transmission path is input to the optical receiver 1303 in the terminal equipment 1201 and is converted into an electric signal. The electric signal is then processed by the communication control unit 1301 and is finally received. In this fashion, a packet from the terminal equipment 1202 is transmitted to the terminal equipment 1201.

In the following timing cycle, address 2 is output by the ROM counter 1520, and as is apparent from Tables 1 and 2, a packet is read from the buffer 1113. The packet is converted into an optical signal that has the wavelength $\lambda 1$ by the optical transmitter 1123. The optical signal passes through the optical filter 1131 and is converted into an electric signal by the optical receiver 1141. Then, the electric signal is converted into an optical signal by the optical transmitter 1161. The optical signal is passed along the optical fiber descending transmission path and is received by the terminal equipment 1201.

In the same fashion, the transmission wavelength and the reading address are changed each time a frame pulse is sent to the ROM counter 1520. The packets are sequentially read from the buffers 1114, 1115, 1116, 1117 and 1118, and are output from the output terminal OUT1 to the terminal equipment 1201. The packets that are output at the terminal equipments 1202 through 1208 are received by the terminal equipment 1201.

In this manner, the communication is performed among terminal equipments via the switching device.

In this embodiment, a control unit is not shown for one arrangement wherein the fiber Fabry-Pérot filters or the DFB laser filters described above are employed for the optical filters 1131 through 1138. However, a voltage-current stabilizer or a temperature stabilizer for stabilizing a transmission wavelength should be provided as needed.

Further, the optical receivers 1141 through 1148 and the optical transmitters 1161 through 1168 in this embodiment are not always required, and may be removed as long as the transmission power of the optical filters 1131 through 1138 is sufficiently large. In this case, the optical filters 1131 through 1138 may be respectively located in the input portions of the terminal equipments 1201 through 1208, instead of being provided in the switching device 1210.

In addition, although the switching device and the terminal equipments are connected by optical fiber paths in this embodiment, an electric wire, such as a coaxial cable or a twisted pair cable, may be employed. In this case, electric receivers and transmitters may be provided as needed to serve as the optical receivers 1151 through 1158 and 1303 and the optical transmitters 1161 through 1168 and 1302.

(Embodiment 8)

Figure 32B:
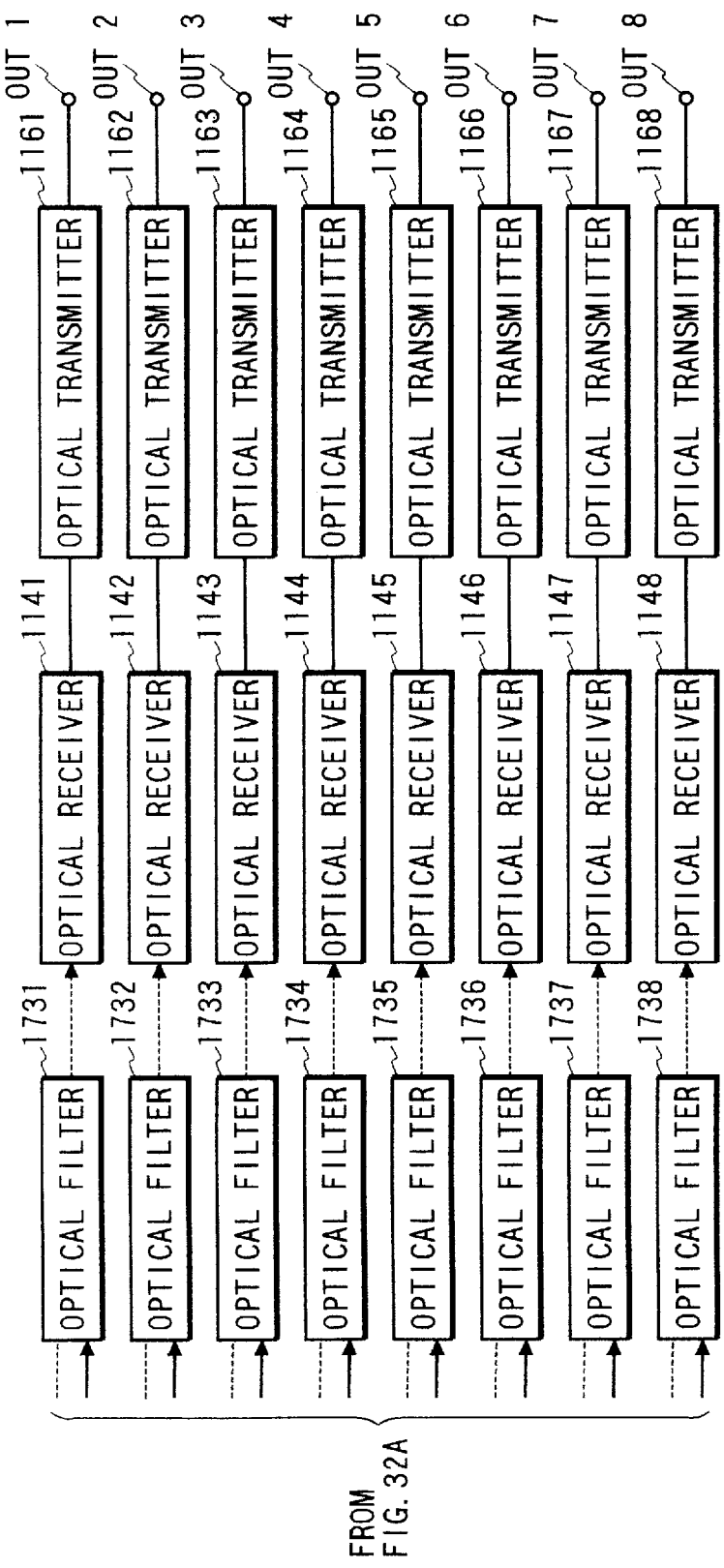

An eighth embodiment of the present invention will now be described. FIGS. 32A and 32B are diagrams illustrating a switching device in a switching network according to the eighth embodiment of the present invention. The same reference numbers as are used in the seventh embodiment are used to denote corresponding or identical components.

In FIGS. 32A and 32B, optical transmitters 1721 through 1728 output optical signals that have specific wavelengths, variable wavelength filters 1731 through 1738 transmit optical signals that have arbitrary wavelengths, and the other components function the same as those in the seventh embodiment. As do the optical transmitters 1121 through 1128 in the seventh embodiment, the optical transmitters 1721 through 1728 have either a DFB laser or a DBR laser mounted on them, and their transmission wavelengths are set to $\lambda 1, \lambda 2, \ldots,$ and $\lambda 8$, respectively. Fiber Fabry-Pérot filters or DFB laser filters can be employed for optical filters 1131 through 1138 in the seventh embodiment can also be employed for the variable wavelength filters 1731 through 1738. The variable wavelength filters 1731 through 1738 can permit arbitrary wavelengths from at least among $\lambda 1$ through $\lambda 8$ to pass by employing voltage control or current control. Tables shown in Table 4 are employed for buffer control tables in a buffer control unit 1172.

While to perform switching in the seventh embodiment the transmission wavelength is adjusted to a wavelength that is assigned for the reception side, to perform switching in the eighth embodiment the reception wavelength is adjusted to a wavelength that is assigned for the transmission side.

First, the wavelength control method for a wavelength control unit 1173 will be described. As in the seventh embodiment, the wavelength control unit 1173 generates an address with a ROM counter 1520 each time a frame pulse is sent from a frame generation circuit 1175 to the ROM counter 1520, and reads wavelength control tables in Table 1. Control signals from the wavelength control tables 1501 through 1508 are sent to corresponding drive control units 1511 through 1518. The drive control units 1511 through 1518 then supply different voltages or different currents to wavelength control terminals of the variable wavelength filters 1731 through 1738. While the drive control units in the seventh embodiment control the variable optical transmitters, the drive control units in this embodiment control the variable wavelength filters and therefore correspond to a filter type that is employed. Since the transmission wavelengths for the variable wavelength filters vary according to the value of a voltage or a current that is supplied to the wavelength control terminals, the transmission wavelengths for the variable wavelength filters are set to different wavelengths. The setting of these wavelengths is altered during a cycle of, for example, one cell (53 bytes), as in the seventh embodiment. The wavelengths are also repetitively shifted in the order shown in Table 1, for example, as in the seventh embodiment. In this manner, the transmission wavelengths of the variable wavelength filters 1731 through 1738 are changed during a constant cycle regardless of the input of signals.

Next, the operation of the buffer control unit 1172 will be explained. In the same manner as in the seventh embodiment, the buffer control unit 1172 obtains reading addresses received from the buffer control tables in consonance with an address from the ROM counter 1520, and reads packets that are held in the buffers. It should be noted that the buffer control tables in Table 4 are employed.

Communication between elements in the switching network of the present invention will now be described. As in the seventh embodiment, the terminal equipments 1202 through 1208 communicate with the terminal equipment 1201. In the same manner as in the seventh embodiment, packets that are output at the terminal equipments are transmitted to a switching device 1210 and are then stored in the buffers 1112 through 1118. Each of the buffers detects a destination address for a packet and stores it in a memory region 1 that corresponds to an output terminal OUT1. If, when the packet is stored in the buffer, the wavelength shifting state is the state that corresponds to address 0 in Table 1, the transmission wavelengths are set to $\lambda 1$, for the variable wavelength optical filter 1731; and $\lambda 2$, for the variable wavelength optical filer 1732. In the same manner, the transmission wavelengths $\lambda 4, \lambda 6, \lambda 8, \lambda 7, \lambda 5,$ and $\lambda 3$ are set for the variable wavelength optical filters 1733 through 1738. At this time, packets that are read from the buffers in consonance with reading addresses from the buffer control unit 1172 are those that were input before the above described packets. In the following timing cycle, i.e., when a frame pulse is sent from the frame generation circuit 1175 to the ROM counter 1520 of the wavelength control unit 1173, the ROM counter 1520 outputs address 1 to the wavelength control tables 1501 through 1508 and the buffer control unit 1172. Control signals in Table 1 that correspond to the address 1 are output from the waveform control tables 1501 through 1508 to the drive control units 1511 through 1518. The control current is supplied to the variable wavelength optical filters 1721 through 1728 to respectively set the transmission wavelengths to $\lambda 3, \lambda 1, \lambda 2, \lambda 4, \lambda 6, \lambda 8, \lambda 7$ and $\lambda 5$. At the same time, the buffer control unit 1172 obtains from the buffer control tables the reading addresses that correspond to the address 1, and outputs them to the respective buffers 1111 through 1118. The reading addresses at this time, A2, A3, A1, A4, A8, A5, A7 and A6, as is shown in Table 4, are sent to the buffers 1111 through 1118. Since the reading address A1 is employed to read a packet in the memory region 1 for the output terminal OUT1, the packet that was previously stored in the buffer 1113 is read from the buffer 1113. Since the reading addresses for the other buffers are those other than the address that corresponds to a packet for the output terminal OUT1, the packets that were previously input are not read. The packet that is read from the buffer 1113 is transmitted to the optical transmitter 1723. Since the transmission wavelength is set to $\lambda 3$, the optical transmitter 1723 converts the packet into an optical signal that has the wavelength $\lambda 3$ and outputs it. The optical signal is branched in eight directions by the star coupler 1171 and the branched signals are input to the optical filters 1731 through 1738. Since at this time the transmission wavelength for the optical filter 1731 is $\lambda 3$, the optical signal that enters the optical filter 1731 passes through it and is received by the optical receiver 1141. Since the transmission wavelengths for the optical filters 1732 through 1738 are set to wavelengths other than $\lambda 3$, the optical signals that have the wavelength $\lambda 3$ and that enter the optical filters 1732 through 1738 are blocked. The optical receiver 1141 performs photoconversion, equalization and amplification and identification and reproduction on the received signal, and sends the resultant signal to the optical transmitter 1161. The optical transmitter 1161 converts the signal into an optical signal and transmits it from the output terminal OUT1 to the optical fiber descending transmission path. The signal, which has passed along that transmission path, is input to the optical receiver 303 in the terminal equipment 1201. The optical signal is then converted into an electric signal. The electric signal is then processed by the communication control unit 1301 and is finally received by the terminal equpment 1201. In this manner, the packet from the terminal equipment 1203 is transmitted to the terminal equipment 1201.

During the following timing cycle, address 2 is by the ROM counter 1520, and as is apparent from Tables 1 and 7, a packet is read from the buffer 1115. The packet is then converted by the optical transmitter 1125 into an optical signal of the wavelength λ5. The optical signal is passed through the optical filter 1731, for which the transmission wavelength is set to the wavelength λ5 at this time, and is converted into an electric signal by the optical receptor 1141. Thereafter, the electric signal is converted into an optical signal by the optical transmitter 1161. The optical signal is transmitted along the optical fiber descending transmission path and is finally received by the terminal equipment 1201.

Likewise, each time a frame pulse is input to the ROM counter 1520, the transmission wavelengths and the reading addresses are changed. Packets are sequentially read from the buffers 1117, 1118, 1116, 1114 and 1112, and are output by the output terminal OUT1 to the terminal equipment 1201. In this manner, the packets that are output by the terminal equipments 1202 through 1208 are sequentially received by the terminal equipment 1201.

In this embodiment, the optical receivers 1141 through 1148 and the optical transmitters 1161 through 1168 are not always required, and may be removed as long as the transmission power from the variable wavelength filters 1731 through 1738 is sufficiently high.

In this embodiment, a control unit is not shown for an arrangement wherein the fiber Fabry-Pérot filters or the DFB laser filters described above are employed for the optical filters 1731 through 1738. However, a voltage-current stabilizer or a temperature stabilizer for stabilizing a transmission wavelength should be provided as needed.

In addition, although the switching device and the terminal equipments are connected by optical fibers in this embodiment, an electric wire, such as a coaxial cable or a twisted pair cable, may be employed. In this case, electric receivers and transmitters may be provided as needed to serve as the optical receivers 1151 through 1158 and 1303 and the optical transmitters 1161 through 1168 and 1302.

Moreover, when the optical transmitters (1121 through 1128 and 1721 through 1728) and the optical filters (1131 through 1138 and 1731 through 1738) of the switching device are replaced with the variable wavelength transmitters and filters (1121 through 1128 and 1731 through 1738), both the switching methods that are explained in the seventh and the eighth embodiments can be employed. When variable transmitters are employed, as in the seventh embodiment, the wavelength control unit need only control the transmission wavelengths of variable wavelength filters in order to fix them. And when variable optical filters are employed, as in the eighth embodiment, the wavelength control unit need only control the transmission wavelengths of optical transmitters in order to fix them.

(Embodiment 9)

Figure 33B:
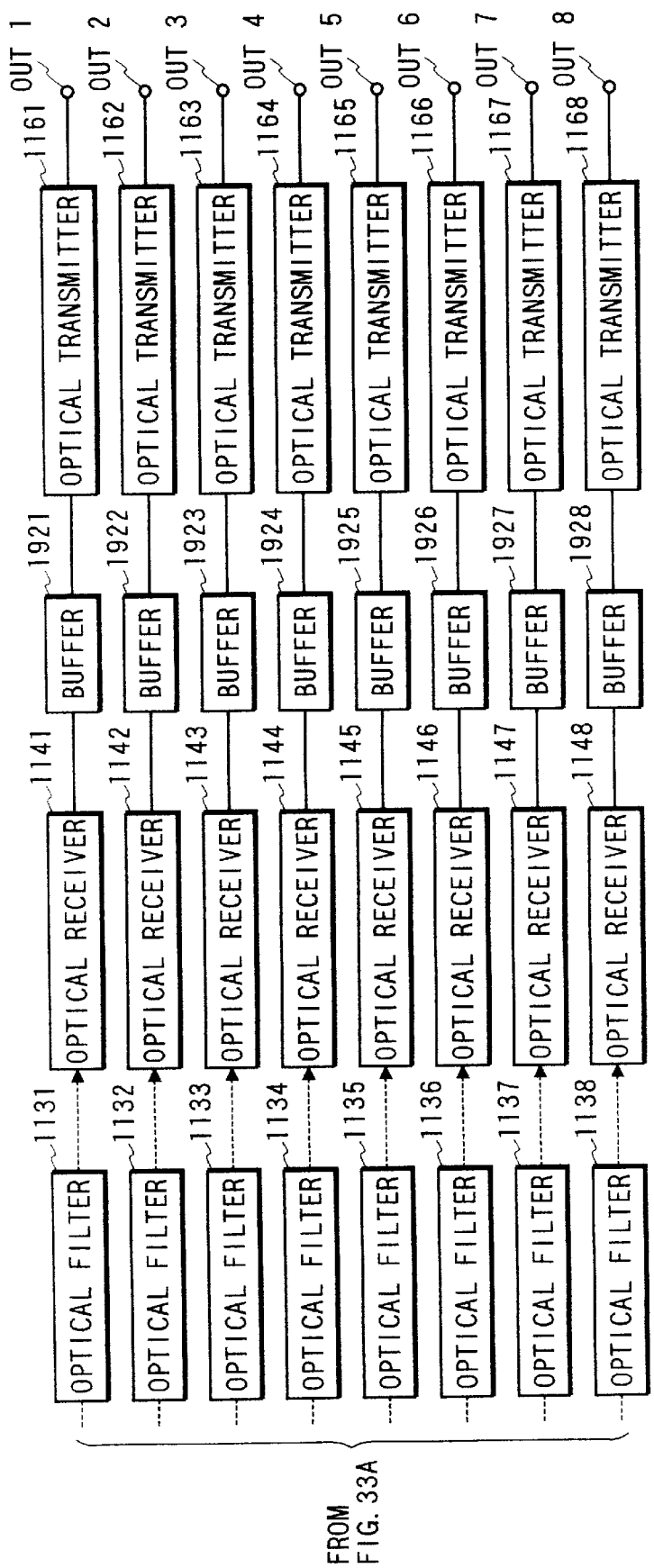

FIGS. 33A and 33B are diagrams illustrating a switching device in the switching network according to a ninth embodiment of the present invention. Buffers 1911 through 1918 are employed to store input packets in memory regions that correspond to destination output terminals. When such memory regions are full, the input packets are stored in other empty memory regions. According to the employment procedures for buffers 1921 through 1928, when the destination of a packet that has been input does not correspond to a connected output terminal, the packet is output without being held in a buffer; but when the destination of a packet corresponds to a connected output terminal, each packet that is output by the same terminal equipment is stored in an individual memory region, and packets are output in the order in which they are transmitted by terminal equipments. Although the other portions have the same arrangements as those in the seventh or eighth embodiments, for the following explanation it will be assumed that the arrangement in this embodiment is identical with that in the seventh embodiment.

The network is arranged as in FIG. 29.

The terminal equipments are structured as in FIG. 30. It should be noted that when a plurality of packets are to be sequentially transmitted, the packet communication control unit 1301 of the terminal equipment allocates sequential numbers for the packets to specify the transmission order. In the terminal equipment used in this embodiment, destination addresses for input packet signals are detected. Thereafter, the packet communication control unit 1301 processes packets whose destinations are local terminal equipments and outputs data to computers. Packets whose destinations are distant terminal equipments are relayed unchanged, and are transmitted from the optical transmitter 1302 to an optical fiber transmission path.

In the seventh and the eighth embodiments, when sequential packets that have the same transmission destination are input to the buffers 1111 through 1118, the following operation has been performed. If, for example, the size of a memory region in the buffer is small and can hold only one packet, when a packet that has the same destination is input before the previously input packet is read out, that subsequently input packet is discarded. When the size of the memory region is sufficiently large, a wait time that is equivalent of the elapsed time for the performance of one wavelength shift cycle, i.e., the time that is needed for the input of eight packets, is required between the point at which the reading of one packet is completed and the point at which the reading of a succeeding packet is begun. As a result of this, a delay is generated.

In this embodiment, when sequential packets that have the same transmission destination are input to buffers 1911 through 1918, these packets are stored in a memory region that corresponds to the destination so long as the memory region is unused. If the memory region is full, the input packets are stored in the other empty memory region. The packets that are stored in another memory region are transmitted to a terminal equipment that is not the transmission destination terminal equipment. However, the packets are relayed by the terminal equipment to a switching device 1210, and when its memory region that corresponds to the original destination is unused, the packets are stored therein. In this manner, the packets are not discarded but are transmitted, and delays are reduced on the average. Since the order of the packets is changed, each of the buffers 1921 through 1928 rearranges the order of the packets.

The communication operation for sequentially transmitting eight packets from the terminal equipment 1202 to the terminal equipment 1201 will now be explained. The packet communication control unit 1301 of the terminal equipment 1202 forms data from a computer apparatus into packets, and adds to the packets destination addresses and the numbers 1 through 8, which specify the transmission order for the packets. A packet is transmitted along the optical fiber transmission path to the input terminal IN2 of the switching device 1210, and is stored in a memory region, of the buffer 1912, that corresponds to the destination of the packet. A packet 1 that is input first is stored in a memory region 1 that corresponds to output terminal OUT1. At this time, the transmission wavelengths of the optical transmitters are those that correspond to address 7 in Table 1. That is, the transmission wavelength of an optical transmitter 1121 is λ2, and the transmission wavelength of an optical transmitter 1122 is λ4. In the same manner, the transmission wavelengths of the optical transmitters 123 through 128 are λ6, λ8, λ7, λ5, λ3, and λ1, respectively. When a second packet 2 is input, the packet 2 should be stored in the memory region 1 because the destination of the packet 2 is output terminal OUT1. However, the previously input packet 1 has not yet been read, and the packet 2 is therefore stored in empty memory region 2. The wavelength shift state corresponds to address 0 at this time. A packet that is previously stored in the memory region 2 is read, and the packet 2 is stored therein. When a third packet 3 is input, address 1 is supplied from the buffer control unit 1172 to the buffers 1911 through 1918, and the packet 1 that was input first in the memory region 1 is read from the buffer 1912. Since the packet 1 has been read, the packet 3 can then be written in the memory region 1. The packet 1 is converted into an optical signal that has the wavelength λ1 by the optical transmitter 1122 and is branched by the star coupler 1171, with the branched signals entering optical filters 1131 through 1138. The optical signal that has the wavelength λ1 is passed through the optical filter 1131, and is converted into an electric signal by an optical receiver 1141. The optical signal is temporarily held in the buffer 1921. The optical signals that have the wavelength λ1 and that enter the other optical filters are blocked. When a fourth packet 4 is input, the packet 4 is stored in the empty memory region 3. In the same manner, the packets 5, 6, 7 and 8 are sequentially stored in respective memory regions 4, 5, 6, 7 and 8. When the packet 8 is input, the wavelength shift state corresponds to address 6, and the packet 7 that was previously stored in the memory region 6 is read. When address 7 is output continuously, the packet 5 that is stored in the memory region 4 is read. Similarly, when the addresses are supplied in order, 0, 1, 2, 3 and 4, the packets 2, 3, 4, 6 and 8 that are stored in the memory regions 2, 1, 3, 5 and 7 are read sequentially. The packet 7 is converted into an optical signal that has the wavelength λ6 by the optical transmitter 1122, and the optical signal is branched by the star coupler 1171. The branched signals enter the individual optical filters 1131 through 1138. The optical signal that has the wavelength λ6 is passed through the optical filter 1136, and is converted into an electric signal by the optical receptor 1146. The electric signal is input to the buffer 1926. The optical signals that have the wavelength λ6 and that enter the other optical filters are blocked. The buffer 1926 detects a destination address of the input packet 7. Since the destination of the packet 7 is the output terminal OUT1 and not the output terminal OUT6, the buffer 1926 does not hold the packet 7 and directly outputs it. The packet 7 is converted into an optical signal by the optical transmitter 1166, and the optical signal is transmitted from the output terminal OUT6 to the optical fiber descending transmission path. The packet 7, which has passed along the optical fiber transmission path, is input at the terminal equipment 1206, and is converted into an electric signal by the optical receiver 1303. Then, the destination address of the packet 7 is acquired by the packet communication control unit 1301. Since the destination of the packet 7 is the terminal equipment 1201 and not the terminal equipment 1206, the packet 7 is sent unchanged to the optical transmitter 1302, where it is converted into an optical signal. The optical signal is then output along the optical fiber ascending transmission path. The packet 7 that has passed along the optical fiber is input at the input terminal IN6 of the switching device 1210, and is converted into an electric signal by the optical receiver 1156 so that it can be stored in the buffer 1916. The buffer 1916 detects the destination address of the packet 7, and stores it in the memory region 1 that corresponds to the output terminal OUT1, which is the transmission destination. The packet 7 is read out when address 1 is supplied to the buffer, and is stored in the buffer 1911 in the same manner as is described above. Similarly, the packets 5, 2, 4, 6 and 8 are output at the respective output terminals OUT4, OUT2, OUT3, OUT5 and OUT7 of the switching device 1210, are relayed by the terminal equipments 1204, 1202, 1203, 1205 and 1207, and are respectively stored in the memory regions 1 of the buffers 1914, 1912, 1913, 1915 and 1917 of the switching device 1210. Since the packet 3 was held in the memory region 1, it is stored in the buffer 1911, as was for the packet 1. The packets 5, 2, 4, 6 and 8 are read from the corresponding buffers 1911 through 1918 when the transmission wavelengths of the optical transmitters that are connected to those buffers are set to λ1. The packets are then converted by the optical transmitters 1121 through 1128 into optical signals that have the wavelength λ1, and the optical signals are stored in the buffer 1921. In this manner, eight packets that are input at the input terminal IN1 are stored in the buffer 1921. As is described above, since the packets 1 through 8 are relayed between the terminals, the order of the packets is changed. The buffer 1921 detects the numbers that specify the transmission order for the input packets, and read the packets in consonance with the numbers. The packets are read from the buffer 1921 in the order in which they are transmitted from the terminal equipment 1202, and are converted into optical signals by the optical transmitter 1161. The optical signals are output to the optical fiber transmission path. The packets travel along the optical fiber transmission path and are received by the terminal equipment 1201.

The communication operation is performed in the above described manner.

Although, in the above described embodiments, a plurality of terminal equipments are connected to a single switching device as is shown in FIG. 29, the present invention is not limited to such arrangement, and a plurality of switching devices may be connected to a plurality of terminal equipments.

Figure 34:
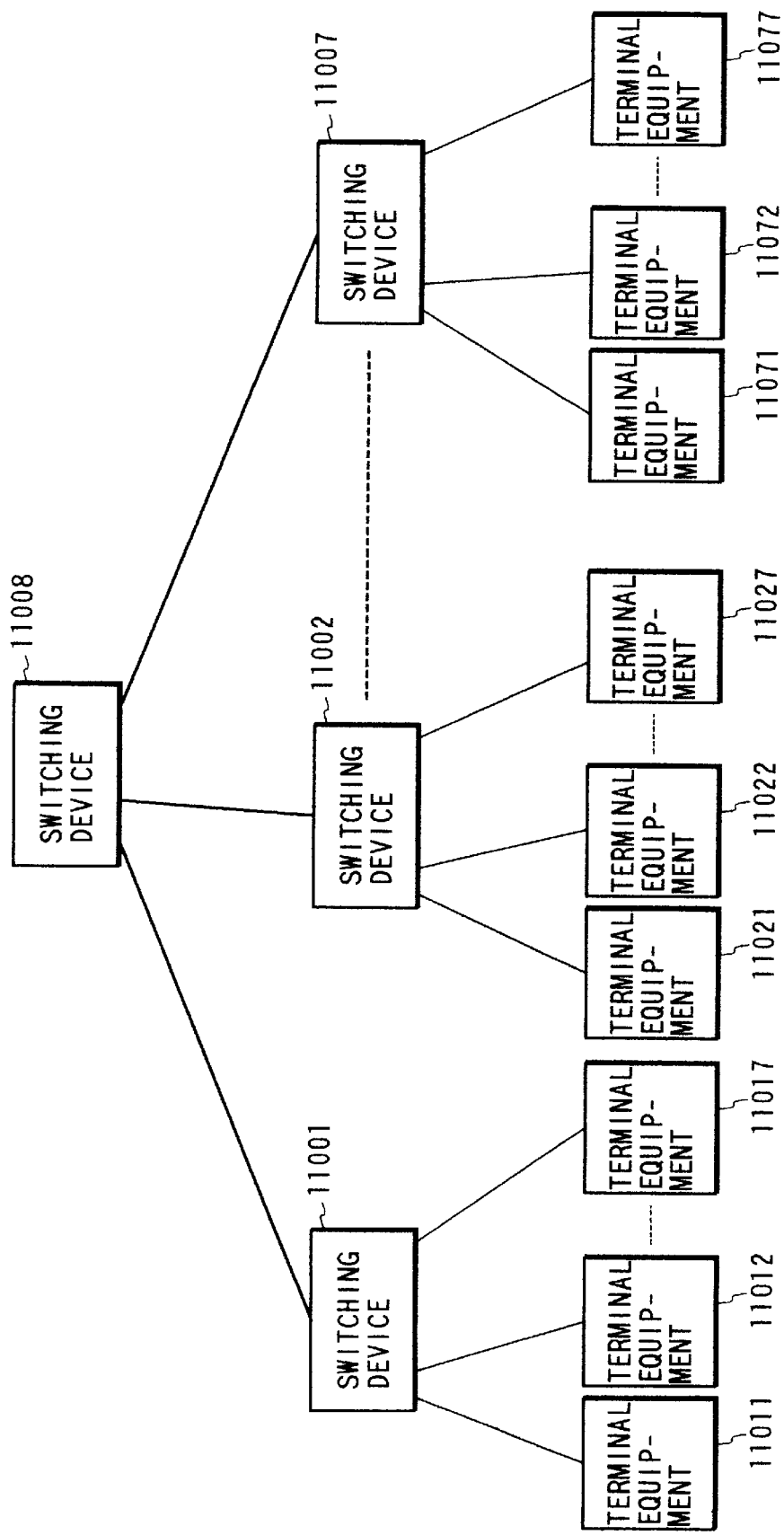
FIG. 34 is a diagram illustrating another example arrangement for the switching network of the present invention.

FIG. 34 is a diagram illustrating a structure wherein a plurality of switching device are employed to extend a network. In FIG. 34, switching devices 11001 through 11008 are those described in the seventh, the eighth, and the ninth embodiments, and they may be mixed. It should be noted that when the switching device in the ninth embodiment is employed, the terminal equipments in the ninth embodiment should be used for terminal equipments 11011 through 11077.

The communication operation is performed in the same manner as in the previous embodiment. For the communication from the terminal equipment 11011 to the terminal equipment 11075, for example, the switching device 11001 performs the switching operation that is explained in the previous embodiment. During this operation, a packet that is output at the terminal equipment 11011 is sent to an output terminal that is connected to the switching device 11008. The packet is then output from the switching device 11008 to the switching device 11007, and is further output to the terminal equipment 11075. When the switching device employed in the ninth embodiment is used for the switching device 11001, the packet that is sent from the terminal equipment 11011 is relayed by the terminal equipment 11017 and is transmitted to the terminal equipment 11075 via the switching devices 11001, 11008 and 11007.

Figure 39:
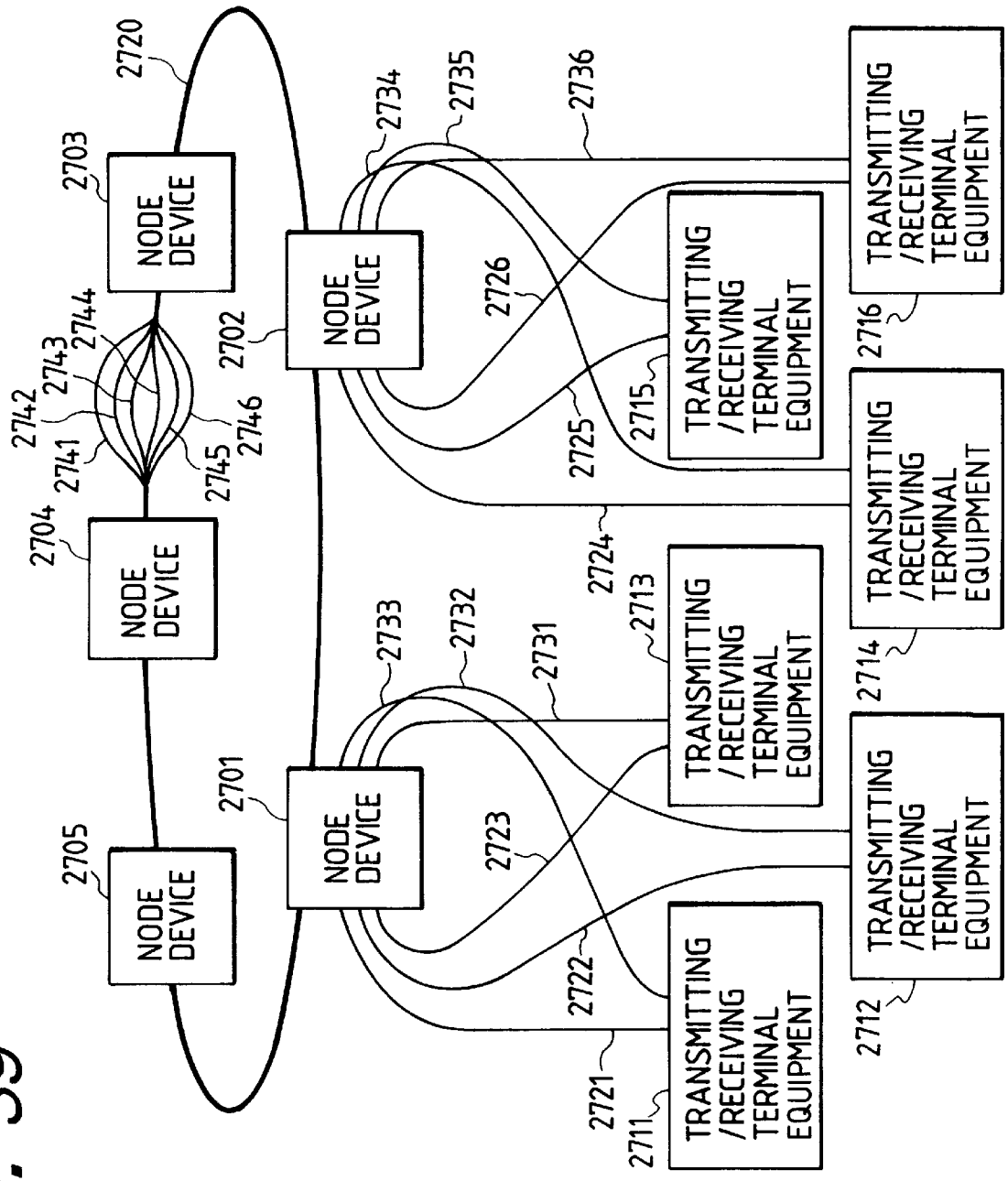
FIG. 39 is a diagram showing the arrangement of a network according to the tenth embodiment of the present invention.

Although in this embodiment, a tree structure shown in FIG. 39 is used as the structure for extending the network, the present invention is not limited to this structure. A plurality of switching devices that have been explained in the previous embodiments, such as network, bus and looped switching devices, may be arbitrarily connected to perform communication.

As is described above, the routing control for the switching device in the switching network of the present invention is performed in such a manner that either the transmission wavelengths that the several variable wavelength transmission means employ for packet transmission are changed to fixed wavelengths, or the reception wavelengths that the several variable wavelength reception means employ for packet reception are changed to fixed wavelengths, and that the writing and the reading of packets are controlled in consonance with the several buffer means that are provided for the individual input terminals. Therefore, the routing control can be simplified and the size of the hardware can be reduced. Further, the transmission wavelength control pattern is so set that two or more variable wavelength transmission means or variable wavelength reception means do not employ the same wavelength. Therefore, it is not necessary to check the inputs at all the input terminals for each output terminal to detect the occurrence of output conflicts for which the performance of arbitration control is required, a processing procedure that must be performed for a conventional switching device. The structure of the switching device can therefore be simplified and the size of the hardware can be reduced. Since the size of the hardware is smaller, the switching network of the present invention can easily be employed for a small network, such as a LAN.

In addition, the alteration pattern for the transmission wavelengths of the variable wavelength transmission means, or the reception wavelengths of the variable wavelength reception means, is fixed, and the count of the wavelength changes that are performed is reduced. As a result, high speed wavelength changes can be provided, and the communication speed can accordingly be increased.

In the switching network that is described in the ninth embodiment, the discarding of packets can be reduced.

(Embodiment 10)

According to the present invention, a signal that transmitted along a specific channel is temporarily held in a buffer, while a channel that is connected to an output terminal of the buffer is sequentially changed in consonance with a predetermined pattern, and the reading of a packet that is to be transmitted along a specific channel is synchronized with the transmission of a signal from the buffer to that desired channel, so that finally the packet is output to the desired channel. One embodiment of a switching device that performs the above described operation will now be described.

Figure 35:
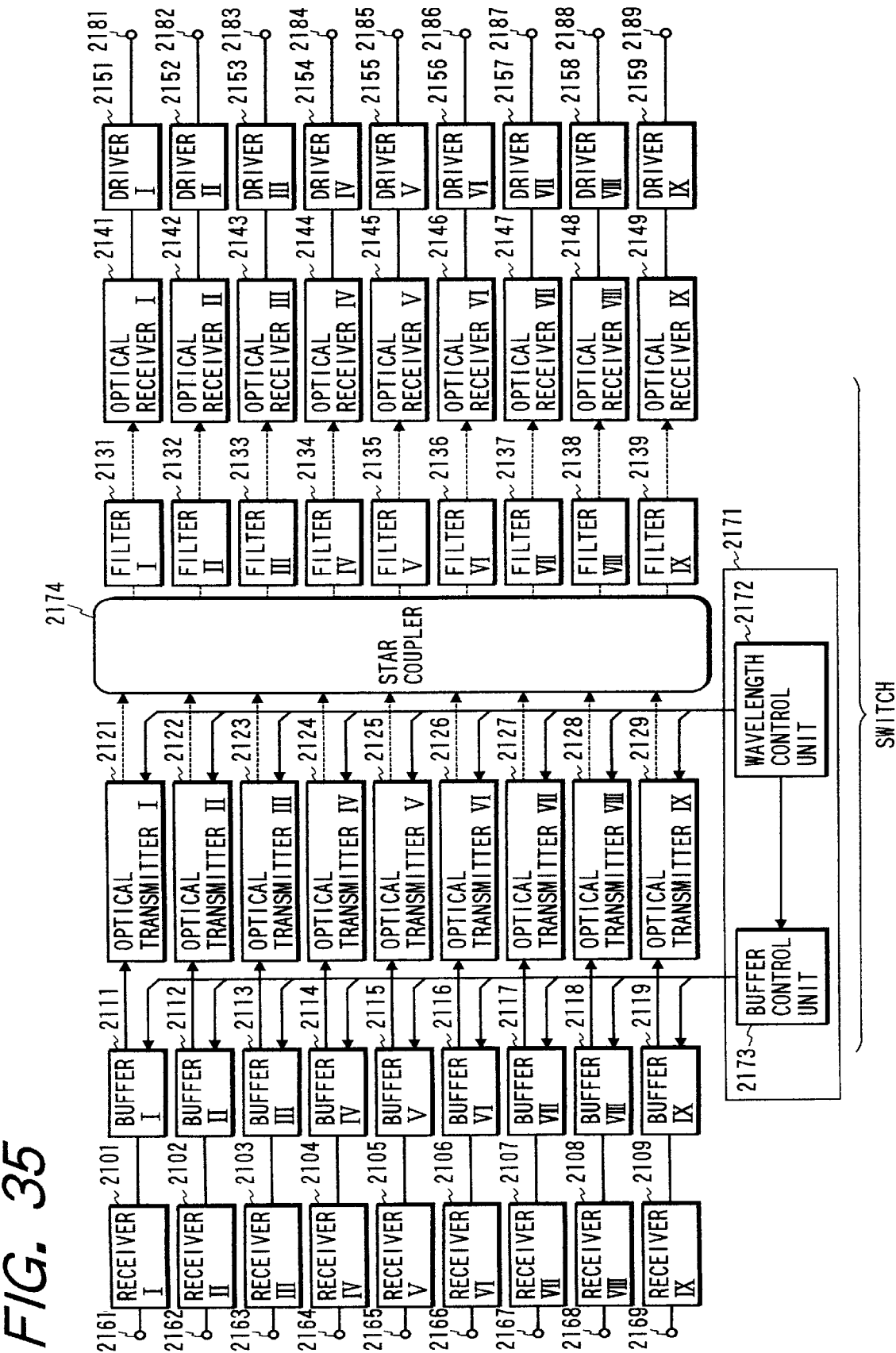
FIG. 35 is a diagram illustrating the arrangement of a node device according to a tenth embodiment of the present invention.

FIG. 35 is a diagram illustrating a node device that serves as a switching device according to this embodiment of the present invention. The node device has nine input terminals and nine output terminals, and includes nine variable wavelength transmission means and nine fixed wavelength reception means.

In FIG. 35, receivers I 2101 through IX 2109 receive electric signals that are input at respective input terminals. Buffers I 111 through 119 are buffer means for temporarily storing electric signals that are input at the input terminals. In this embodiment, the buffer means are provided for the individual input terminals, and the internal structure of each buffer will be described later. Variable wavelength transmission units I 2121 through IX 2129 are variable wavelength transmission means for converting electric signals that are received from the buffers into optical signals that have desired wavelengths provided from among nine transmission wavelengths, and for outputting the optical signals. A star coupler 2174 is an optical waveguide means for transmitting the optical signals of the nine wavelengths from the nine variable wavelength transmission units I 2121 through IX 2129 to nine fixed wavelength reception means, which will be described later. Filters I 2131 through IX 2139 transmit only those optical signals that have wavelengths that correspond to their fixed wavelengths, and block those optical signals that have other wavelengths. The transmission wavelengths for the filters is set to $\lambda 1$, for the filter I 2131; $\lambda 2$, for the filter II 2132; $\lambda 3$, for the filter III 2133; $\lambda 4$, for the filter IV 2134; $\lambda 5$, for the filter V 2135; $\lambda 6$, for the filter VI 2136; $\lambda 7$, for the filter VII 2137; $\lambda 8$, for the filter VIII 2138; and $\lambda 9$, for the filter IX 2139. The individual wavelengths are numbered in order beginning with the shortest wavelength. Optical receivers I 2141 through IX 2149, each of which employs a photodiode, convert optical signals that pass through the respective filters into electric signals, and output the electric signals to corresponding drivers I 2151 through IX 2159. Each optical receiver has a Pin photodiode (Pin-PD) mounted on it, and adjusts a waveform by using an amplifier, an equalizer, and an identifier, which are connected to the rear step of the Pin photodiode, and outputs the resultant waveform. The filter I 2131 and the optical receiver I 2141 provide fixed wavelength reception means that correspond to the wavelength $\lambda 1$. Similarly, the filter II 2132 and the optical receiver II 2142 form fixed wavelength reception means that corresponds to the wavelength $\lambda 2$; the filter III 2133 and the optical receiver III 2143 form fixed wavelength reception means that corresponds to the wavelength $\lambda 3$; the filter IV 2134 and the optical receiver IV 2144 form fixed wavelength reception means that corresponds to the wavelength $\lambda 4$; the filter V 2135 and the optical receiver V 2145 form fixed wavelength reception means that corresponds to the wavelength $\lambda 5$; the filter VI 2136 and the optical receiver VI 2146 form fixed wavelength reception means that corresponds to the wavelength $\lambda 6$; the filter VII 2137 and the optical receiver VII 2147 form fixed wavelength reception means that corresponds to the wavelength $\lambda 7$; the filter VIII 2138 and the optical receiver VIII 2148 form fixed wavelength reception means that corresponds to the wavelength $\lambda 8$; and the filter IX 2139 and the optical receiver IX 2149 form fixed wavelength reception means that corresponds to the wavelength $\lambda 9$. The drivers I 2151 through IX 2159 transmit electric signals that obtained through O/E conversion by the photodiode. Input terminals 2161 through 2166 are connected to main transmission paths that are employed to connect node devices. Input terminals 2166 through 2169 are connected to sub-transmission paths that are employed to connect node devices to transmission/reception terminals. It should be noted that the number of input terminals for the main and sub transmission paths or the ratio of these numbers is not limited to this example. A control unit 2171 controls the packet switching operation of the node device, and includes a buffer control unit 2173 and a wavelength control unit 2172. The buffer control unit 2173 controls to read, from the buffer means, signals that are to be transmitted on the basis of an instruction from the wavelength control unit 2172 until the transmission wavelength of the variabl wavelength transmission means matches the reception wavelength of the fixed wavelength reception means, which corresponds to an output terminal to which an input signal is transmitted. The wavelength control unit 36 controls the transmission wavelength of the variable wavelength transmission means according to a predetermined transmission wavelength control pattern, which will be described later. Output terminals 2181 through 2186 are connected to main transmission paths that connect node devices. Output terminals 2186 through 2189 are connected to sub-transmission paths that are employed to connect the node devices to the transmission/reception terminals. It should be noted that the number of output terminals for the main and sub transmission paths or the ratio of these numbers is not limited to this example.

The buffers I 2111 through IX 2119 in this switching device have the internal arrangement shown in FIG. 8. As is shown in a memory map in FIG. 36, a memory area in a dual port memory 39 are divided into nine regions in consonance with the output terminals to which packets are to be output. The head addresses of the individual memory regions are A1, A2, A3, A4, A5, A6, A7, A8 and A9, respectively. The size of each memory region is as large as a packet.

Figure 37:
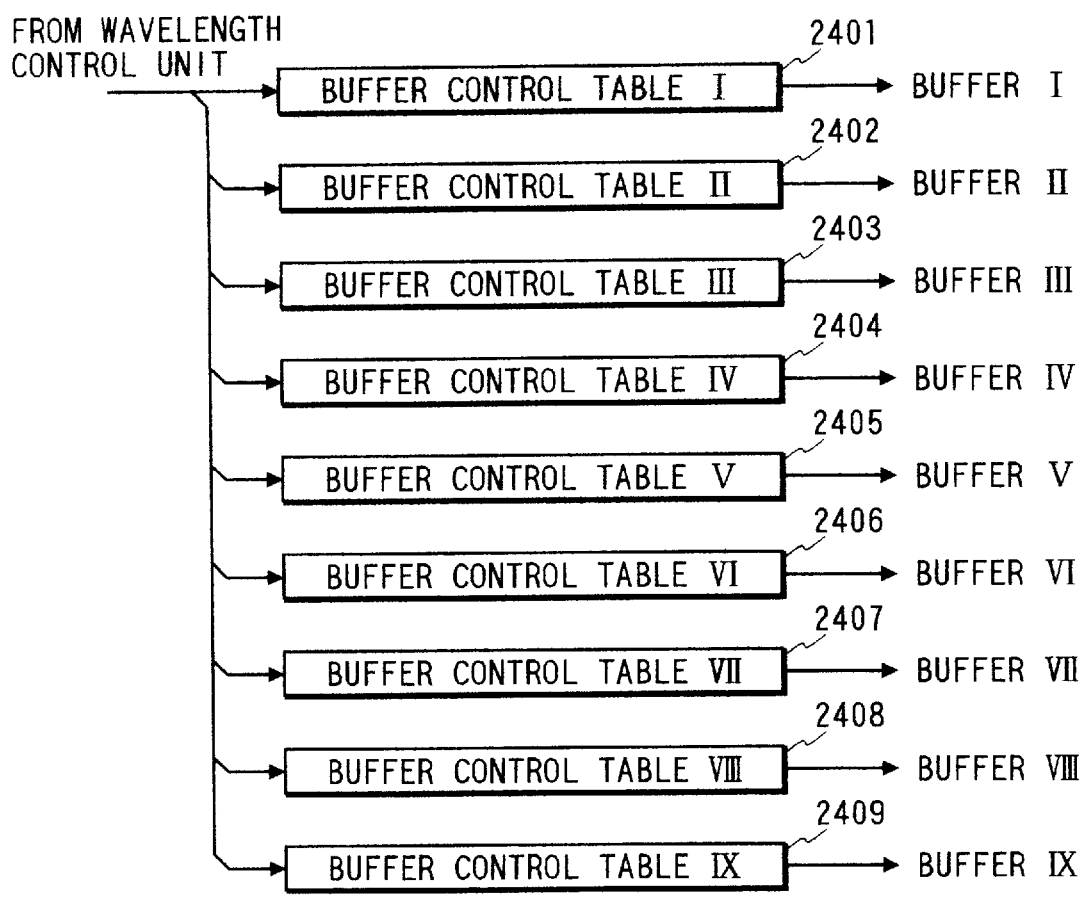
FIG. 37 is a diagram illustrating the arrangement of a buffer control unit according to the tenth embodiment of the present invention.

FIG. 37 is a diagram showing the internal arrangement of the buffer control unit 2173 that is employed for the switching device in this embodiment. In FIG. 37, buffer control tables I 2401 through IX 2409 are sequentially read in consonance with addresses that are output from the wavelength control unit 2172, and predetermined offset values are output to the reading address counters 40 of the respective buffers I 2111 through IX 2119. These tables are constituted by a read only memory (ROM). The contents in the buffer control tables I through IX will be described later.

Figure 38:
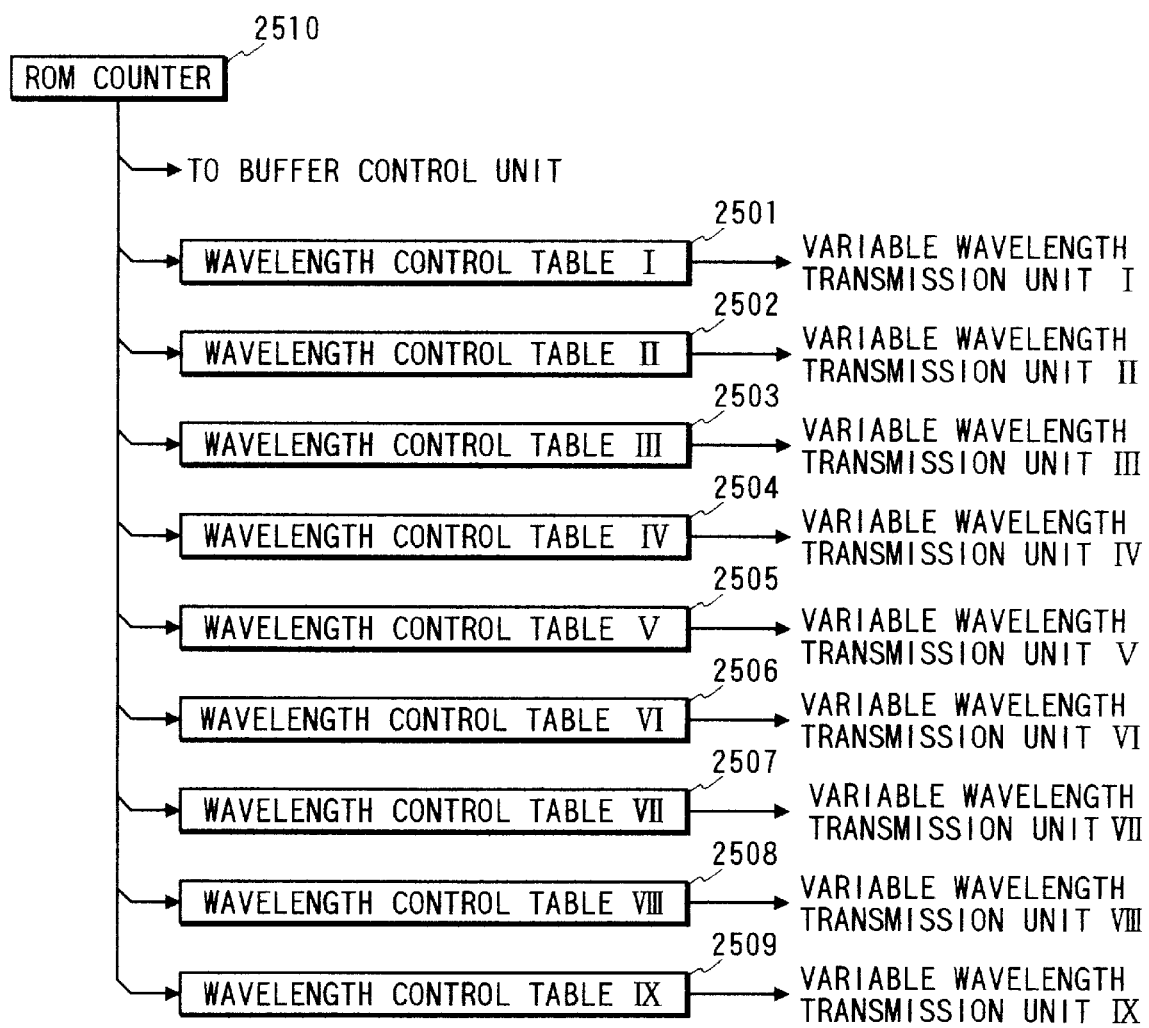
FIG. 38 is a diagram illustrating the arrangement of a wavelength control unit according to the tenth embodiment of the present invention.

FIG. 38 is a diagram showing the internal arrangement of the wavelength control unit 2172. In FIG. 38, wavelength control tables I 2501 through IX 2509, are sequentially read in consonance with addresses that are output by a 3-bit ROM counter 2510, and predetermined wavelength control signals are output to the drive units of the respective variable wavelength transmission units I through IX. These tables are constituted by a read only memory (ROM). The contents in the wavelength control tables I through IX will be described later.

The variable wavelength transmission units I through IX of the switching device in this embodiment have the internal arrangement shown in FIG. 12.

Figure 36:
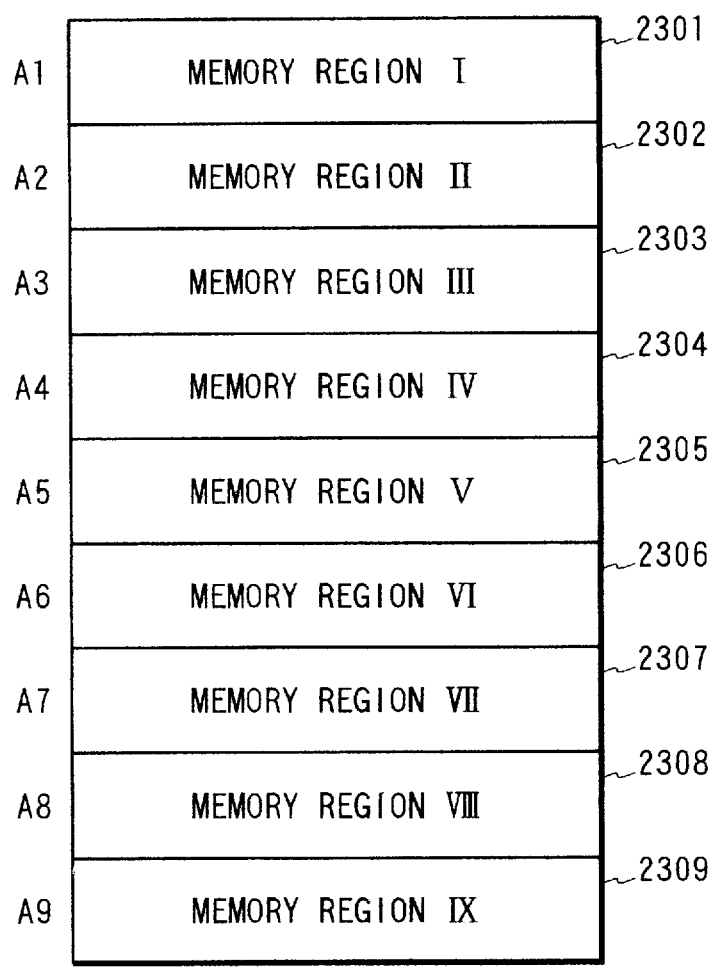
FIG. 36 is a diagram showing the memory map of a dual port memory according to the tenth embodiment of the present invention.

Table 11 shows the wavelength control tables I through IX that indicate the contents of the transmission wavelength control pattern for explaining the basic operation of the present invention. A wavelength control pattern of one cycle is written in each table. In the following explanation, it is supposed that the period wherein one wavelength is selected (one connection period is the same regardless of which wavelength is selected). Table 12 shows offset values of the buffer control tables I through IX. The transmission wavelength control by employing Tables 12 and 13 will now be explained. Table 11 shows the wavelengths that the individual variable wavelength transmission units transmit under the control of the wavelength control unit 2172. Numbers that are given to the wavelength control patterns represent the transmission wavelengths for individual variable wavelength transmission units; 1 indicates wavelength $\lambda 1$, 2 indicates wavelength $\lambda 2$, . . . , and 9 indicates wavelength $\lambda 9$. In this embodiment, the wavelength $\lambda 1$ is the shortest while the wavelength $\lambda 9$ is the longest, and as the value of the identifier n of the wavelength $\lambda n$ becomes greater, the wavelength also becomes longer. The wavelength control table and the buffer control table are synchronously read by the ROM counter 2510. Further, as is shown in Table 11, the transmission wavelengths of the variable wavelength transmission units have their cyclical changing phases shifted, so that two or more variable wavelength transmission units do not perform transmission with the same wavelength. In this table, the odd numbered wavelengths are selected in ascending order beginning at the smallest odd (or even) numbered wavelength (the first one for an odd number and the second one for an even number) to serve as the transmission wavelengths of the variable wavelength transmission units. After the largest odd numbered wavelength is selected, the even numbered wavelengths are selected in descending order until the second wavelength is finally selected. This pattern can be employed when the wavelengths are arranged in the order of their lengths. Since such a pattern is set, the transmitters employ this pattern as a common pattern by which to shift timing (by the connection period). As a result, the employment of the same wavelength for transmissions from two or more transmitters can be prevented, and the magnitude of the wavelength change at the time a specific wavelength of each transmitter is changed to another wavelength can be reduced. Referring to Tables 12 and 13, when the transmission wavelength of the variable wavelength transmission unit is $\lambda 1$, value A1 in a memory region I is assigned for the offset value that is employed for reading the dual port memory in the buffer. Similarly, when the transmission wavelengths are $\lambda 2, \lambda 3, \lambda 4, \lambda 5, \lambda 6, \lambda 7, \lambda 8$ and $\lambda 9$, the values in corresponding memory regions II through IX are assigned for the offset values. In FIG. 36, the memory regions I through IX respectively correspond to the output terminal numbers which also correspond to the transmission wavelengths $\lambda 1$ through $\lambda 9$, respectively. Therefore, the wavelength control tables are set as is shown in Table 11, and then the buffer control tables are set as is shown in Table 12, so that reading of packet data that are stored in the individual buffers is controlled until the wavelength of the data matches the reception wavelength of the reception unit that corresponds to an output terminal at which data are to be output. In this switching device, the arbitration that is performed each time the packets are output to prevent blocking when there is a plurality of packets is not required, and the switching operation is simpler. The above described pattern is so set that the outputs of the buffers are transmitted equally to individual output terminals. When there are many packets that are to be output to a specific output terminal, a problem will arise, especially with the buffers, because when many packets are input and the capacity of a buffer is exceeded, more specifically, the size of a region that corresponds to a specific terminal in the buffer, a packet overflow will occur. In addition, though the capacity of the region is increased, when stored packets exceed the volume that is output to a specific output terminal at one time, the output must be kept waiting for the next opportunity when the specific output terminal is again connected, and a delay can be easily caused.

FIG. 39 is a diagram illustrating a communication network that is employed in this embodiment.

Node devices 2701 through 2705 are switching devices that have been explained while referring to FIG. 35. The node device determines whether or not an input packet has been sent to a transmitting and receiving terminal equipment that is connected to the local node device, or to a transmitting and receiving terminal equipment that is connected to another node device, and outputs the packet to a desired output terminal by employing the switching function of the switching unit in the node device, so that the packet can be transmitted to a destination transmitting and receiving terminal equipment. Transmitting and receiving terminal equipments 2711 through 2716, which are connected to corresponding node devices 2701 through 2705, divide transmission information into a fixed length, and transmit divided information pieces as packets. A main transmission path 2720 consists of six transmission paths 2741 through 2746, which are coaxial cables that are used to connect output terminal 2181 through 2186 (see FIG. 35) in each node device and input terminal 2161 through 2166 in an adjacent node device. Such a mode may also be possible in which electric signals that are output from the output terminal 2181 through 2186 are converted into optical signals and the node devices are connected by an optical fiber cable, or that optical signals that pass through the fixed wavelength filters in the individual node devices are transmitted by an optical fiber cable that connects the node devices. In such a mode, optical receivers should be employed as the receivers for the node devices. Ascending sub-transmission paths 2721 through 2723 are employed to transmit electric signals that are output at the transmitting and receiving terminal equipments 2711 through 2713 to the input terminal 2167 through 2169 of the connected node device. Descending sub-transmission paths 2731 through 2733 are employed to transmit electric signals that are output at the transmitting and receiving terminal equipments 2711 through 2713 to the input terminals 2167 through 2169 of the connected node device. A mode wherein an optical signal is employed to transmit a signal between the transmitting and receiving terminal equipment and the node device may be used. In this case, an E/O switching device and an O/E switching device need only to be located on the signal routes for the output terminal and input terminal of the transmitting and receiving terminal equipment and for the output terminal and input terminal in the node device. For convenience sake, the terminal equipments that are connected to the node devices 2703, 2704, and 2705 are not shown in FIG. 39. In the thus depicted network system, the rate at which a packet that has passed along the main transmission path is switched to a sub-transmission path differs from the rate at which such a packet is switched to another transmission path in the main transmission path. The rate at which a packet that has passed along a sub-transmission path is switched to another sub-transmission path also differs from the rate at which such a packet is switched to the main transmission path. For these reasons, the packet overflow condition described above tends to occur.

In this embodiment, therefore, as is shown in Table 7, the frequencies at which a specific input terminal is connected to a specific output terminal is increased. During one cycle of a pattern (from the beginning of the pattern to its end, or from address 0 to the final address), not only is the connection frequency is increased, but also a connecting time period is extended.

The arrangement of wavelengths in the transmission wavelength control patterns in Table 7 will now be explained.

A transmission wavelength control pattern is written in each wavelength control table in Table 7. Therefore, the transmission wavelengths of the variable wavelength transmission units I 2121 through III 2123, which are controlled with the wavelength control tables I through III, are shifted in the order $\lambda 1$, $\lambda 3$, $\lambda 5$, $\lambda 7$, $\lambda 9$, $\lambda 8$, $\lambda 6$, $\lambda 4$ and $\lambda 2$, and this series of shifting is repeated as a transmission wavelength control pattern. The transmission wavelength control pattern is employed to switch a packet, which has passed along one transmission path in the main transmission path, to another path in the main transmission path or to one of the sub-transmission paths. The optical signals of the wavelengths $\lambda 1$, $\lambda 2$, $\lambda 3$, $\lambda 4$, $\lambda 5$ and $\lambda 6$ that are output by the variable wavelength transmission units I 2121 through III 2123 pass through the respective filters I 2131 through VI 2136. Then, these signals are output as electric signals to the main transmission path at the output terminals 2181 through 2186. That is, optical signals whose wavelengths are changed to $\lambda 1$, $\lambda 2$, $\lambda 3$, $\lambda 4$, $\lambda 5$ and $\lambda 6$ are those that are to be switched to the main transmission path, and optical signals whose wavelengths are changed to $\lambda 7$, $\lambda 8$ and $\lambda 9$ are those that are to be switched to sub-transmission paths. Therefore, two thirds of the transmission wavelength control pattern in which the wavelength is shifted in the order $\lambda 1$, $\lambda 3$, $\lambda 5$, $\lambda 7$, $\lambda 9$, $\lambda 8$, $\lambda 6$, $\lambda 4$ and $\lambda 2$ are employed to switch an input packet to the main transmission path, and the remaining one thirds is employed to switch an input packet to a sub-transmission path. The transmission wavelengths of the variable wavelength transmission units IV, V and VI are repetitively shifted in the order $\lambda 1$, $\lambda 3$, $\lambda 5$, $\lambda 6$, $\lambda 4$, $\lambda 2$, $\lambda 6$, $\lambda 4$ and $\lambda 2$. The shifting pattern for the transmission wavelengths is employed to switch a packet that has passed along one transmission path in the main transmission path to another transmission path in the main transmission path. The transmission wavelengths of the variable wavelength transmission units VII, VIII and IX are repetitively shifted in the order $\lambda 1$, $\lambda 3$, $\lambda 5$, $\lambda 7$, $\lambda 9$, $\lambda 8$, $\lambda 7$, $\lambda 9$ and $\lambda 8$. The shifting pattern for the transmission wavelengths is employed to switch a packet that has passed along one sub-transmission path to the main transmission path or to another sub-transmission path.

The wavelength control tables IV, V and VI and the wavelength control table VII, VIII and IX are set as follows. The wavelength control table IV is so set that a wavelength shifting pattern of $\lambda 7$, $\lambda 9$ to $\lambda 8$, which is one part of the transmission wavelength control pattern of the wavelength control table I (II or III), is replaced with a shifting pattern in the order $\lambda 6$, $\lambda 4$, and $\lambda 2$. The wavelength control table VIII is so set that the shifting pattern of $\lambda 6$, $\lambda 4$ and $\lambda 2$, which is one part of the transmission wavelength control pattern of the wavelength control table I (II or III), is replaced with a shifting pattern in which the wavelength is shifted in the order $\lambda 7$, $\lambda 9$ and $\lambda 8$. The wavelength control tables VIII and IX are also set by replacing the shifting pattern in the same manner. For this replacement, patterns for the wavelength control tables in Table 5 are employed as basic shifting patterns. And, for example, one part of the transmission control pattern of the wavelength control table VII, in which the wavelength is shifted in the order $\lambda 6$, $\lambda 4$, and $\lambda 2$, is replaced with the shifting pattern, in which the wavelength is shifted in the order $\lambda 7$, $\lambda 9$ and $\lambda 8$, that is one part of the transmission wavelength control pattern of the wavelength control table IV that is synchronized with that shifting pattern. Optical signals that have the wavelengths $\lambda 6$, $\lambda 4$, and $\lambda 2$ and which are employed as replacements, pass through the respective fixed wavelength filters VI, IV and II and are switched to the main transmission path at the output terminals 2186, 2184 and 2182. Optical signals that have the wavelengths $\lambda 7$, $\lambda 9$ and $\lambda 8$ are switched to a sub-transmission path. Therefore, the wavelength control table VII (VIII, or IX) is so set that the count for switching the optical signals to output terminals that are connected to the sub-transmission paths is greater than the count for switching the optical signals to output terminals that are connected to the main transmission path. The wavelength control table IV (V or VI) is so set that the count for switching the optical signals to output terminals that are connected to the main transmission path is greater than the count for switching the optical signals to output terminals that are connected to the sub-transmission paths.

Figure 40A:
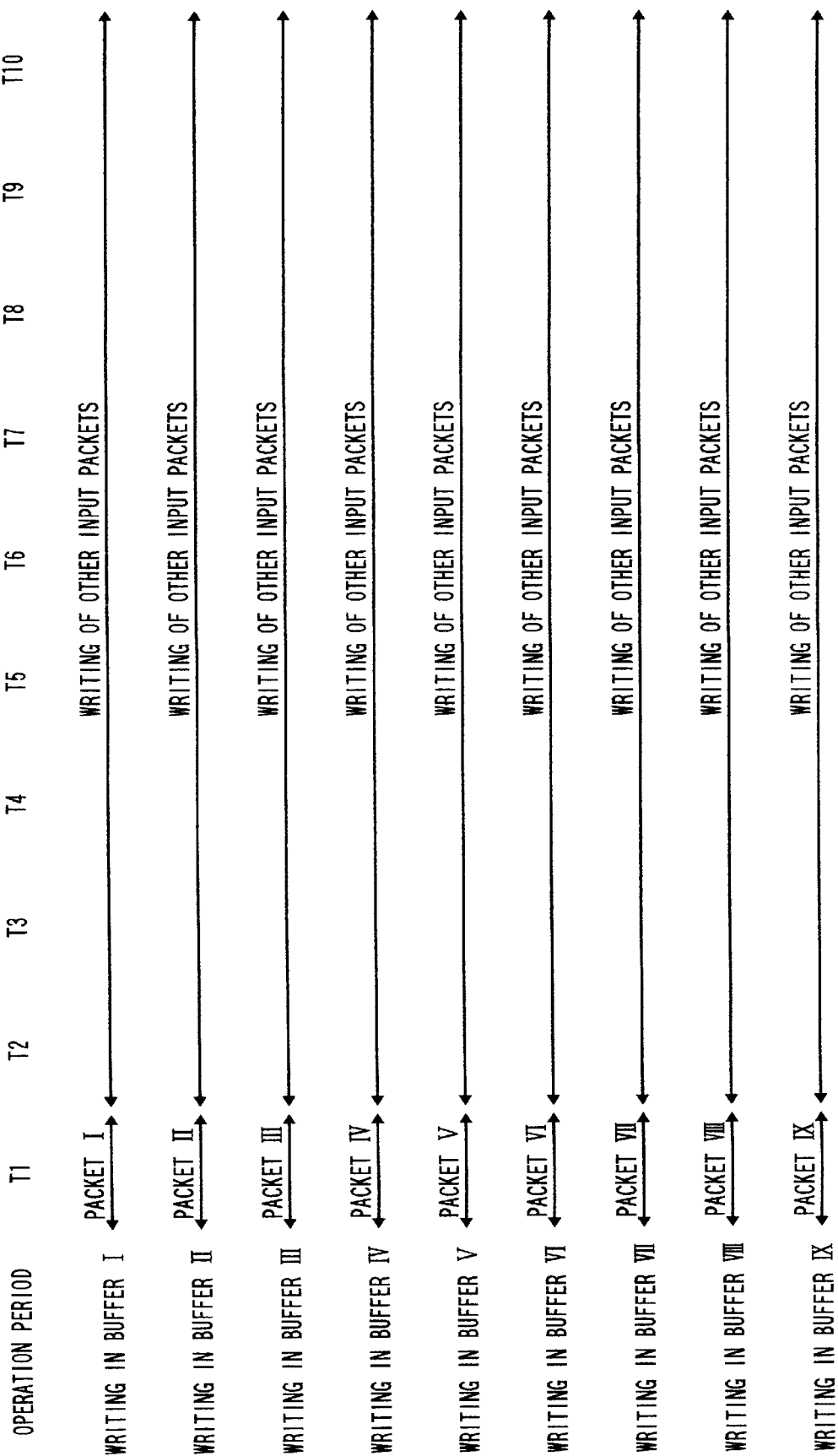
FIGS. 40A to 40C are time charts for the switching operation according to the tenth embodiment of the present invention.
Figure 40B:
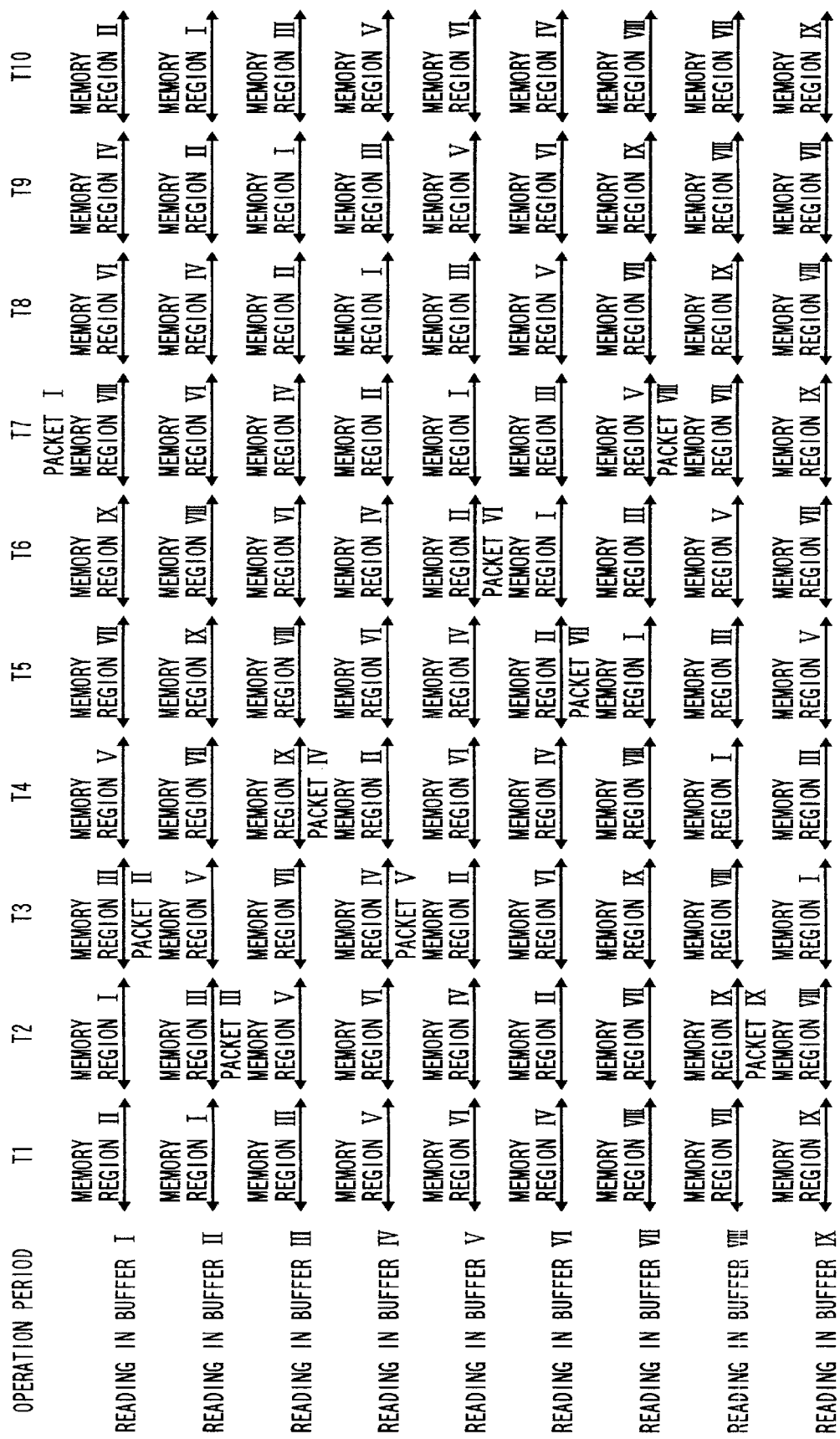
Figure 40C:
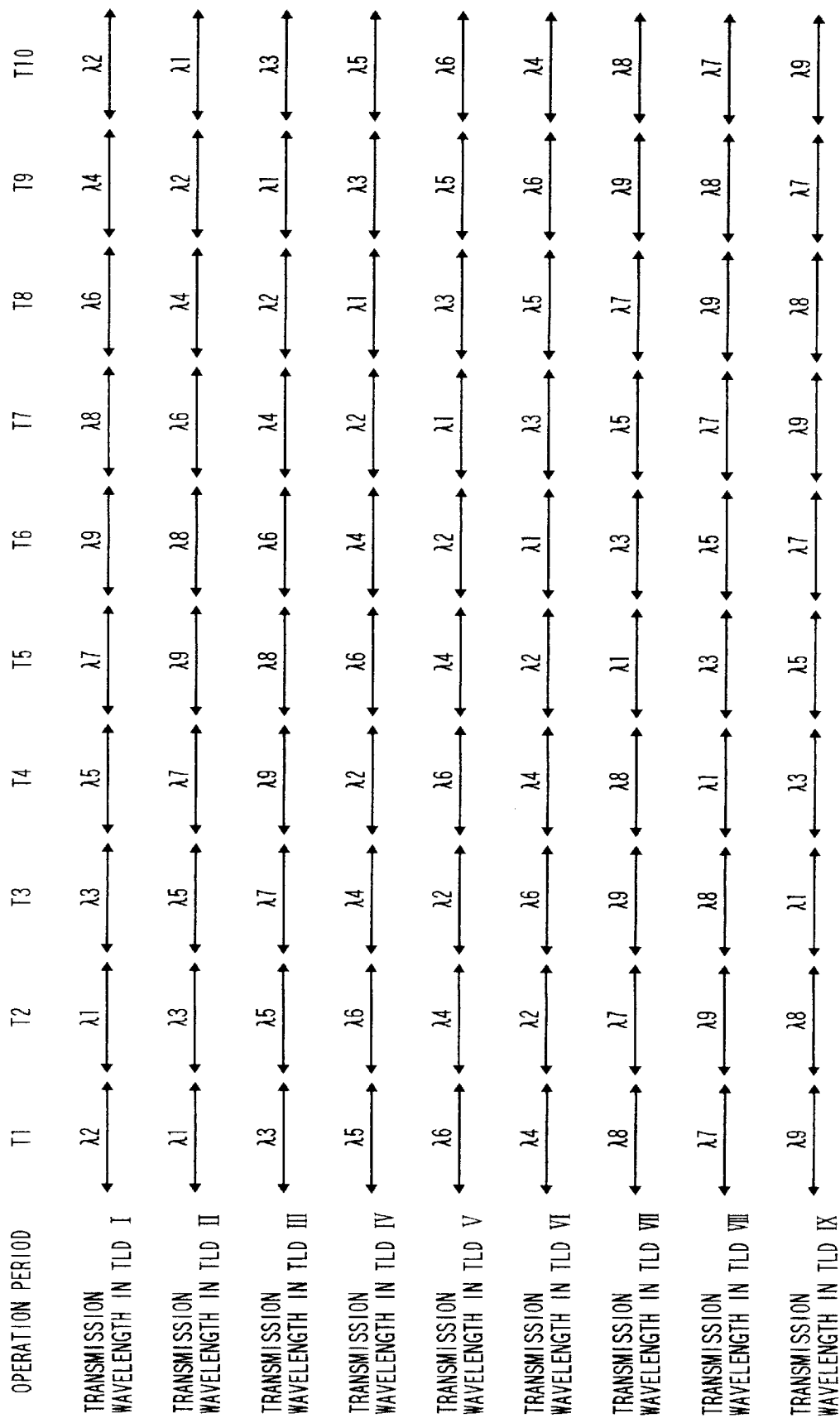

The employment of the transmission wavelength control tables for the node device according to the present invention will now be described while referring to FIGS. 8, 35 through 39, Tables 7 and 8, and a time chart in FIGS. 40A to 40C, by employing an example wherein each of nine packets (packets I through IX) are input to nine input terminals at the same time. It should be noted that the packets I through IX are respectively input to the input terminals 2161 through 2169 of the node device 2701. The packets I, VIII and IX are transmitted to the transmitting and receiving terminal equipment 2712, the transmitting and receiving terminal equipment 2711, and the transmitting and receiving terminal equipment 2712, respectively. The packets II through VII are to be output to the output terminals 2185, 2185, 2182, 2182, 2181 and 2181 of the node device 2701.

In the following explanation, the same reference numbers as are used in FIGS. 35 through 39 are employed to denote components that have a corresponding or an identical internal structure.

The operation of the node device of the present invention is performed in sequential operation periods T1, T2, T3, T4, T5, T6, T7, T8, T9 and T10. Suppose that the operation period where nine packets (packets I through IX) are input is T1.

When the packet I is input at an input terminal in the operation period T1, the decoder 37 of the buffer I 2111 reads the address portion of the input packet I. The output terminal to which the input packet is to be output is output terminal VIII (the transmitting and receiving terminal equipment 2712 that is a transmission destination), which is connected to the optical receiver VIII 2148 that receives an optical signal that has wavelength λ8. The decoder 37 decodes the address portion and outputs A8 as a writing start address value to the writing address counter 38. The writing address counter 38 loads the writing start address, generates a writing address for the input packet data by sequentially incrementing the counter value, and outputs the writing address to the dual port memory 39. The packet data that are input at the input terminal are transmitted to the input port of the dual port memory 39, and are sequentially written to the memory region VIII in consonance with the address that is output by the address counter 38. In the same manner as is described above, the remaining eight packets that have been input in the operation period T1 are written to the memory regions V, V, I, II, I, I, VII, and VIII of the dual port memory 39.

In the succeeding operation period T2, first, "0" is simultaneously output as a reading address by the ROM counter 2510 of the wavelength control unit 2172 to the wavelength control tables I through IX. The contents of the wavelength control tables are read in consonance with the address. As is shown in Table 7, the contents that are read from the tables at this time are control signals that correspond to the wavelengths. That is, a control signal that is read from the wavelength control table I corresponds to the wavelength λ1, and similarly, control signals that are read from the wavelength control tables II, III, IV, V, VI, VII and VIII correspond-respectively to the wavelengths λ3, λ5, λ6, λ4, λ2, λ7, λ9 and λ8. These control signals are respectively transmitted to the drive units of the variable wavelength transmission units I 2121 through IX 2129. In each of the drive units, a current to be introduced by the current injection unit is determined in consonance with the received wavelength control signal, and the transmission wavelength of the tunable laser diode (TLD) in each variable wavelength transmission unit is set to be a predetermined wavelength. The reading address value 0 that is output by the ROM counter 2510 of the wavelength control unit 2172 is also transmitted to the buffer control tables I through IX of the buffer control unit 2173. The contents of the buffer control tables I through IX are read in consonance with this address. More specifically, as is shown in Table 9, offset value A1 that corresponds to the memory region I is read from the buffer control table I. Similarly, the offset values A3, A5, A6, A4, A2, A7, A9 and A8, which respectively correspond to the memory regions III, V, VI, IV, II, VII, IX, and VIII, are read from the buffer control tables II through IX. These offset values are output to the reading address counters 40 of the respective buffers I through IX. In each of the buffers, the reading address counter 40 loads an offset value that is output by the buffer control table, sequentially increments the counter value to generate a reading address for reading a packet from the memory region that is indicated by the offset value, and outputs the reading address to the dual port memory 39. In consonance with this reading address, the input packet is read and sequentially output at the output port of the dual port memory 39 to the variable wavelength transmission unit.

In the operation period T2, a counter value is incremented by the offset value A5 that is acquired from the buffer control table III 2403. A reading address for the packet III in a memory region V 2305, which is indicated by the offset value, is output to the dual port memory 39. According to this reading address, the packet III that is stored in the memory region V 2305 is read and is output at the output port of the dual port memory 40 to the variable wavelength transmission unit III 2123. In consonance with a wavelength control signal from the wavelength control unit 2172, the variable wavelength transmission unit III 2123 converts the packet III that is received from the buffer III 2113 into a signal that has a predetermined wavelength, λ5 in this case, and emits it to the star coupler 2174. The reading address counter 40 in the buffer IX 2119 loads an offset value A8 that is output from the buffer control table IX 2409, sequentially increments the counter value to generate a reading address for reading the packet IX from the memory region VIII 2308 that is indicated by the offset value, and outputs the reading address to the dual port memory 39. In consonance with this reading address, the packet IX that is stored in the memory region VIII 2308 is read and output at the output port of the dual port memory 40 to the variable wavelength transmission unit IX 2129. In consonance with a wavelength control signal from the wavelength control unit 2172, the variable wavelength transmission unit IX 2129 converts the packet IX that is received from the buffer IX 2119 into a signal that has a predetermined wavelength, λ8 in this case, and emits it to the star coupler 2174. As is described above, the wavelengths of the optical signals that are emitted by the variable wavelength transmission units are λ1, for the variable wavelength transmission unit I 2121; λ3, for the variable wavelength transmission unit II 2122; λ5, for the variable wavelength transmission unit III 2123; λ6, for the variable wavelength transmission unit IV 2124; λ4, for the variable wavelength transmission unit V 2125; λ2, for the variable wavelength transmission unit VI 2126; λ7, for the variable wavelength transmission unit VII 2127; λ9, for the variable wavelength transmission unit VIII 2128; and λ8, for the variable wavelength transmission unit IX 2129. Since the wavelengths of the optical signals that are emitted by the nine variable wavelength transmission units are different from each other and are under the control of the waveform control unit 2172, these signals are mixed by the star coupler 2174 without affecting each other, and optical signals that have all the wavelengths are transmitted to the filters I 2131 through IX 2139. The packets, other than the packet III that has been converted into an optical signal that has the wavelength $\lambda 5$ and the packet IX that has been converted into an optical signal that has the wavelength $\lambda 8$, i.e., the packets I, II, IV, V, VI, VII and VIII, are still stored in the memory regions VIII, V, II, II, I, I and VII, respectively. The packet III, which is converted into an optical signal that has the wavelength $\lambda 5$, and the packet IX, which is converted into an optical signal that has the wavelength $\lambda 8$, are output to the corresponding output ports of the star coupler 2174, pass through the filters V 2135 and VIII 2138, and are converted into electric signals by the optical receivers V 2145 and VIII 2148. The filter V 2135 transmits only an optical signal that has the wavelength $\lambda 5$ and the filter VIII 2138 transmits only an optical signal that has the wavelength $\lambda 8$. Of the optical signals that have nine wavelengths, $\lambda 1$ through $\lambda 9$, that enter the filters V 2135 and VIII 2138, the filter V 2135 transmits only an optical signal that has the wavelength $\lambda 5$ to the optical receiver V 2145 and blocks the other optical signals, and the filter VIII 2138 transmits only an optical signal that has the wavelength $\lambda 8$ to the optical receiver VIII 2148 and blocks the other signals. The filters I 2131, II 2132, III 2133, IV 2134, V 2135, VI 2136, VII 2137, and IX 2139 respectively transmit only the optical signals that have the wavelengths $\lambda 1, \lambda 2, \lambda 3, \lambda 4, \lambda 6, \lambda 7$, and $\lambda 9$. As is apparent from the wavelength control tables in Table 1 and the time chart in FIG. 40, therefore, the corresponding optical receivers I 2141, II 2142, III 2143, IV 2144, VI 2146, VII 2147, and IX 2149 receive packet data that were written before the operation period T1 in memory regions I, II, III, IV, VI, VII, and IX of the dual port memories 39 in the individual buffers I 2111, VI 2116, II 2112, V 2115, IV 2114, VII 2117, and IX 2119. The packet III that has been converted into an electric signal by the optical receiver V 2145 is transmitted by the driver V 2155 to the node device 2702. The packet IX that has been converted into an electric signal by the optical receiver VIII 2148 is transmitted by the driver VIII 2158 to the transmitting and receiving terminal equipment 2712, which is the transmission destination.

In the succeeding operation period T3, "1" is simultaneously output as a reading address by the ROM counter 2510 of the wavelength control unit 2172 to the wavelength control tables I through IX. The contents of the wavelength control tables are read in consonance with the address. The contents that are read from tables at this time are control signals that correspond to wavelengths, as is shown in Table 7. That is, a control signal that is read from the wavelength control table I corresponds to the wavelength $\lambda 3$. Similarly, control signals that are read from the wavelength control tables II, III, IV, V, VI, VII, VIII and IX correspond respectively to the wavelengths $\lambda 5, \lambda 7, \lambda 4, \lambda 2, \lambda 6, \lambda 9, \lambda 8$ and $\lambda 1$. These control signals are respectively transmitted to the drive units 2601 of the variable wavelength transmission units I 2121 through IX 2129.

In the same manner, the contents of the buffer control tables I through VIII are read out in consonance with the address 1 from the ROM 2510. More specifically, as is shown in Table 8, offset value A3 that corresponds to the memory region III is read from the buffer control table I. Similarly, the offset values A5, A7, A4, A2, A6, A9, A8 and A1, which respectively correspond to the memory regions V, VII, IV, II, VI, IX and VIII, are read from the buffer control tables II, III, IV, V, VI, VII and VIII.

Therefore, in the operation period T3, the variable wavelength transmission units II 2122 and V 2125 are employed to transmit the optical signals that have the wavelengths $\lambda 5$ and $\lambda 2$ to the reception unit V 2145 and II 2142, respectively. A packet signal of the packet II, which was written in the memory region V of the dual port memory 39 in the buffer II 2112 during the operation period T1, is input to the variable wavelength transmission unit II 2122. A packet signal of the packet V, which was written in the memory region II of the dual port memory 39 in the buffer V 2115 during the operation period T1, is input to the variable wavelength transmission unit V 2125. In this manner, in the operation period T3, the packet II is converted into an optical signal that has the wavelength $\lambda 5$, passes through the filter V 2135, and is converted into an electric signal by the optical receiver V 2145. The electric signal is output via the driver V 2155 to the output terminal 2185, and is finally transmitted to the node device 2702. The packet V is converted into an optical signal that has the wavelength $\lambda 2$, passes through the filter II 2132, and is converted into an electric signal by the optical receiver II 2142. The electric signal is output via the driver II 2152 to the output terminal 2182, and is finally transmitted to the node device 2702. At this time, under the control of the wavelength control unit 2172, the packets that were written before the operation period T3 began are converted into optical signals that have predetermined wavelengths by the variable wavelength transmission units other than the variable wavelength transmission units II 2122 and V 2125. These optical signals are emitted to the star coupler 2174 and pass through the individual filters, and are respectively converted into electric signals by the optical receivers. Then, the electric signals are output at the output terminals.

In the same manner, in the operation period T4, the packet IV that was input at the input terminal 2164 of the node device 2701 is output at the output terminal 2182 to the node device 2702. In the operation period T5, the packet VII that was input at the input terminal 2167 of the node device 2701 is output at the output terminal 2181 to the node device 2702. In the operation period T6, the packet VI that was input at the input terminal 2166 of the node device 2701 is output at the output terminal 2181 to the node device 2702. In the operation period T7, the packets I and VIII that were input at the respective input terminals 2161 and 2168 of the node device 2701 are respectively output at the output terminals 2188 and 2187 to the transmitting and receiving terminal equipments 2712 and 2711.

The route switching as is described for the node device 2702 is performed for the packets II through VII that are transferred to the adjacent node devices, and these packets finally arrive at the transmitting and receiving terminal equipments, which are their transmission destinations. As is described above, the node device that is controlled by using the transmission wavelength control pattern of the present invention can efficiently switch packets that are input to the node device. That is, the packet switching can be performed efficiently inside the node device because a transmission wavelength control pattern is employed that is provided by taking into consideration the characteristic of the route switching inside a node device for packets that are received along sub-transmission paths and a main transmission path, i.e., by taking into consideration the fact that, between terminal equipments that are connected to the same node device in a network as shown in this embodiment, the communication volume is large.

In the communication network system shown in FIG. 35, of the number of packets that are input to one input terminal of the node device, the number of packets that can be switched to the main transmission path is different from the number of packets that can be switched to sub-transmission paths. It is necessary when designing a system to optimize the rate at which a packet that is input along a sub-transmission path is switched to another sub-transmission path and the rate at which such a packet is switched to a main transmission path, and the rate at which a packet that is input along one path in a main transmission path is switched to a sub-transmission path and the rate at which such a packet is switched to another path in the main transmission path. In the present invention, the transmission wavelength control patterns VII through IX employ the wavelength shift pattern of $\lambda 7 \rightarrow \lambda 9 \rightarrow \lambda 8$ twice to increase the count of the packet switchings to sub-transmission paths. The transmission wavelength control patterns IV through VI employ shift patterns $\lambda 6 \rightarrow \lambda 4 \rightarrow \lambda 2$ twice to increase the count of the packet switchings to the main transmission path. Since the thus set wavelength transmission control patterns are used for the node device that has the packet switching function, in the node device, blocking can be reduced that occurs because of a packet that has passed along the main transmission path and a packet that has passed along the sub-transmission path. As a result, the efficiency of the packet switching in the node device can be increased. The count of switching of a packet that has passed along the main transmission path to a sub-transmission path and the count of switching of such a packet to a main transmission path, and the count of switching a packet that has passed along a sub-transmission path to another sub-transmission path and the count of switching such a packet to a main transmission path are set in consonance with a traffic characteristic of the network system in node devices that are connected in a loop. The efficiency of the packet switching in the node device can be enhanced.

(Embodiment 11)

Tables 9 and 10 show a wavelength control table and a buffer control table, respectively, which are employed in this embodiment. The wavelength control table shown in Table 9 represents wavelength control patterns of the present invention that respectively correspond to nine variable wavelength transmission means.

Table 9 shows wavelength control patterns for main transmission path and sub-transmission path which correspond to variable wavelength transmission means employed in the main transmission path and sub-transmission path, respectively. The waveform control tables I through VI, which are set with main transmission wavelength control patterns for the efficient switching of a packet that has passed along a main transmission path, are employed to control the transmission wavelengths of variable wavelength transmission units I through VI in a node device that was previously described. For example, the transmission wavelength of the variable wavelength transmission unit I is shifted by referring to the entries in the wavelength control table I in the order $\lambda 6, \lambda 4, \lambda 2, \lambda 1, \lambda 3, \lambda 5, \lambda 6, \lambda 4, \lambda 2, \lambda 1, \lambda 3, \lambda 5, \lambda 7, \lambda 9$, and $\lambda 8$, and this transmission wavelength control pattern is repeated. The transmission wavelength control tables VII, VIII and IX, which are used to efficiently switch a packet that has passed along a sub-transmission path, are employed to control the transmission wavelengths of the variable wavelength transmission units VII, VIII and IX in the node device. As is apparent from the above explanation (see the wavelength control patterns in FIG. 9), there are two transmission wavelength control pattern shift types: the transmission wavelength control pattern for the variable wavelength transmission units I through VI, and the transmission wavelength control pattern for the variable wavelength transmission units VII through IX. The transmission wavelength control pattern for the variable wavelength transmission units I through VI consists of two iterative basic main transmission wavelength control patterns in which the wavelength is shifted in the order $\lambda 6 \rightarrow \lambda 4 \rightarrow \lambda 2 \rightarrow \lambda 1 \rightarrow \lambda 3 \rightarrow \lambda 5$, and one basic sub-transmission wavelength control pattern in which the wavelength is shifted in the order $\lambda 7 \rightarrow \lambda 9 \rightarrow \lambda 8$. The control pattern is designated the basic main transmission wavelength control pattern because optical signals that have the transmission wavelengths $\lambda 1, \lambda 2, \lambda 3, \lambda 4, \lambda 5$ and $\lambda 6$ are transmitted to the main transmission path from the node device. The variable wavelength transmission units I through VI control the transmission wavelength in consonance with the circulating wavelength control pattern. The transmission wavelength control pattern for the variable wavelength transmission units VII through IX consists of two iterative basic sub-transmission wavelength control patterns in which the wavelength is shifted in the order $\lambda 7 \rightarrow \lambda 9 \rightarrow \lambda 8$, and one basic main transmission wavelength control pattern in which the wavelength is shifted in the order $\lambda 6 \rightarrow \lambda 4 \rightarrow \lambda 2 \rightarrow \lambda 1 \rightarrow \lambda 3 \rightarrow \lambda 5$. The variable wavelength transmission units VII through IX control the transmission wavelengths in consonance with the repetitious transmission wavelength control pattern.

Since the operation of the node device that employs the transmission wavelength control pattern of the present invention is the same as in the tenth embodiment, no explanation will be given here.

In the looped network system shown in FIG. 35, of the number of packets that are input to one input terminal of the node device, the number of packets that can be switched to the main transmission path is different from the number of packets that can be switched to sub-transmission paths. It is necessary on a system design to optimize the rate at which a packet that is input along a sub-transmission path is switched to another sub-transmission path and the rate at which such a packet is switched to a main transmission path, and the rate at which a packet that is input along one path in a main transmission path is switched to a sub-transmission path and the rate at which such a packet is switched to another path in the main transmission path.

In this embodiment, the transmission wavelength control pattern for the variable wavelength transmission units VII through IX consists of two repetitious basic sub-transmission wavelength control patterns and one basic main transmission wavelength control pattern. The number of packet switching to a sub-transmission path that is performed by the variable wavelength transmission units VII through IX is greater than the number of packet switching to a sub-transmission path that is performed by the variable wavelength transmission units I through VI. The transmission wavelength control pattern for the wavelength transmission units I through VI consists of the two repetitious basic main transmission wavelength control patterns and one basic sub-transmission wavelength control pattern. The number of packet switching to a main transmission path that is performed by the variable wavelength transmission units I through VI is greater than the number of packet switching to a main transmission path that is performed by the variable wavelength transmission units VII through IX. Since these transmission wavelength control patterns are used for the preciously described node device, blocking can be prevented when a packet is switched in the node device. Further, the number of switchings of a packet that has passed along a main transmission path to a sub-transmission path, and the number of switchings of such a packet to a main transmission packet can be set to optimal values. Also, the number of switching a packet that has passed along a sub-transmission path to another sub-transmission path, and the number of switchings of such a packet to a main transmission packet can be set to optimal values. Therefor, the efficiency of the packet switching :is increased for the node devices that have the switching function and that are connected in a loop.

(Embodiment 12)

Figure 41A:
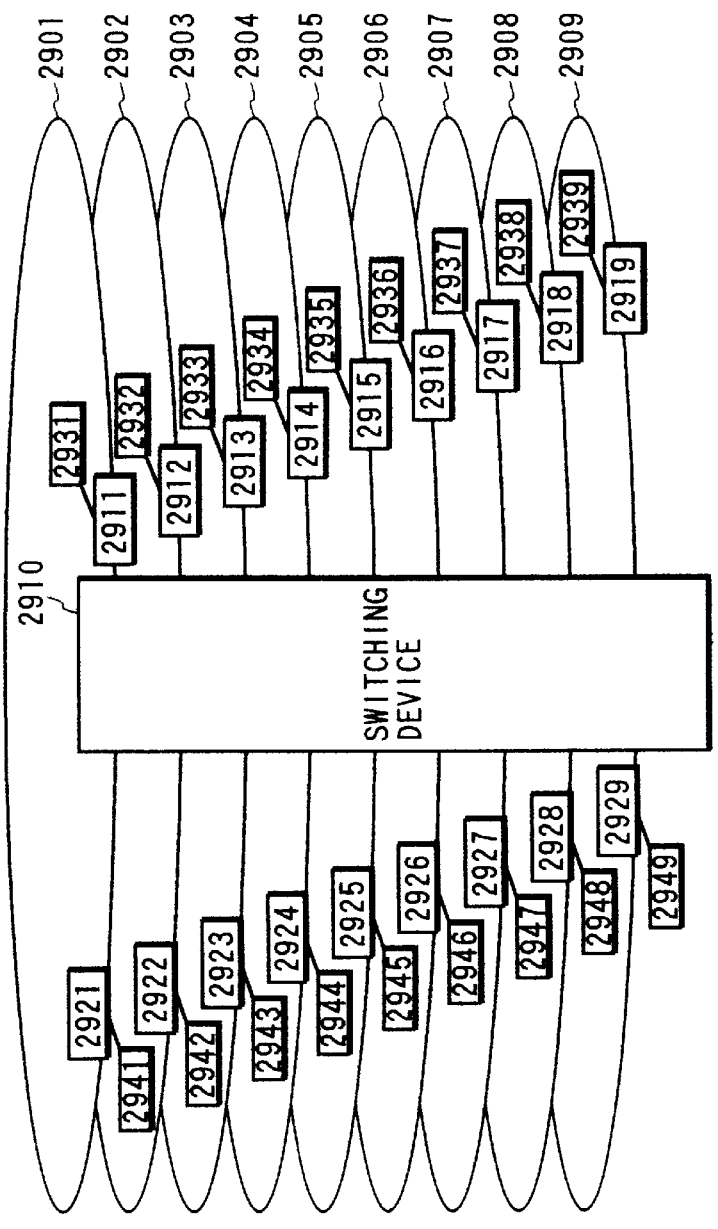
FIGS. 41A and 41B are diagrams illustrating the arrangement of a network and the structure of a node device according to a twelfth embodiment of the present invention.
Figure 41B:
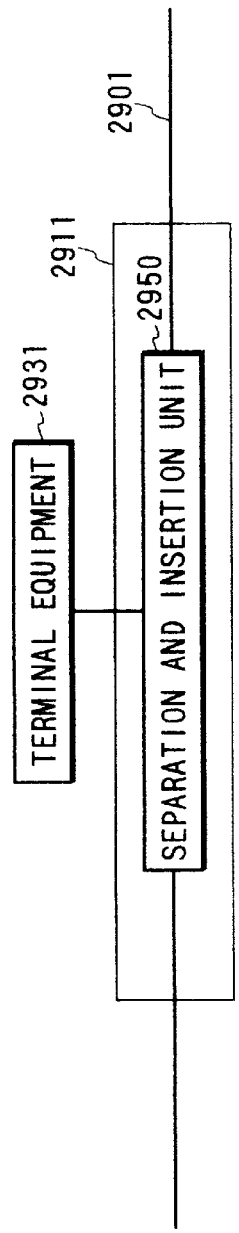

In the eleventh embodiment, the switching device performs switching for a main transmission path and sub-transmission paths. In the twelfth embodiment, a switching device does not perform switching between a node device and a terminal equipment (which corresponds to the switching of sub-transmission paths in the previous embodiment). FIG. 41A is a diagram showing a network according to this embodiment. Transmission paths 2901 through 2909 are connected to a switching device 2910, and node devices 2911 through 2919, and 2921 through 2929 are respectively connected to the transmission paths. Further, terminal equipments 2931 through 2939 and 2941 through 2949 are connected to the respective node devices. The structure of each of the node devices is shown in FIG. 41B. Each node device has internally a separation and insertion unit 911 that separates a desired packet from packets that are input, and outputs the packet at a terminal equipment so as to insert it into a packet flow in a transmission path. A receiver and a driver are provided as needed inside the node device. In this embodiment, a switching device 2910 only switches the connection relationship of the transmission paths 2901 through 2909. The switching device that is explained in the previous embodiment can be used for the switching device 2910. Since, in this embodiment, the switching of a signal from one terminal equipment to a desired terminal equipment is not performed merely by the switching device, each node device examines that the destination of an input packet to determine whether it is a terminal equipment to which that node device is connected, and determines whether the packet is to be separated and output to the terminal equipment side, or is to be passed unchanged through the node device. In this arrangement, since the switching device need only determine a transmission path to which is connected a destination terminal equipment of an input packet, the switching operation by the switching device is easily performed. With this arrangement, it is possible to perform efficient switching when the connecting period for specific input and the output terminals of the switching device is set long on the average (with this structure, for example, a desired number of node devices can be connected to the individual transmission paths. When a long period of time is set as the connection period for the input terminal and the output terminal that are connected to a transmission path along which many node devices are connected, the switching can be efficiently performed). In such a case, weighting is performed on a change pattern for input and output connecting relationship in the switching device to provide a pattern for which a connection period for a specific input terminal and a specific output terminal is long on the average. As a result, the efficiency of the switching can be enhanced.

(Embodiment 13)

In the tenth, the eleventh and the twelfth embodiments is described the feature of the present invention that, in the switching device that switches the input/output connection relationship, that relationship is changed by using a predetermined pattern and, at this time, the weighting is performed for the connection period by using a switching pattern. In the above embodiments, the switching device switches the connection of the input terminal and the output terminal to change the connection relationship of transmission paths 2741 through 2746, 2921 through 2923, 2931 through 2933 (with the node device 2901 employed as an example), and 2901 through 2909. As is described above, the feature of the present invention is the switching of a signal that is transmitted along a specific channel (a transmission path that can be distinguished from the others or a wavelength that can be distinguished from the others) to individual channels in consonance with a predetermined pattern, and to employ, as such a pattern, a pattern that is obtained by performing weighting of the connection period of channels. The channel may be a transmission path along which an electric signal is transmitted, or a transmission path along which an optical signal is transmitted, as in the above embodiments. The channels may either be multiplexed or not multiplexed. Especially in the arrangement of the twelfth embodiment, since all the terminal equipments are connected to channels by node devices that are not connected to all the channels, physically separate channels can be provided. The present invention can be applied for an arrangement wherein individual channels can be distinguished from each other.

In the tenth embodiment, when N transmission wavelengths are arranged beginning with the shortest, odd number wavelengths are sequentially selected in ascending order from the first wavelength. After the longest odd numbered wavelength is selected, the longest even numbered wavelength is selected, the even numbered wavelengths are -sequentially selected in descending order, and finally the second wavelength is selected. Or when N transmission wavelengths are arranged beginning with the shortest, even number wavelengths are sequentially selected in ascending order from the second wavelength. After the longest even numbered wavelength is selected, the longest odd numbered wavelength is selected, the odd numbered wavelengths are sequentially selected in descending order, and finally the first wavelength is selected. A basic transmission wavelength control pattern is thus provided as a reference pattern. In the tenth embodiment, the weighting of the transmission wavelength control pattern is performed in the following manner. At first, the provisional transmission wavelength control patterns for the respective variable wavelength transmission means are prepared by shifting the arrangement of the respective wavelengths determined by the basic transmission wavelength control pattern with a predetermined delay so that two or more variable wavelength transmission means do not transmit signals of the same wavelength at the same time. Then, as for paired variable wavelength transmission means which comprises one variable wavelength transmission means for the main transmission path and one variable wavelength transmission means for the sub-transmission path, the respective variable wavelength transmission means are controlled in accordance with the respective wavelength control patterns in which wavelengths of arbitrary corresponding portions of the provisional transmission wavelength control patterns for each pair of the variable wavelength transmission means are exchanged while the variable wavelength transmission means other than said plurality of pairs of the variable wavelength transmission means are controlled in accordance with the provisional transmission wavelength control patterns as actual control control patterns. For example, the wavelength control patterns for a pair of variable wavelength transmission means are determined as follows. When the provisional transmission wavelength control pattern for the variable wavelength transmission means for the main transmission path consists of λ7, λ9, λ8, λ6, λ4, λ2, λ1, λ3, λ5 and that for the other variable wavelength transmission means for the sub-transmission path consists of λ6, λ4, λ2, λ1, λ3, λ5, λ7, λ9, λ8, the wavelength control patterns therefor are determined such that the first to third portions from the start of both provisional transmission wavelength control patterns (i.e., λ7, λ9, λ8 in the former and λ6, λ4, λ2 in the latter) are exched to obtain a wavelength control pattern consisting of λ6, λ4, λ2, λ6, λ4, λ2, λ1, λ3, λ5 for the former and a wavelength control pattern consisting of λ7, λ9, λ8, λ1, λ3, λ5, λ7, λ9, λ8 in th latter. The tenth embodiment is an example of the employment of such weighting for wavelength control pattern.

In the eleventh embodiment, N transmission wavelengths are divided into a main transmission wavelength group and a sub-transmission wavelength group at a ratio of n (n is a smaller positive integer than N) to 1. When the main transmission wavelength group is arranged beginning with the shortest, the odd numbered wavelengths are selected in ascending order from the first wavelength. After the longest odd numbered wavelength is selected, the longest even numbered wavelength is selected, then the even numbered wavelengths are selected in descending order, and finally the second wavelength is selected. The basic main transmission wavelength control pattern is thus provided. When the sub-transmission wavelength group is arranged beginning with the shortest, the odd numbered wavelengths are selected in ascending order from the first. After the longest odd numbered wavelength is selected, the longest even numbered wavelength is selected, and the even number ed wavelengths are selected in descending order. Finally, the second wavelength is selected to provide the basic sub-transmission wavelength control pattern. $n_1$ ($n_1$ is a positive integer of 2 or greater) basic main transmission wavelength control patterns are selected, and the basic sub-transmission wavelength control pattern is selected to provide the main transmission wavelength control pattern. One basic main transmission wavelength control pattern is selected, and then $n_2[n_2=(n_1-1)\times n+1]$ basic sub-transmission wavelength control patterns are selected to provide the sub-transmission wavelength control pattern. The variable wavelength transmission means are divided into a main transmission group and a sub-transmission group, at a ratio of n to 1. The variable wavelength transmission means group for main transmission is controlled in consonance with the main transmission wavelength control pattern. The variable wavelength transmission means group for sub-transmission is controlled in consonance with the sub-transmission wavelength control pattern. The individual variable wavelength main transmission means and the individual variable wavelength sub-transmission means employ the main transmission wavelength control pattern and the sub-transmission wavelength control pattern with a predetermined time shift. Weighting in the eleventh embodiment is thus performed. More specifically, the number of input channels and the number of output channels are N. The N output channels are divided into a first output channel group (main transmission path group) and a second output channel group (sub-transmission path group) so that the channel counts in the groups are-n to 1 (n=2 in the eleventh embodiment). A first pattern (λ1, λ3, λ5, λ6, λ4, and λ2 in the eleventh embodiment) is set for sequentially selecting an output channel that belongs to the first output channel group, and a second pattern (λ7, λ9 and λ8 in the eleventh embodiment) is set for sequentially selecting an output channel that belongs to the second output channel group. Each of the predetermined patterns consists of $n_3$ third patterns (in the embodiment, the third pattern is employed when signals from six main input terminals are to be output), in which the first pattern is selected $n_1$ times (twice in the embodiment) and the second pattern is selected once, that are shifted relative to each other at a predetermined time, and $n_4$ fourth patterns (in the embodiment, the fourth pattern is employed when signals from three sub-input terminals are to be output), in which the second pattern is selected $n_2$ times (three times in the embodiment) and the first pattern is selected once, that are shifted relative to each other at a predetermined time and that have no portions that overlap the $n_3$ third patterns. N, n, $n_1$, $n_2$, $n_3$ and $n_4$ are positive integers that satisfy the following conditions:

$n<N$ $n_1 \geq 2$ $n_2=(n_1-1)\times n+1$ $n_3=N\times n/(n+1)$ $n_4=N/(n+1)$.

The eleventh embodiment is a mode that employs such weighting.

By setting patterns in the above described manner, the weighting can be easily performed in the period of one cycle during which the output channels are connected. The present invention can employ various other patterns that are weighted.

In the above embodiments, one connection period for connecting to one channel at a time is fixed. A connection pattern that varies that period is employed to facilitate weighting. For example, in the control tables shown in Tables 5 and 6, when the connection period that corresponds to address 0 is extended so that it is longer than the other, the connection period to the output channels that are designated at that time can be longer, and the output from a plurality of buffers to the same output channel can be prevented. As a result, in an arrangement wherein there are many signals to be output to the output channel, packet overflows or transmission delays can be reduced. A method for employing a different connection period for each address can be provided by setting as needed the timing at which the ROM counter 2501 outputs an address value.

TABLE 7

| Table Name | \multicolumn{9}{c}{Address} |
|---|---|---|---|---|---|---|---|---|---|
|  | 0 | 1 | 2 | 3 | 4 | 5 | 6 | 7 | 8 |
| Wavelength Control Table I | 1 | 3 | 5 | *7 | *9 | *8 | 6 | 4 | 2 |
| Wavelength Control Table II | 3 | 5 | *7 | *9 | *8 | 6 | 4 | 2 | 1 |
| Wavelength Control Table III | 5 | *7 | *9 | *8 | 6 | 4 | 2 | 1 | 3 |
| Wavelength Control Table IV | 6 | 4 | 2 | 6 | 4 | 2 | 1 | 3 | 5 |
| Wavelength Control Table V | 4 | 2 | 6 | 4 | 2 | 1 | 3 | 5 | 6 |
| Wavelength Control Table VI | 2 | 6 | 4 | 2 | 1 | 3 | 5 | 6 | 4 |
| Wavelength Control Table VII | *7 | *9 | *8 | 1 | 3 | 5 | *7 | *9 | *8 |
| Wavelength Control Table VIII | *9 | *8 | 1 | 3 | 5 | *7 | *9 | *8 | *7 |
| Wavelength Control Table IX | *8 | 1 | 3 | 5 | *7 | *9 | *8 | *7 | *9 |

TABLE 8

| Table Name | \multicolumn{9}{c}{Address} |
|---|---|---|---|---|---|---|---|---|---|
|  | 0 | 1 | 2 | 3 | 4 | 5 | 6 | 7 | 8 |
| Buffer Control Table I | A1 | A3 | A5 | A7 | A9 | A8 | A6 | A4 | A2 |
| Buffer Control Table II | A3 | A5 | A7 | A9 | A8 | A6 | A4 | A2 | A1 |
| Buffer Control Table III | A5 | A7 | A9 | A8 | A6 | A4 | A2 | A1 | A3 |
| Buffer Control Table IV | A6 | A4 | A2 | A6 | A4 | A2 | A1 | A3 | A5 |
| Buffer Control Table V | A4 | A2 | A6 | A4 | A2 | A1 | A3 | A5 | A6 |
| Buffer Control Table VI | A2 | A6 | A4 | A2 | A1 | A3 | A5 | A6 | A4 |
| Buffer Control Table VII | A7 | A9 | A8 | A1 | A3 | A5 | A7 | A9 | A8 |
| Buffer Control Table VIII | A9 | A8 | A1 | A3 | A5 | A7 | A9 | A8 | A7 |
| Buffer Control Table IX | A8 | A1 | A3 | A5 | A7 | A9 | A8 | A7 | A9 | q

TABLE 9

| Table Name | \multicolumn{15}{c}{Address} |
|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 |
| Wavelength Control Table I | 1 | 3 | 5 | 6 | 4 | 2 | 1 | 3 | 5 | *7 | *9 | *8 | 6 | 4 | 2 |
| Wavelength Control Table II | 3 | 5 | 6 | 4 | 2 | 1 | 3 | 5 | *7 | *9 | *8 | 6 | 4 | 2 | 1 |
| Wavelength Control Table III | 5 | 6 | 4 | 2 | 1 | 3 | 5 | *7 | *9 | *8 | 6 | 4 | 2 | 1 | 3 |
| Wavelength Control Table IV | 6 | 4 | 2 | 1 | 3 | 5 | *7 | *9 | *8 | 6 | 4 | 2 | 1 | 3 | 5 |
| Wavelength Control Table V | 4 | 2 | 1 | 3 | 5 | *7 | *9 | *8 | 6 | 4 | 2 | 1 | 3 | 5 | 6 |
| Wavelength Control Table VI | 2 | 1 | 3 | 5 | *7 | *9 | *8 | 6 | 4 | 2 | 1 | 3 | 5 | 6 | 4 |
| Wavelength Control Table VII | *7 | *9 | *8 | *7 | *9 | *8 | 6 | 4 | 2 | 1 | 3 | 5 | *7 | *9 | *8 |
| Wavelength Control Table VIII | *9 | *8 | *7 | *9 | *8 | 6 | 4 | 2 | 1 | 3 | 5 | *7 | *9 | *8 | *7 |
| Wavelength Control Table IX | *8 | *7 | *9 | *8 | 6 | 4 | 2 | 1 | 3 | 5 | *7 | *9 | *8 | *7 | *9 |

TABLE 10

| Table Name | \multicolumn{15}{c}{Address} |
|---|---|---|---|---|---|---|---|---|---|---|---|---|---|---|---|
|  | 0 | 1 | 2 | 3 | 4 | 5 | 6 | 7 | 8 | 9 | 10 | 11 | 12 | 13 | 14 |
| Buffer Control Table I | A1 | A3 | A5 | A6 | A4 | A2 | A1 | A3 | A5 | A7 | A9 | A8 | A6 | A4 | A2 |
| Buffer Control Table II | A3 | A5 | A6 | A4 | A2 | A1 | A3 | A5 | A7 | A9 | A8 | A6 | A4 | A2 | A1 |
| Buffer Control Table III | A5 | A6 | A4 | A2 | A1 | A3 | A5 | A7 | A9 | A8 | A6 | A4 | A2 | A1 | A3 |
| Buffer Control Table IV | A6 | A4 | A2 | A1 | A3 | A5 | A7 | A9 | A8 | A6 | A4 | A2 | A1 | A3 | A5 |
| Buffer Control Table V | A4 | A2 | A1 | A3 | A5 | A7 | A9 | A8 | A6 | A4 | A2 | A1 | A3 | A5 | A6 |
| Buffer Control Table VI | A2 | A1 | A3 | A5 | A7 | A9 | A8 | A6 | A4 | A2 | A1 | A3 | A5 | A6 | A4 |
| Buffer Control Table VII | A7 | A9 | A* | A7 | A9 | A8 | A6 | A4 | A2 | A1 | A3 | A5 | A7 | A9 | A8 |
| Buffer Control Table VIII | A9 | A8 | A7 | A9 | A8 | A6 | A4 | A2 | A1 | A3 | A5 | A7 | A9 | A8 | A7 |
| Buffer Control Table IX | A8 | A7 | A9 | A8 | A6 | A4 | A2 | A1 | A3 | A5 | A9 | A8 | A8 | A7 | A9 |

TABLE 11

| Table Name | \multicolumn{9}{c}{Address} |
|---|---|---|---|---|---|---|---|---|---|
|  | 0 | 1 | 2 | 3 | 4 | 5 | 6 | 7 | 8 |
| Wavelength Control Table I | 1 | 3 | 5 | 7 | 9 | 8 | 6 | 4 | 2 |
| Wavelength Control Table II | 3 | 5 | 7 | 9 | 8 | 6 | 4 | 2 | 1 |
| Wavelength Control Table III | 5 | 7 | 9 | 8 | 6 | 4 | 2 | 1 | 3 |
| Wavelength Control Table IV | 7 | 9 | 8 | 6 | 4 | 2 | 1 | 3 | 5 |
| Wavelength Control Table V | 9 | 8 | 6 | 4 | 2 | 1 | 3 | 5 | 7 |
| Wavelength Control Table VI | 8 | 6 | 4 | 2 | 1 | 3 | 5 | 7 | 9 |
| Wavelength Control Table VII | 6 | 4 | 2 | 1 | 3 | 5 | 7 | 9 | 8 |
| Wavelength Control Table VIII | 4 | 2 | 1 | 3 | 5 | 7 | 9 | 8 | 6 |
| Wavelength Control Table IX | 2 | 1 | 3 | 5 | 7 | 9 | 8 | 6 | 4 |

$\lambda 1 \to 1, \lambda 2 \to 2, \lambda 3 \to 3 \ldots \lambda 9 \to 9$

TABLE 12

| Table Name | \multicolumn{9}{c}{Address} |
|---|---|---|---|---|---|---|---|---|---|
|  | 0 | 1 | 2 | 3 | 4 | 5 | 6 | 7 | 8 |
| Buffer Control Table I | 1 | 3 | 5 | 7 | 9 | 8 | 6 | 4 | 2 |
| Buffer Control Table II | 3 | 5 | 7 | 9 | 8 | 6 | 4 | 2 | 1 |
| Buffer Control Table III | 5 | 7 | 9 | 8 | 6 | 4 | 2 | 1 | 3 |
| Buffer Control Table IV | 7 | 9 | 8 | 6 | 4 | 2 | 1 | 3 | 5 |
| Buffer Control Table V | 9 | 8 | 6 | 4 | 2 | 1 | 3 | 5 | 7 |
| Buffer Control Table VI | 8 | 6 | 4 | 2 | 1 | 3 | 5 | 7 | 9 |
| Buffer Control Table VII | 6 | 4 | 2 | 1 | 3 | 5 | 7 | 9 | 8 |

TABLE 12-continued

| Table Name | Address | | | | | | | | |
|---|---|---|---|---|---|---|---|---|---|
| | 0 | 1 | 2 | 3 | 4 | 5 | 6 | 7 | 8 |
| Buffer Control Table VIII | 4 | 2 | 1 | 3 | 5 | 7 | 9 | 8 | 6 |
| Buffer Control Table IX | 2 | 1 | 3 | 5 | 7 | 9 | 8 | 6 | 4 |

What is claimed is:

1. A switching device, which switches signals between N input terminals and N output terminals, comprising:

buffer means, one of which is provided for each of said N input terminals, for temporarily storing a signal that is sent by one corresponding input terminal of said N input terminals;

variable channel transmission means, one of which is provided for each of said N input terminals, for outputting a signal, which is received from said buffer means, with one of N different channels;

fixed channel reception means, one of which is individually provided for each of said N output terminals, for receiving a signal carried by a given channel of said N channels of said variable channel transmission means, and for outputting a signal which is received with said given channel to a corresponding output terminal of said N output terminals, wherein said given channel of said fixed channel reception means does not overlap another channel of said fixed channel reception means;

variable channel control means for synchronously altering, in accordance with predetermined patterns, channels with which said variable channel transmission means respectively corresponding to said N input terminals output signals, so that two or more of said variable channel transmission means do not simultaneously output signals with the same channel; and buffer control means for controlling said buffer means which read signals to be output in synchronization with said alteration by said variable channel control means.

2. A switching device according to claim 1, wherein each of said buffer means has a function for sorting signals input thereto into said N output terminals based on the contents of the signals.

3. A switching device according to claim 1, wherein said alteration of channels by said variable channel control means in accordance with said predetermined pattern is repeatedly performed.

4. A switching device according to claim 1, wherein said N different channels are optical signals that have N different wavelengths, said variable channel transmission means comprise variable wavelength transmission means each for selectively transmitting an optical signal of one of said N wavelengths, and said fixed channel reception means each comprises fixed wavelength reception each means for receiving an optical signal having a predetermined wavelength that is one of said N wavelengths.

5. A switching device according to claim 1, wherein said N different channels are optical signals that have N different wavelengths, said variable channel transmission means comprises variable wavelength transmission means each for selectively transmitting an optical signal that has one of said N wavelengths, and said fixed channel reception means comprises fixed wavelength reception means each for receiving an optical signal that has a predetermined wavelength that is one of said N wavelengths; and wherein said predetermined pattern either is a pattern in which, when said N wavelengths are arranged beginning with the shortest, odd numbered wavelengths are selected in ascending order from the first wavelength to the longest odd numbered wavelength, then even numbered wavelengths are selected in descending order from the longest to the shortest even numbered wavelength, and finally the second wavelength is selected, or is a pattern in which, when said N wavelengths are arranged beginning with the shortest, even numbered wavelengths are selected in ascending order from the second wavelength to the longest even numbered wavelength, then odd numbered wavelengths are selected in descending order from the longest to the shortest odd numbered wavelength, and finally the first wavelength is selected.

6. A switching device according to claim 1, further comprising optical waveguide means for transmitting said N optical signals from said variable channel transmission means for each of said N input terminals to all of said fixed channel reception means.

7. A switching device according to claim 1, wherein weighting of said predetermined pattern is performed by employing a time at which one of said variable channel transmission means outputs signals with said respective channels during one pattern cycle.

8. A switching device according to claim 7, wherein said predetermined pattern for which weighting is performed is a pattern obtained by weighting the number of outputs with said respective channels during one pattern cycle.

9. A switching device according to claim 8, wherein said predetermined patterns used for at least two of said variable channel transmission means consists of patterns obtained by preparing basic patterns according to which said N channels are equally transmitted in one cycle and the same channel is not transmitted at the same time and exchanging arbitrary portions of corresponding position of said basic patterns.

10. A switching device according to claim 8, wherein said N output terminals are divided into a first output terminal group and a second output terminal group, for which a ratio of the number of output terminals is n to 1, and wherein N predetermined patterns used for said respective variable channel transmission means consist of patterns the number of which is $n_3$, obtained such that a first pattern is selected repeatedly with $n_1$ times and then a second pattern is selected at once to obtain a third pattern and the third patterns with the number of $n_3$ are shifted one another, and patterns the number of which is $n_4$, obtained such that the second pattern is selected repeatedly with $n_2$ times and then the first pattern is selected at once to obtain a fourth pattern and the fourth pattern with the number of $n_4$ are shifted one another, and wherein said patterns with the number of $n_3$ does not overlap any corresponding portions of said patterns with the number of $n_4$, and wherein said first pattern consists of a pattern according to which the respective channels of said fixed channel reception means which respectively transmit signals to said first output terminal group are sequencially selected and said second pattern consists of a pattern according to which the respective channels of said fixed channel reception means which respectively transmit signals to said second output trerminal group are sequentially selected, and wherein N, n, $n_1$, $n_2$, $n_3$ and $n_4$ are positive integers that satisfy the following:

$$n < N$$

$$n_1 \geq 2$$

$$n_2 = (n_1 - 1) \times n + 1$$

$$n_3 = N \times n / (n+1)$$

$n_4 = N/(n+1)$.

11. A switching device according to claim 7, wherein said N input terminals are divided into a first input terminal group that consists of one or more input terminals and a second input terminal group that consists of one or more input terminals, and said N output terminals are divided into a first output, terminal group that consists of one or more output terminals and a second output terminal group that consists of one or more output terminals; wherein weighting is performed for said predetermined respective patterns each for altering a channel with which a signal is transmitted by said variable channel transmission means which transmits a signal input from said first input terminal group, so that a sum of time periods for outputting with channels respectively recieved by said fixed channel reception means which respectively output signals to said first output terminal group is greater than a sum of time periods for outputting with channels respectively received by said fixed channel reception means which respectively transmit signals to said second output terminal group, and wherein weighting is performed for said predetermined respective patterns each for altering a channel with which a signal is transmitted by said variable channel transmission means, which respectively transmit a signal input from said second input terminal group, so that a sum of time periods for outputting with channels respectively received by said fixed channel reception means which respectively output signals to said second output terminal group is greater than a sum of time periods for outputting with channels respectively received by said fixed channel reception means which respectively output signals to said first output terminal group.

12. A switching device, which switches signals between N input terminals and N output terminals, comprising:

buffer means, one of which is provided for each of said N input terminals, for temporarily storing a signal that is sent by one corresponding input terminal of said N input terminals;

fixed channel transmission means, one of which is provided for each of said N input terminals, for outputting a signal, which is received from said buffer means, with a predetermined one of N different channels, wherein said respective predetermined channels of said fixed channel transmission means do not overlap;

variable channel reception means, one of which is individually provided for each of said N output terminals, for receiving said signal carried by a given channel of said N channels, and for outputting a signal to a corresponding output terminal of said N output terminals;

variable channel control means for synchronously altering in accordance with predetermined patterns, channels with which said variable channel reception means respectively corresponding to said N output terminals receive signals, so that two or more of said variable channel reception means do not simultaneously receive signals with the same channel; and buffer control means for controlling said buffer means which read signals to be output in synchronization with said alteration by said variable channel control means.

13. A switching device according to claim 12, wherein each of said buffer means has a function for sorting signals input thereto into said N output terminals based on the contents of the signals.

14. A switching device according to claim 12, wherein said alteration of channels by said variable channel control means in accordance with said predetermined pattern is repeatedly performed.

15. A switching device according to claim 12, wherein said N different channels are optical signals that have N different wavelengths, said variable channel reception means comprise variable wavelength reception means each for selectively receiving an optical signal of one of said N wavelengths, and said fixed channel transmission means comprises fixed wavelength transmission means each for transmitting an optical signal having a predetermined wavelength that is one of said N wavelengths.

16. A switching device according to claim 14, wherein said N different channels are optical signals that have N different wavelengths, said variable channel reception means comprises variable wavelength reception means each for selectively receiving an optical signal that has one of said N wavelengths, and said fixed channel transmission means comprises fixed wavelength transmission means for transmitting an optical signal that has a predetermined wavelength that is one of said N wavelengths; and wherein said predetermined pattern either is a pattern in which, when said N wavelengths are arranged beginning with the shortest, odd numbered wavelengths are selected in ascending order from the first wavelength to the longest odd numbered wavelength, then even numbered wavelengths are selected in descending order from the longest to the shortest even numbered wavelength, and finally the second wavelength is selected, or is a pattern in which, when said N wavelengths are arranged beginning with the shortest, even numbered wavelengths are selected in ascending order from the second wavelength to the longest even numbered wavelength, then odd numbered wavelengths are selected in descending order from the longest to the shortest odd numbered wavelength, and finally the first wavelength is selected.

17. A switching device according to claim 12, further comprising optical waveguide means for transmitting said N optical signals from said fixed channel transmission means for each of said N input terminals to all of said variable channel reception means.

18. A switching device according to claim 12, wherein weighting of said predetermined pattern is performed by employing a time at which one of said variable channel reception means receives signals with said respective channels during one pattern cycle.

19. A switching device according to claim 18, wherein said predetermined pattern for which weighting is performed is a pattern obtained by weighting the number of outputs with said respective channels during one pattern cycle.

20. A switching device according to claim 19, wherein said predetermined patterns used for at least two of said variable channel reception means consists of patterns obtained by preparing basic patterns according to which said N channels are equally received in one cycle and the same channel is not received at the same time and exchanging arbitrary portions of corresponding position of said basic patterns.

21. A switching device according to claim 19, wherein said N input terminals are divided into a first input terminal group and a second input terminal group, for which a ratio of the number of input terminals is n to 1, and wherein N predetermined patterns used employed for said respective variable channel reception means consist of patterns the number of which is $n_3$, obtained such that a first pattern is selected repeatedly with $n_1$ times and then a second pattern is selected at once to obtain a third pattern and the third patterns with the number of $n_3$ are shifted one another, and patterns the number of which is $n_4$, obtained such that the second pattern is selected repeatedly with $n_2$ times and then the first pattern is selected at once to obtain a fourth pattern and the fourth patterns with the number of $n_4$ are shifted one another, and wherein said patterns with the number of $n_3$ does not overlap any corresponding portions of said patterns with the number of $n_4$, and wherein said first pattern consists of a pattern according to which the respective channels of said fixed channel transmission means which respectively transmit signals from said first input terminal group are sequentially selected and said second pattern consists of a pattern according to which the respective channels of said fixed channel transmission means which respectively transmit signals from said second input terminal group are sequentially selected, and wherein N, n, $n_1$, $n_2$, $n_3$ and $n_4$ being positive integers that satisfy the following:

$n<N$ $n_1 \geq 2$ $n_2=(n_1-1) \times n+1$ $n_3=N \times n/(n+1)$ $n_4=N/(n+1)$.

22. A switching device according to claim 18, wherein said N input terminals are divided into a first input terminal group that consists of one or more input terminals and a second input terminal group that consists of one or more input terminals, and said N output terminals are divided into a first output terminal group that consists of one or more output terminals and a second output terminal group that consists of one or more output terminals, wherein weighting is performed for said predetermined respective patterns each for altering a channel with which a signal is received by said variable channel reception means which respectively transmit signals to said first output terminal group, so that a sum of time periods for receiving with channels respectively transmitted by said fixed channel transmission means which respectively output signals from said first input terminal group is greater than a sum of time periods for receiving with channels respectively transmitted by said fixed channel transmission means which respectively transmit signals from said second input terminal group, and wherein weighting is performed for said predetermined respective patterns each for altering a channel with which a signal is received by said variable channel reception means, which respectively transmit signals to said output terminal group, so that a sum of time periods for receiving with channels respectively transmitted by said fixed channel transmission means which respectively output signals from said second input terminal group is greater than a sum of time periods for receiving with channels respectively transmitted by said fixed channel transmission menas which respectively output signals from said first input terminal group.

23. A network, in which a plurality of terminal equipments are connected by a switching device, comprising:

a plurality of terminal equipments; and a switching device, which receives signals from said terminal equipments at N input terminals thereof and outputs signals to said terminal equipment from N output terminals,? thereof wherein said switching device comprises:

buffer means, one of which is provided for each of said N input terminals, for temporarily storing a signal that is sent by one corresponding input terminal of said N input terminals, variable channel transmission means, one of which is provided for each of said N input terminals, for outputting a signal, which is received from said buffer means, with one of N different channels, fixed channel reception means, one of which is individually provided for each of said N output terminals, for receiving a signal carried by a given channel of said N channels of said variable channel transmission means, and for outputting a signal which is received with said given channel to a corresponding output terminal of said N output terminals, wherein said given channel of said fixed channel reception means does not overlap another channel of said fixed channel reception means, variable channel control means for synchronously altering, in accordance with predetermined patterns, channels with which said variable channel transmission means respectively corresponding said N input terminals output signals, so that two or more of said variable channel transmission means do not simultaneously output signals with the same channel, and buffer control means for controlling said buffer means which read signals to be output in synchronization with said alteration by said variable channel control means.

24. A network according to claim 23, wherein said switching device has output buffer means for temporarily storing signals that are received by said fixed channel reception means.

25. A network, in which a plurality of terminal equipments are connected by a switching device, comprising:

a plurality of terminal equipments; and a switching device, which receives signals from said terminal equipments at N input terminals thereof and outputs signals to said terminal equipments from N output terminals thereof, said switching device comprising:

buffer means, one of which is provided for each of said N input terminals, for temporarily storing a signal that is sent by one corresponding input terminal of said N input terminals;

fixed channel transmission means, one of which is provided for each of said N input terminals, for outputting a signal, which is received from said buffer means, with a predetermined one of N different channels, wherein said respective predetermined channels of said fixed channel transmission means do not overlap;

variable channel reception means, one of which is individually provided for each of said N output terminals, for receiving said signal carried by a given channel of said N channels, and for outputting a signal to a corresponding output terminal of said N output terminals;

variable channel control means for synchronously altering in accordance with predetermined patterns, channels with which said variable channel reception means respectively corresponding to said N output terminals receive signals, so that two or more of said variable channel reception means do not simultaneously receive signals with the same channel; and buffer control means for controlling said buffer means which read signals to be output in synchronization with said alteration by said variable channel control means.

26. A network according to claim 25, wherein said switching device has output buffer means for temporarily storing signals that are received by said variable channel reception means.

27. A network, which transmits signals with N channels, comprising:

terminal equipments connected to said N channels;

separation means for separating a signal that is to be output to a connected terminal equipment from signals that are transmitted with said channels, and for outputting said signal to said connected terminal equipment;

insertion means for inserting signals into said channels; and a switching device, which has N input terminals and N output terminals, for switching signals transmitted with said channels so as to be transmitted with predetermined channels, said switching device comprising:

buffer means one of which is provided for each of said N input terminals, for temporarily storing a signal that is sent by one corresponding input terminal of said N input terminals;

variable channel transmission means, one of which is provided for each of said N input terminals, for outputting a signal, which is received from said buffer means, with one of N different channels;

fixed channel reception means, one of which is individually provided for each of said N output terminals, for receiving a signal carried by a given channel of said N channels of said variable channel transmission means, and for outputting a signal which is received with said given channel to a corresponding output terminal of said N output terminals, wherein said given channel of said fixed channel reception means does not overlap another channel of said fixed channel reception means;

variable channel control means for synchronously altering, in accordance with predetermined patterns, channels with which said variable channel transmission means respectively corresponding to said N input terminals output signals, so that two or more of said variable channel transmission means do not simultaneously output signals with the same channel; and buffer control means for controlling said buffer means which read signals to be output in synchronization with said alteration by said variable channel control means.

28. A network according to claim 27, wherein said separation means corresponds to at least each of said N channels.

29. A network according to claim 28, wherein said separation means is provided inside a node device.

30. A network according to claim 29, wherein said switching device is provided inside a node device.

31. A network according to claim 29, wherein a plurality of said node devices are provided.

32. A network according to claim 31, wherein said switching device is provided for all of said node devices.

33. A network according to claim 31, wherein said N channels are optical signals having different wavelengths, and said optical signals of said wavelengths are multiplexed between said node devices, and wherein said node devices have means each for respectively receiving optical signals of N wavelengths multiplexed and means each for respectively transmitting said optical signals of said N wavelengths.

34. A network according to claim 27, wherein said signal that is transmitted has, as destination addresses, an address for said separation means that separates said signal and an address for a channel with which said separation means separates said signal.

35. A network, which transmits signals with N channels, comprising:

terminal equipments connected to said N channels;

separation means for separating a signal that is to be output to a connected terminal from signals that are transmitted with said channels, and for outputting said signal to said connected terminal;

insertion means for inserting signals into said channels; and a switching device, which has N input terminals and N output terminals, for switching signals transmitted with said channels so as to be transmitted with predetermined channels, said switching device comprising, buffer means, one of which is provided for each of said N input terminals, for temporarily storing a signal that is sent by one corresponding input terminal of said N input terminals;

fixed channel transmission means, one of which is provided for each of said N input terminals, for outputting a signal, which is received from said buffer means, with a predetermined one of N different channels, wherein said respective predetermined channels of said fixed channel transmission means do not overlap;

variable channel reception means, one of which is individually provided for each of said N output terminals, for receiving said signal carried by a given channel of said N channels, and for outputting a signal to a corresponding output terminal of said N output terminals;

variable channel control means for synchronously altering in accordance with predetermined patterns, channels with which said variable channel reception means respectively corresponding to said N output terminals receive signals, so that two or more of said variable channel reception means do not simultaneously receive signals with the same channel; and buffer control means for controlling said buffer means which read signals to be output in synchronization with said alteration by said variable channel control means.

36. A network according to claim 35, wherein said separation means corresponds to at least each of said N channels.

37. A network according to claim 36, wherein said separation means is provided inside a node device.

38. A network according to claim 37, wherein said switching device is provided inside said node device.

39. A network according to claim 37, wherein a plurality of said node devices are provided.

40. A network according to claim 39, wherein said switching device is provided for all of said node devices.

41. A network according to claim 39, wherein said N channels are optical signals having different wavelengths, and said optical signals of said wavelengths are multiplexed between said node devices, and wherein said node devices have means each for respectively receiving optical signals of N wavelengths multiplexed and means each for respectively transmitting said optical signals of said N wavelengths.

42. A network according to claim 35, wherein said signal that is transmitted has, as destination addresses, an address for said separation means that separates said signal and an address for a channel with which said separation means separates said signal.

43. A network, in which a plurality of switching devices are connected, comprising:

a plurality of switching devices each having N input terminals and N output terminals;

channels with which output terminals belonging to a first output terminal group comprising some of said N output terminals of each of said switching devices are connected to input terminals belonging to a first input terminal group comprising some of said N input terminals of each of other switching devices, the number of said some of said N output terminals being equal to that of said some of said N input terminals; and a plurality of terminal equipments connected to input terminals of a second input terminal group, of each of said switching devices, that includes input terminals other than those of said first input terminal group, and connected to output terminals of a second output terminal group that includes output terminals other than those of said first output terminal group, wherein at least one of said switching device comprises:

buffer means, one of which is provided for each of said N input terminals, for temporarily storing a signal that is sent by one corresponding input terminal of said N input terminals;

variable channel transmission means, one of which is provided for each of said N input terminals, for outputting a signal, which is received from said buffer means, with one of N different channels;

fixed channel reception means, one of which is individually provided for each of said N output terminals, for receiving a signal carried by a given channel of said N channels of said variable channel transmission means, and for outputting a signal which is received with said given channel to a corresponding output terminal of said N output terminals, wherein said given channel of said fixed channel reception means does not overlap another channel of said fixed channel reception means;

variable channel control means for synchronously altering, in accordance with predetermined patterns, channels with which said variable channel transmission means respectively corresponding to said N input terminals output signals, so that two or more of said variable channel transmission means do not simultaneously output signals with the same channel; and buffer control means for controlling said buffer means which read signals to be output in synchronization with said alteration by said variable channel control means, and wherein weighting is performed for said predetermined respective patterns each for altering a channel with which a signal is transmitted by said variable channel transmission means which transmits a signal input from said first input terminal group, so that a sum of time periods for outputting with channels respectively received by said fixed channel reception means which respectively output signals to said first output terminal group, is greater than a sum of time periods for outputting with channels respectively received by said fixed channel reception means, which respectively transmit signals to said second output terminal group, and wherein weighting is performed for said predetermined respective patterns each for altering a channel with which a signal is transmitted by said variable channel transmission means, which respectively transmit a signal input from said second input terminal group, so that a sum of time periods for outputting with channels respectively received by said fixed channel reception means which respectively output signals to said second output terminal group is greater than a sum of time periods for outputting with channels respectively received by said fixed channel reception means which respectively output signals to said first output terminal group.

44. A network, in which a plurality of switching devices are connected, comprising:

a plurality of switching devices each having N input terminals and N output terminals;

channels with which output terminals belonging to a first output terminal group comprising some of said N output terminals of each of said switching devices are connected to input terminals belonging to a first input terminal group comprising some of said N input terminals of each of other switching devices, the number of said some of said N output terminals being equal to that of said some of said N input terminals; and a plurality of terminal equipments connected to input terminals of a second input terminal group, of each of said switching devices, that includes input terminals other than those of said first input terminal group, and connected to output terminals of a second output terminal group that includes output terminals other than those of said first output terminal group, wherein at least one of said switching device comprises:

buffer means, one of which is provided for each of said N input terminals, for temporarily storing a signal that is sent by one corresponding input terminal of said N input terminals;

fixed channel transmission means, one of which is provided for each of said N input terminals, for outputting a signal, which is received from said buffer means, with a predetermined one of N different channels, wherein said respective predetermined channels of said fixed channel transmission means do not overlap;

variable channel reception means, one of which is individually provided for each of said N output terminals, for receiving said signal carried by a given channel of said N channels, and for outputting a signal to a corresponding output terminal of said N output terminals;

variable channel control means for synchronously altering in accordance with predetermined patterns, channels with which said variable channel reception means respectively corresponding to said N output terminals receive signals, so that two or more of said variable channel reception means do not simultaneously receive signals with the same channel; and buffer control means for controlling said buffer means which read signals to be output in synchronization with said alteration by said variable channel control means, and wherein weighting is performed for said predetermined respective patterns each for altering a channel with which a signal is received by said variable channel reception means which respectively transmit signals to said first output terminal group, so that a sum of time periods for receiving with channels respectively transmitted by said fixed channel transmission means which respectively output signals from said first input terminal group is greater than a sum of time periods for receiving with channels respectively transmitted by said fixed channel transmission means which respectively transmit signals from said second input terminal group, and wherein weighting is performed for said predetermined respective patterns each for altering a channel with which a signal is received by said variable channel reception means, which respectively transmit signals to said second output terminal group, so that a sum of time periods for receiving with channels respectively transmitted by said fixed channel transmission means which respectively output signals from said second input terminal group is greater than a sum of time periods for receiving with channels respectively transmitted by said fixed channel transmission means which respectively output signals from said first input terminal group.

45. A switching method for a switching device, which switches signals between N input terminals and N output terminals, and which comprises: buffer means, one of which is provided for each of said N input terminals, for temporarily storing a signal that is sent by one corresponding input terminal of said N input terminals; variable channel transmission means, one of which is provided for each of said N input terminals, for outputting a signal, which is received from said buffer means, with one of N different channels; and fixed channel reception means, one of which is individually provided for each of said N output terminals, for receiving a signal carried by a given channel of said N channels of said variable channel transmission means, and for outputting a signal which is received with said given channel to a corresponding output terminal of said N output terminals, said given channels of said fixed channel reception means not overlapping one another, said switching method comprising the steps of:

synchronously altering, in accordance with predetermined patterns, channels with which said variable channel transmission means respectively corresponding to said N input terminals output signals, so that two or more of said variable channel transmission means do not simultaneously output signals with the same channel; and controlling said buffer means which read signals to be output in synchronization with said alteration of channels with which said variable channel transmission means transmit signals.

46. A switching method according to claim 45, wherein signals that are input are sorted for each of said N output terminals at which said signals are to be output, and are stored in said buffer means.

47. A switching method according to claim 45, wherein said alteration of channels transmitted by said variable channel transmission means respectively corresponding to the input terminals is repeatedly performed.

48. A switching method according to claim 45, wherein weighting of said predetermined patterns for altering channels transmitted by said variable channel transmission means respectively corresponding to the input terminals is performed by employing a time at which one of said variable channel transmission means outputs signals with said respective channels during one pattern cycle.

49. A switching method for a switching device, which switches signals between N input terminals and N output terminals, and which comprises: buffer means, one of which is provided for each of said N input terminals, for temporarily storing a signal that is sent by one corresponding input terminal of said N input terminals; fixed channel transmission means, one of which is provided for each of said N input terminals, for outputting a signal, which is received from said buffer means, with a predetermined one of N different channels, said predetermined channels of said fixed channel transmission means not overlapping one another; and variable channel reception means, one of which is individually provided for each of said N output terminals, for receiving said signal carried by a given channel of said N channels, and for outputting a signal to a corresponding output terminal of said N output terminals, said switching method comprising the steps of:

synchronously altering, in accordance with predetermined patterns, channels with which said variable channel reception means respectively corresponding to said N output terminals receive a signal, so that two or more of said variable channel reception means do not simultaneously receive signals with the same channel; and controlling said buffer means which read signals to be output in synchronization with said alteration of channels with which said variable channel reception means receive signals.

50. A switching method according to claim 49, wherein signals that are input are sorted for each of said N output terminals at which said signals are to be output, and are stored in said buffer means.

51. A switching method according to claim 49, wherein said alteration of channels received by said variable channel reception means respectively corresponding to the output terminals is repeatedly performed.

52. A switching method according to claim 49, wherein weighting of said predetermined patterns for altering channels with which said variable channel reception means respectively corresponding to said N output terminals receives a signal is performed by employing a time at which one of said variable channel reception means receives signals with said respective channels during one pattern cycle.

53. A communication method in a network, which has a plurality of terminal equipments connected by a switching device that receives signals from said terminal equipments at N input terminals thereof and outputs signals to said terminal equipments from N output terminals thereof, said switching device comprising: input buffer means, one of which is provided for each of said N input terminals, for temporarily storing a signal that is sent by one corresponding input terminal of said N input terminals; variable channel transmission means, one of which is provided for each of said N input terminals, for outputting a signal, which is received from said input buffer means, with one of N different channels; and fixed channel reception means, one of which is individually provided for each of said N output terminals, for receiving a signal carried by a given channel of said N channels of said variable channel transmission means, and for outputting a signal which is received with said given channel to a corresponding output terminal of said N output terminals, said given channels of said fixed channel reception means not overlapping one another, said communication method comprising the steps of:

transmitting a first signal from one of said terminal equipments toward said switching device; storing said first signal in one of said input buffer means in said switching device;

synchronously altering in said switching device, according to predetermined patterns, channels with which said variable channel transmission means respectively corresponding to said N input terminals output signals, so that two or more of said variable channel transmission means do not simultaneously output signals with the same channel, and reading from said input buffer means said first signal in synchronization such that a channel with which said variable channel transmission means transmits a signal from said input buffer means storing said first signal matches a reception channel for said fixed channel reception means corresponding to an output terminal connected to one of said terminal equipments that is a transmission destination of said first signal.

54. A communication method according to claim 53, wherein said input buffer means has memory regions that respectively correspond to said output terminals, and wherein received signals are sorted for each of said output terminals to which said signal are to be output, and are stored in said memory regions of said input buffer means.

55. A communication method according to claim 54, wherein, in said input buffer means, when a memory region that corresponds to an output terminal that is connected to a destination terminal for said first signal is not available for storing said first signal, said first signal is stored in another available memory region and is output from another output terminal, and wherein a terminal equipment that receives said first signal whose destination is not said terminal equipment relays said first signal to said switching device.

56. A communication method according to claim 55, wherein said switching device has output buffer means for temporarily storing signals that are received by said fixed channel reception means; wherein said terminal equipment which transmits the first signal adds, to signals to be transmitted, an instruction that indicate a transmission order; and wherein said output buffer means in said switching device passes, therethrough, a received signal whose destination is not an output terminal, to which said output buffer means outputs a signal, while said output buffer means temporarily storing a signal that corresponds to said output terminal to which said output buffer means outputs a signal, and that has the instruction indicating said transmission order, and outputs said signal according to said transmission order.

57. A communication method in a network, which has a plurality of terminal equipments connected by a switching device that receives signals from said terminal equipments at N input terminals thereof and outputs signals to said terminal equipments from N output terminals thereof, said switching device comprising: input buffer means, one of which is provided for each of said N input terminals, for temporarily storing a signal that is sent by one corresponding input terminal of said N input terminals; fixed channel transmission means, one of which is provided for each of said N input terminals, for outputting a signal, which is received from said input buffer means, with one of N different channels, said given channels of said fixed channel transmission means not overlapping one another; and variable channel reception means, one of which is individually provided for each of said N output terminals, for receiving a signal carried by a given channel of said N channels of said variable channel reception means, and for outputting a signal which is received with said given channel to a corresponding output terminal of said N output terminals, said communication method comprising the steps of:
  transmitting a first signal from one of said terminal equipment toward said switching device;
  storing said first signal in one of said input buffer means in said switching device;
  synchronously altering in said switching device, according to predetermined patterns, channels with which said variable channel reception means respectively corresponding to said N input terminals receive signals, so that two or more of said variable channel reception means do not simultaneously receive signals with the same channel, and
  reading from said input buffer means said first signal in synchronization such that a channel with which said fixed channel transmission means transmits a signal from said input buffer means storing said first signal matches a reception channel for said variable channel reception means corresponding to an output terminal connected to one of said terminal equipments that is a transmission destination of said first signal.

58. A communication method according to claim 57, wherein said input buffer means has memory regions that respectively correspond to said output terminals, and wherein received signals are sorted for each of said output terminals to which said signal are to be output, and are stored in said memory regions of said input buffer means.

59. A communication method according to claim 58, wherein, in said input buffer means, when a memory region that corresponds to an output terminal that is connected to a destination terminal for said first signal is not available for storing said first signal, said first signal is stored in another available memory region and is output from another output terminal, and wherein a terminal equipment that receives said first signal whose destination is not said terminal equipment relays said first signal to said switching device.

60. A communication method according to claim 59, wherein said switching device has output buffer means for temporarily storing signals that are received by said fixed channel reception means; wherein said terminal equipment which transmits the first signal adds, to signals to be transmitted, an instruction that indicate a transmission order; and wherein said output buffer means in said switching device passes, therethrough, a received signal whose destination is not an output terminal, to which said output buffer means outputs a signal, while said output buffer means temporarily storing a signal that corresponds to said output terminal to which said output buffer means outputs a signal, and that has the instruction indicating said transmission order, and outputs said signal according to said transmission order.

61. A communication method for a network system in which signals are transmitted with N channels and which comprises:
  terminal equipments connected to said N channels;
  separation means for separating a signal that is to be output to a connected terminal equipment from signals that are transmitted with passed along said channels, and for outputting said signal to said connected terminal equipment;
  insertion means for inserting signals into said channels; and
  a switching device, which has N input terminals and N output terminals, for switching signals transmitted with said channels so as to be transmitted with predetermined channels, said switching device comprising:
  buffer means, one of which is provided for each of said N input terminals, for temporarily storing a signal that is sent by one corresponding input terminal of said N input terminals;
  variable channel transmission means, one of which is provided for each of said N input terminals, for outputting a signal, which is received from said buffer means, with one of N different channels;
  fixed channel reception means, one of which is individually provided for each of said N output terminals, for receiving a signal carried by a given channel of said N channels of said variable channel transmission means, and for outputting a signal which is received with said given channel to a corresponding output terminal of said N output terminals, wherein said given channel of said fixed channel reception means do not overlap one another;
  variable channel control means for synchronously altering, in accordance with predetermined patterns, channels with which said variable channel transmission means respectively corresponding to said N input terminals output signals, so that two or more of said variable channel transmission means do not simultaneously output signals with the same channel; and
  buffer control means for controlling said buffer means which read signals to be output in synchronization with said alteration by said variable channel control means, said communication method comprising the steps of:

transmitting a first signal from one of said terminal equipment toward said switching device, added with an address indicating said separation means to which a destination terminal equipment is connected and an address indicating a channel with which said separation means separates a signal;

storing said first signal in one of said input buffer means in said switching device;

synchronously altering in said switching device, according to predetermined patterns, channels with which said variable channel transmission means respectively corresponding to said N input terminals output signals, so that two or more of said variable channel transmission means do not simultaneously output signals with the same channel;

reading from said input buffer means said first signal in synchronization such that a channel with which said variable channel transmission means transmits a signal from said input buffer means storing said first signal matches a reception channel for said fixed channel reception means corresponding to an output terminal to which said first signal is to be output with a destination channel; and separating said first signal by said separation means that corresponds to said address that indicates said separation means in said first signal, and outputting said first signal to a destination terminal equipment.

62. A communication method according to claim 61, wherein, when alteration of channel with which an input signal is to be transmitted is performed according to the signal added with the address indicating the channel, information indicating that alteration of channel has been completed is added to said signal in said switching device, and wherein said separation means determines whether or not only a signal to which said information indicating of completion of channel alteration is added is to be separated.

63. A communication method for a network system in which signals are transmitted with N channels and which comprises:

terminal equipments connected to said N channels;

separation means for separating a signal that is to be output to a connected terminal equipment from signals that are transmitted with passed along said channels, and for outputting said signal to said connected terminal equipment;

insertion means for inserting signals into said channels; and a switching device, which has N input terminals and N output terminals, for switching signals transmitted with said channels so as to be transmitted with predetermined channels, said switching device comprising:

buffer means, one of which is provided for each of said N input terminals, for temporarily storing a signal that is sent by one corresponding input terminal of said N input terminals;

fixed channel transmission means, one of which is individually provided for each of said N input terminals, for outputting a signal, which is received from said buffer means, with a predetermined one of N different channels, wherein said respective predetermined channels of said fixed channel transmission means do not overlap;

variable channel reception means, one of which is individually provided for each of said N output terminals, for receiving said signal carried by a given channel of said N channels, and for outputting a signal to a corresponding output terminal of said N output terminals;

variable channel control means for synchronously altering, in accordance with predetermined patterns, channels with which said variable channel reception means respectively corresponding to said N output terminals receive signals, so that two or more of said variable channel reception means do not simultaneously receive signals with the same channel; and buffer control means for controlling said buffer means which read signals to be output in synchronization with said alteration by said variable channel control means, said communication method comprising the steps of:

transmitting a first signal from one of said terminal equipment toward said switching device, added with an address indicating said separation means to which a destination terminal equipment is connected and an address indicating a channel with which said separation means separates a signal;

storing said first signal in one of said input buffer means in said switching device;

synchronously altering in said switching device, according to the predetermined patterns, channels with which said variable channel reception respectively corresponding to said N output terminals receive signals, so that two or more of said variable channel reception means do not simultaneously receive signals with the same channel;

reading from said input buffer means said first signal in synchronization such that a channel with which said variable channel transmission means transmits a signal from said input buffer means storing said first signal matches a reception channel for said variable channel reception means corresponding to an output terminal to which said first signal is to be output with a destination channel; and separating said first signal by said separation means that corresponds to said address that indicates said separation means in said first signal, and outputting said first signal to a destination terminal equipment.

64. A communication method according to claim 63, wherein, when alteration of channel with which an input signal is to be transmitted is performed according to the signal added with the address indicating the channel, information indicating that alteration of channel has been completed is added to said signal in said switching device, and wherein said separation means determines whether or not only a signal to which said information indicating of completion of channel alteration is added is to be separated.

65. A communication method for a network in which a plurality of switching devices are connected and which comprises:

a plurality of switching devices each having N input terminals and N output terminals;

channels with which output terminals belonging to a first output terminal group comprising some of said N output terminals of each of said switching devices are connected to input terminals belonging to a first input terminal group comprising some of said N input terminals of each of other switching devices, the number of said some of said N output terminals being equal to that of said some of said N input terminals; and a plurality of terminal equipments connected to input terminals of a second input terminal group, of each of said switching devices, that includes input terminals other than those of said first input terminal group, and connected to output terminals of a second output terminal group that includes output terminals other than those of said first output terminal group, wherein at least one of said switching device comprises:

buffer means, one of which is provided for each of said N input terminals, for temporarily storing a signal that is sent by one corresponding input terminal of said N input terminals, variable channel transmission means, one of which is provided for each of said N input terminals, for outputting a signal, which is received from said buffer means, with one of N different channels, fixed channel reception means, one of which is individually provided for each of said N output terminals, for receiving a signal carried by a given channel of said N channels of said variable channel transmission means, and for outputting a signal which is received with said given channel to a corresponding output terminal of said N output terminals, said given channel of said fixed channel reception means not overlapping, said communication method comprising the steps of:

transmitting a first signal from one of said terminal equipments toward at least one of said switching devices;

storing said first signal in one of said input buffer means in at least one of said switching devices;

synchronously altering in at least one of said switching devices, according to predetermined patterns, channels with which said variable channel transmission means respectively corresponding to said N input terminals output signals, so that two or more of said variable channel transmission means do not simultaneously output signals with the same channel, and reading from said input buffer means said first signal in synchronization such that a channel with which said variable channel transmission means transmits a signal from said input buffer means storing said first signal matches a reception channel for said fixed channel reception means corresponding to an output terminal that is connected to one of said terminal equipments that is a transmission destination of said first signal, and wherein weighting is performed for said predetermined respective patterns each for altering a channel with which a signal is transmitted by said variable channel transmission means which transmits a signal input from said first input terminal group, so that a sum of time periods for outputting with channels respectively received by said fixed channel reception means which respectively output signals to said first output terminal group is greater than a sum of time periods for outputting with channels respectively received by said fixed channel reception means which respectively transmit signals to said second output terminal group, and wherein weighting is performed for said predetermined respective patterns each for altering a channel with which a signal is transmitted by said variable channel transmission means, which respectively transmit a signal input from said second input terminal group, so that a sum of time periods for outputting with channels respectively received by said fixed channel reception means which respectively output signals to said second output terminal group is greater than a sum of time periods for outputting with channels respectively received by said fixed channel reception means which respectively output signals to said first output terminal group.

66. A communication method for a network in which a plurality of switching devices are connected and which comprises:

a plurality of switching devices each having N input terminals and N output terminals;

channels with which output terminals belonging to a first output terminal group comprising some of said N output terminals of each of said switching devices are connected to input terminals belonging to a first input terminal group comprising some of said N input terminals of each of other switching devices, the number of said some of said N output terminals being equal to that of said some of said N input terminals; and a plurality of terminal equipments connected to input terminals of a second input terminal group, of each of said switching devices, that includes input terminals other than those of said first input terminal group, and connected to output terminals of a second output terminal group that includes output terminals other than those of said first output terminal group, wherein at least one of said switching devices comprises:

buffer means, one of which is provided for each of said N input terminals, for temporarily storing a signal that is sent by one corresponding input terminal of said N input terminals, fixed channel transmission means, one of which is provided for each of said N input terminals, for outputting a signal, which is received from said buffer means, with a predetermined one of N different channels, said predetermined channel of said fixed channel transmission means not overlapping, variable channel reception means, one of which is individually provided for each of said N output terminals, for receiving said signal carried by a given channel of said N channels, and for outputting a signal to a corresponding output terminal of said N output terminals, said communication method comprising the steps of:

transmitting a first signal from one of said terminal equipments to at least one of said switching devices;

storing said first signal in one of said input buffer means in at least one of said switching devices;

synchronously altering in at least one of said switching devices, according to predetermined patterns, channels with which said variable channel reception means respectively corresponding to said N receive terminals receive signals, so that two or more of said variable channel reception means do not simultaneously receive signals with the same channel; and reading from said input buffer means said first signal in synchronization such that a channel with which said fixed channel transmission means transmits a signal from said input buffer means storing said first signal matches a reception channel for said variable channel reception means corresponding to an output terminal that is connected to one of said terminal equipments that is a transmission destination of said first signal, wherein weighting is performed for said predetermined respective patterns each for altering a channel with which a signal is received by said variable channel reception means which respectively transmit signals to said first output terminal group, so that a sum of time periods for receiving with channels respectively transmitted by said fixed channel transmission means which respectively output signals from said first input terminal group is greater than a sum of time periods for receiving with channels respectively transmitted by said fixed channel transmission means which respectively transmit signals from said second input terminal group, and wherein weighting is performed for said predetermined respective patterns each for altering a channel with which a signal is received by said variable channel reception means, which respectively transmit signals to said second output terminal group, so that a sum of time periods for receiving with channels respectively transmitted by said fixed channel transmission means which respectively output signals from said second input terminal group is greater than a sum of time periods for receiving with channels respectively transmitted by said fixed channel transmission means which respectively output signals from said first input terminal group.

* * * * *

UNITED STATES PATENT AND TRADEMARK OFFICE
CERTIFICATE OF CORRECTION

PATENT NO.     : 5,859,718
DATED          : January 12, 1999
INVENTOR(S)    : Mitsuru Yamamoto et al.

Page 1 of 1

It is certified that error appears in the above-identified patent and that said Letters Patent is hereby corrected as shown below:

<u>Title page, Item [54] and Column 1, line 3,</u>
"DEVICE: AND" should read -- DEVICE; AND --.

Signed and Sealed this

First Day of April, 2003

JAMES E. ROGAN
*Director of the United States Patent and Trademark Office*